United States Patent
Khoshnevisan et al.

(10) Patent No.: US 12,477,538 B2
(45) Date of Patent: Nov. 18, 2025

(54) TECHNIQUES FOR TIMING RELATIONSHIPS FOR PHYSICAL DOWNLINK CONTROL CHANNEL REPETITION

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 614 days.

(21) Appl. No.: 17/573,288

(22) Filed: Jan. 11, 2022

(65) Prior Publication Data

US 2022/0225368 A1    Jul. 14, 2022

Related U.S. Application Data

(60) Provisional application No. 63/136,636, filed on Jan. 12, 2021.

(51) Int. Cl.
*H04W 72/1273* (2023.01)
*H04L 5/00* (2006.01)
(Continued)

(52) U.S. Cl.
CPC ....... *H04W 72/1273* (2013.01); *H04L 5/0051* (2013.01); *H04W 16/28* (2013.01);
(Continued)

(58) Field of Classification Search
CPC ......... H04W 72/1273; H04W 72/0446; H04W 72/23; H04W 72/232; H04W 16/28;
(Continued)

(56) References Cited

U.S. PATENT DOCUMENTS 9,883,503 B2   1/2018  Seo et al.
11,019,518 B2  5/2021  Babei et al.
(Continued)

FOREIGN PATENT DOCUMENTS

TW    201941627 A     10/2019
WO    WO-2020015614 A1  1/2020
WO    WO- 2020064512 A1  4/2020

OTHER PUBLICATIONS

CATT: "Discussion on Enhancements on Multi-TRP/Panel for PDCCH, PUCCH and PUSCH", 3GPP Draft, 3GPP TSG RAN WG1 Meeting #103-e, R1-2007825, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946506, 15 Pages, Retrieved from the Internet: URL: https://ftp.3gpp.org/tsg_ran/WG1_RL1/TSGR1_103-e/Docs/R1-2007825.zip R1-2007825.docx [Retrieved on Oct. 24, 2020] pp. 1-3, the Agreements, section "2 .1. Multiplexing schemes", Figure 1 and Figure 2, section "2.2. Possible combinations for non-SFN chemes", section "2.3.Schemes to facilitate blind detection" , Proposals 3, 4, 5, 6.

(Continued)

*Primary Examiner* — Redentor Pasia
(74) *Attorney, Agent, or Firm* — Holland & Hart LLP

(57) ABSTRACT

Methods, systems, and devices for wireless communications are described. A user equipment (UE) may monitor a set of downlink control channel candidates that are associated with each other, the set of downlink control channel candidates including a first downlink control channel candidate in a first transmission time interval (TTI) and a last downlink control channel candidate in a second TTI subsequent to the first TTI. The UE may receive, based on the monitoring, at least one repetition of downlink control information (DCI) within one of the first downlink control channel candidate or the (Continued)

last downlink control channel candidate, the DCI scheduling a transmission between a base station and the UE. The UE may apply a scheduling offset associated with the transmission based on a timing of the last downlink control channel candidate, and may subsequently communicate with the base station via the transmission based on the scheduling offset.

25 Claims, 21 Drawing Sheets

(51) Int. Cl.
    *H04W 16/28*     (2009.01)
    *H04W 24/08*     (2009.01)
    *H04W 72/0446*     (2023.01)
    *H04W 72/23*     (2023.01)

(52) U.S. Cl.
    CPC ....... *H04W 24/08* (2013.01); *H04W 72/0446* (2013.01); *H04W 72/23* (2023.01)

(58) Field of Classification Search
    CPC .... H04W 24/08; H04L 5/0051; H04L 5/0023; H04L 27/26025; H04B 7/06952
    See application file for complete search history.

(56) References Cited

U.S. PATENT DOCUMENTS

| | | | |
|---|---|---|---|
| 2018/0192405 A1 | 7/2018 | Gong et al. | |
| 2020/0029315 A1 | 1/2020 | Lin et al. | |
| 2020/0163063 A1* | 5/2020 | Gao | H04W 72/23 |
| 2020/0229098 A1* | 7/2020 | Cheng | H04W 52/0248 |
| 2020/0236692 A1* | 7/2020 | Lin | H04W 72/535 |
| 2020/0267645 A1* | 8/2020 | Wu | H04W 36/00692 |
| 2020/0288479 A1 | 9/2020 | Xi et al. | |
| 2021/0007050 A1* | 1/2021 | Lin | H04W 76/28 |
| 2021/0051584 A1* | 2/2021 | Cheng | H04W 72/21 |
| 2021/0105716 A1* | 4/2021 | Wu | H04L 41/0806 |
| 2021/0195601 A1 | 6/2021 | Khoshnevisan et al. | |
| 2022/0038207 A1* | 2/2022 | Frenne | H04L 1/0072 |
| 2022/0149899 A1* | 5/2022 | Jung | H04L 5/0044 |
| 2022/0236366 A1* | 7/2022 | Cha | G01S 5/06 |
| 2023/0024010 A1* | 1/2023 | Ma | H04L 5/0053 |
| 2023/0031559 A1* | 2/2023 | Liu | H04L 1/1642 |
| 2023/0362950 A1* | 11/2023 | Moon | H04B 7/0695 |
| 2023/0371043 A1* | 11/2023 | Pan | H04L 5/0053 |
| 2023/0388076 A1* | 11/2023 | Yokomakura | H04L 5/0048 |

OTHER PUBLICATIONS

International Search Report and Written Opinion—PCT/US2022/070149—ISA/EPO—May 2, 2022.
Lenovo, et al., "Enhancements on Multi-TRP for PDCCH, PUCCH and PUSCH", 3GPP Draft, 3GPP TSG RAN WG1 #103-e, R1-2008911, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946723, 15 Pages, Retrieved from the Internet: URL: https://ftp.3gpp.org/tsg_ran/WG1_RL1/TSGR1_103-e/Docs/R1-2008911.zip R1-2008911 PDCCH PUCCH and PUSCH Enhancements with Multi-TRP_Final.doc [Retrieved on Oct. 24, 2020] pp. 2-3, the Agreements: "For mTRP PDCCH reliability enhancements, . . . ", . . . ,"For non-SFN based mTRP PDCCH reliability enhancements, . . . ", etc. section "2.1 Transmission schemes for enhanced PDCCH" , section "2.2 Configuration for CORESET and search space set", section "2.3 Coding/rate matching chain and UE decoding behavior", section "2.4 Linkage between PDCCH candidates"—the entire section.
Taiwan Search Report—TW111101308—TIPO—Apr. 14, 2025.
Moderator (Nokia): "Corrections on Cross-carrier Scheduling with Different Numerologies", 3GPP TSG-RAN WG1 Meeting #102-e, R1-2007243, e-Meeting, Aug. 17, 2020-Aug. 28, 2020, Aug. 27, 2020, 11 Pages.
Qualcomm Incorporated: "Cross-slot Scheduling Power Saving Techniques", 3GPP TSG-RAN WG1 #99, R1-1912971, Reno, USA, Nov. 18, 2019-Nov. 22, 2019, Nov. 9, 2019, pp. 1-19.

* cited by examiner

TECHNIQUES FOR TIMING RELATIONSHIPS FOR PHYSICAL DOWNLINK CONTROL CHANNEL REPETITION

CROSS REFERENCE

The present Application for Patent claims the benefit of U.S. Provisional Patent Application No. 63/136,636 by KHOSHNEVISAN et al., entitled "TECHNIQUES FOR TIMING RELATIONSHIPS FOR PHYSICAL DOWNLINK CONTROL CHANNEL REPETITION," filed Jan. 12, 2021, assigned to the assignee hereof, and expressly incorporated by reference herein.

TECHNICAL FIELD

The following relates to wireless communications, including techniques for timing relationships for physical downlink control channel (PDCCH) repetition.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems may support the repetition of various signals, such as control information or data. For example, a UE may be configured to monitor for multiple repetitions of a physical downlink control channel (PDCCH) transmission, where the monitoring occurs at respective PDCCH candidates. The repeated PDCCH transmissions may include downlink control information (DCI), which may schedule transmissions at the UE. When scheduling transmissions at the UE, a behavior of the UE may be dependent not only on the payload (e.g., data) of the DCI, but also on a relative timing of when the DCI was received. However, when multiple PDCCH candidates may be monitored and when multiple repetitions of PDCCH transmissions may be received, there may be ambiguity regarding when a specific timing should be triggered.

SUMMARY

The described techniques relate to improved methods, systems, devices, and apparatuses that support techniques for timing relationships for physical downlink control channel (PDCCH) repetition. Generally, the described techniques may provide a set of rules, configurations, and/or signaling for determining a relative timing of a transmission scheduled at a user equipment (UE) via multiple repetitions of control data (e.g., via multiple repetitions of downlink control information (DCI)). In some aspects, a relative timing of a transmission scheduled via one or more repetitions of DCI may be defined relative to a last PDCCH candidate of a set of PDCCH candidates in which one or more repetitions of DCI may be received. For example, a UE may monitor a set of related PDCCH candidates which are configured for repetitions of DCI, and may receive at least one repetition of DCI within the set of PDCCH candidates, where the DCI schedules a transmission at the UE. In this example, a scheduling offset defining a relative timing for the scheduled transmission may be based on a last PDCCH candidate of the set of related PDCCH candidates.

A method for wireless communication at a UE is described. The method may include monitoring a set of multiple downlink control channel candidates that are associated with each other, the set of multiple downlink control channel candidates including at least a first downlink control channel candidate in a first transmission time interval (TTI) and a last downlink control channel candidate in a second TTI that is after the first TTI, receiving, from a base station and based on the monitoring, at least one repetition of DCI within one of the first downlink control channel candidate or the last downlink control channel candidate, the DCI scheduling a transmission between the base station and the UE, applying a scheduling offset associated with the transmission based on a timing of the last downlink control channel candidate, and communicating with the base station via the transmission based on the scheduling offset.

An apparatus for wireless communication at a UE is described. The apparatus may include at least one processor, memory coupled (e.g., operatively, communicatively, functionally, electronically, or electrically, etc.) with the at least one processor, and instructions stored in the memory. The instructions may be executable by the processor to cause the apparatus to monitor a set of multiple downlink control channel candidates that are associated with each other, the set of multiple downlink control channel candidates including at least a first downlink control channel candidate in a first TTI and a last downlink control channel candidate in a second TTI that is after the first TTI, receive, from a base station and based on the monitoring, at least one repetition of DCI within one of the first downlink control channel candidate or the last downlink control channel candidate, the DCI scheduling a transmission between the base station and the UE, apply a scheduling offset associated with the transmission based on a timing of the last downlink control channel candidate, and communicate with the base station via the transmission based on the scheduling offset.

Another apparatus for wireless communication at a UE is described. The apparatus may include means for monitoring a set of multiple downlink control channel candidates that are associated with each other, the set of multiple downlink control channel candidates including at least a first downlink control channel candidate in a first TTI and a last downlink control channel candidate in a second TTI that is after the first TTI, means for receiving, from a base station and based on the monitoring, at least one repetition of DCI within one of the first downlink control channel candidate or the last downlink control channel candidate, the DCI scheduling a transmission between the base station and the UE, means for applying a scheduling offset associated with the transmission based on a timing of the last downlink control channel candidate, and means for communicating with the base station via the transmission based on the scheduling offset.

A non-transitory computer-readable medium storing code for wireless communication at a UE is described. The code may include instructions executable by at least one processor to monitor a set of multiple downlink control channel candidates that are associated with each other, the set of multiple downlink control channel candidates including at least a first downlink control channel candidate in a first TTI and a last downlink control channel candidate in a second TTI that is after the first TTI, receive, from a base station and based on the monitoring, at least one repetition of DCI within one of the first downlink control channel candidate or the last downlink control channel candidate, the DCI scheduling a transmission between the base station and the UE, apply a scheduling offset associated with the transmission based on a timing of the last downlink control channel candidate, and communicate with the base station via the transmission based on the scheduling offset.

In some examples of the method, apparatuses, and non-transitory computer-readable medium described herein, applying the scheduling offset based on the timing of the last downlink control channel candidate may include operations, features, means, or instructions for applying the scheduling offset regardless of whether a first repetition of the DCI may be detected within the first downlink control channel candidate, a second repetition of the DCI may be detected within the last downlink control channel candidate, or both the first repetition and the second repetition may be detected within the first downlink control channel candidate and the last downlink control channel candidate, respectively.

In some examples of the method, apparatuses, and non-transitory computer-readable medium described herein, communicating with the base station via the transmission may include operations, features, means, or instructions for receiving the channel state information reference signal (CSI-RS) in accordance with the scheduling offset which may be applied based on the timing of the last downlink control channel candidate.

Some examples of the method, apparatuses, and non-transitory computer-readable medium described herein may further include operations, features, means, or instructions for receiving, from the base station, a radio resource control (RRC) message indicating a set of trigger state configurations and receiving, via the at least one repetition of the DCI, an indication of a trigger state configuration included within the set of trigger state configurations, where receiving the CSI-RS may be based on the trigger state configuration.

In some examples of the method, apparatuses, and non-transitory computer-readable medium described herein, the scheduling offset includes an offset between a last symbol of the last downlink control channel candidate and a first symbol of the CSI-RS.

Some examples of the method, apparatuses, and non-transitory computer-readable medium described herein may further include operations, features, means, or instructions for determining a quasi co-location (QCL) configuration for receiving the CSI-RS based on a comparison of the scheduling offset and a beam switching threshold of the UE, where the CSI-RS may be received in accordance with the QCL configuration.

Some examples of the method, apparatuses, and non-transitory computer-readable medium described herein may further include operations, features, means, or instructions for determining, based on the scheduling offset being greater than or equal to the beam switching threshold of the UE, the QCL configuration based on one or more transmission configuration indication (TCI) states which may be determined based on the DCI.

Some examples of the method, apparatuses, and non-transitory computer-readable medium described herein may further include operations, features, means, or instructions for receiving, from the base station, a downlink transmission within a set of resources associated with the CSI-RS and determining, based on the scheduling offset being less than the beam switching threshold of the UE, the QCL configuration based on one or more TCI states which may be determined based on the downlink transmission.

Some examples of the method, apparatuses, and non-transitory computer-readable medium described herein may further include operations, features, means, or instructions for determining, based on the scheduling offset being less than the beam switching threshold of the UE, the QCL configuration associated with a control resource set within a last TTI of a search space set monitored by the UE.

Some examples of the method, apparatuses, and non-transitory computer-readable medium described herein may further include operations, features, means, or instructions for determining, based on the scheduling offset being less than the beam switching threshold of the UE, the QCL configuration associated with a lowest activated TCI state of a serving cell associated with the CSI-RS.

Some examples of the method, apparatuses, and non-transitory computer-readable medium described herein may further include operations, features, means, or instructions for transmitting, to the base station, an indication of the beam switching threshold of the UE and determining one or more parameters associated with reception of the CSI-RS based on the comparison of the scheduling offset and the beam switching threshold, where the CSI-RS may be received based on the one or more parameters.

Some examples of the method, apparatuses, and non-transitory computer-readable medium described herein may further include operations, features, means, or instructions for determining a timing delay associated with reception of the CSI-RS based on a subcarrier spacing (SCS) of a downlink control channel within which the at least one repetition of DCI was received, determining an adjusted beam switching threshold of the UE based on the timing delay, and determining one or more parameters associated with reception of the CSI-RS based on the comparison of the scheduling offset and the adjusted beam switching threshold, where the CSI-RS may be received based on the one or more parameters.

In some examples of the method, apparatuses, and non-transitory computer-readable medium described herein, communicating with the base station via the transmission may include operations, features, means, or instructions for receiving, from the base station, the downlink shared channel transmission, the CSI-RS, or both, in accordance with a minimum scheduling offset, the minimum scheduling offset being less than or equal to the scheduling offset which may be applied based on the timing of the last downlink control channel candidate.

Some examples of the method, apparatuses, and non-transitory computer-readable medium described herein may further include operations, features, means, or instructions for determining a first SCS associated with a downlink control channel on which the at least one repetition of the DCI was received and determining a second SCS associated with a channel on which the transmission scheduled by the DCI is to be performed, where the minimum scheduling offset may be based on a comparison of the first SCS and the second SCS.

In some examples of the method, apparatuses, and non-transitory computer-readable medium described herein, communicating with the base station via the transmission may include operations, features, means, or instructions for transmitting, to the base station, the set of sounding reference signals (SRSs) after the scheduling offset which may be applied based on the timing of the last downlink control channel candidate.

In some examples of the method, apparatuses, and non-transitory computer-readable medium described herein, the transmission scheduled by the DCI includes a set of SRSs and the method, apparatuses, and non-transitory computer-readable medium may include further operations, features, means, or instructions for receiving, from the base station, a RRC message including an indication of the scheduling offset.

In some examples of the method, apparatuses, and non-transitory computer-readable medium described herein, the transmission scheduled by the DCI includes a set of SRSs, and the scheduling offset includes a quantity of TTIs between the second TTI and a TTI of the transmission.

In some examples of the method, apparatuses, and non-transitory computer-readable medium described herein, the transmission scheduled by the DCI includes a set of SRSs and the method, apparatuses, and non-transitory computer-readable medium may include further operations, features, means, or instructions for receiving, from the base station, a CSI-RS, performing one or more measurements for the CSI-RS, determining one or more parameters associated with transmission of the set of SRSs based on the one or more measurements, and transmitting the set of SRSs based on the one or more parameters.

In some examples of the method, apparatuses, and non-transitory computer-readable medium described herein, the one or more parameters include a precoder for the set of SRSs.

In some examples of the method, apparatuses, and non-transitory computer-readable medium described herein, the CSI-RS may be received within the second TTI.

In some examples of the method, apparatuses, and non-transitory computer-readable medium described herein, the transmission scheduled by the DCI includes a set of SRSs and the method, apparatuses, and non-transitory computer-readable medium may include further operations, features, means, or instructions for receiving, from the base station, an indication of a TTI offset associated with reception of a CSI-RS, determining a resource for reception of the CSI-RS based on the TTI offset and the second TTI, receiving the CSI-RS within the resource, and transmitting the set of SRSs based on the CSI-RS.

In some examples of the method, apparatuses, and non-transitory computer-readable medium described herein, the DCI includes DCI which may be specific to the UE, group-common DCI, or both.

Some examples of the method, apparatuses, and non-transitory computer-readable medium described herein may further include operations, features, means, or instructions for receiving, via the DCI, a change in one or more values of a minimum scheduling offset indicator field of the DCI and determining that the change in the one or more values of the minimum scheduling offset indicator field is to be applied after the scheduling offset which may be applied based on the timing of the last downlink control channel candidate.

Some examples of the method, apparatuses, and non-transitory computer-readable medium described herein may further include operations, features, means, or instructions for receiving, from the base station, a RRC message indicating a first minimum scheduling offset and a second minimum scheduling offset associated with the transmission scheduled by the DCI, where the change in the one or more values of the minimum scheduling offset indicator field may be based on the first minimum scheduling offset and the second minimum scheduling offset.

In some examples of the method, apparatuses, and non-transitory computer-readable medium described herein, the transmission scheduled by the DCI includes a physical downlink shared channel (PDSCH) transmission, a physical uplink shared channel (PUSCH) transmission, or both, and the scheduling offset includes a minimum K0 value associated with the PDSCH transmission, a minimum K2 value associated with the PUSCH transmission, or both.

In some examples of the method, apparatuses, and non-transitory computer-readable medium described herein, the first TTI and the second TTI may be each a slot.

A method for wireless communication at a base station is described. The method may include transmitting, to a UE within a set of multiple downlink control channel candidates that are associated with each other, at least one repetition of DCI within a first downlink control channel candidate of the set of multiple downlink control channel candidates or a last downlink control channel candidate of the set of multiple downlink control channel candidates, the first downlink control channel candidate being in a first TTI and the last downlink control channel candidate being in a second TTI that is after the first TTI, the DCI scheduling a transmission between the base station and the UE, applying a scheduling offset associated with the transmission based on a timing of the last downlink control channel candidate, and communicating with the UE via the transmission based on the scheduling offset.

An apparatus for wireless communication at a base station is described. The apparatus may include at least one processor, memory coupled (e.g., operatively, communicatively, functionally, electronically, or electrically, etc.) with the at least one processor, and instructions stored in the memory. The instructions may be executable by the at least one processor to cause the apparatus to transmit, to a UE within a set of multiple downlink control channel candidates that are associated with each other, at least one repetition of DCI within a first downlink control channel candidate of the set of multiple downlink control channel candidates or a last downlink control channel candidate of the set of multiple downlink control channel candidates, the first downlink control channel candidate being in a first TTI and the last downlink control channel candidate being in a second TTI that is after the first TTI, the DCI scheduling a transmission between the base station and the UE, apply a scheduling offset associated with the transmission based on a timing of the last downlink control channel candidate, and communicate with the UE via the transmission based on the scheduling offset.

Another apparatus for wireless communication at a base station is described. The apparatus may include means for transmitting, to a UE within a set of multiple downlink control channel candidates that are associated with each other, at least one repetition of DCI within a first downlink control channel candidate of the set of multiple downlink control channel candidates or a last downlink control channel candidate of the set of multiple downlink control channel candidates, the first downlink control channel candidate being in a first TTI and the last downlink control channel candidate being in a second TTI that is after the first TTI, the DCI scheduling a transmission between the base station and the UE, means for applying a scheduling offset associated with the transmission based on a timing of the last downlink control channel candidate, and means for communicating with the UE via the transmission based on the scheduling offset.

A non-transitory computer-readable medium storing code for wireless communication at a base station is described. The code may include instructions executable by at least one processor to transmit, to a UE within a set of multiple downlink control channel candidates that are associated with each other, at least one repetition of DCI within a first downlink control channel candidate of the set of multiple downlink control channel candidates or a last downlink control channel candidate of the set of multiple downlink control channel candidates, the first downlink control channel candidate being in a first TTI and the last downlink control channel candidate being in a second TTI that is after the first TTI, the DCI scheduling a transmission between the base station and the UE, apply a scheduling offset associated with the transmission based on a timing of the last downlink control channel candidate, and communicate with the UE via the transmission based on the scheduling offset.

In some examples of the method, apparatuses, and non-transitory computer-readable medium described herein, transmitting the at least one repetition of DCI may include operations, features, means, or instructions for transmitting a first repetition of the DCI within the first downlink control channel candidate and transmitting a second repetition of the DCI within the last downlink control channel candidate.

In some examples of the method, apparatuses, and non-transitory computer-readable medium described herein, communicating with the UE via the transmission may include operations, features, means, or instructions for transmitting the CSI-RS in accordance with the scheduling offset which may be applied based on the timing of the last downlink control channel candidate.

Some examples of the method, apparatuses, and non-transitory computer-readable medium described herein may further include operations, features, means, or instructions for transmitting, to the UE, a RRC message indicating a set of trigger state configurations and transmitting, via the at least one repetition of the DCI, an indication of a trigger state configuration included within the set of trigger state configurations, where transmitting the CSI-RS may be based on the trigger state configuration.

In some examples of the method, apparatuses, and non-transitory computer-readable medium described herein, the scheduling offset includes an offset between a last symbol of the last downlink control channel candidate and a first symbol of the CSI-RS.

Some examples of the method, apparatuses, and non-transitory computer-readable medium described herein may further include operations, features, means, or instructions for determining a QCL configuration for transmitting the CSI-RS based on a comparison of the scheduling offset and a beam switching threshold of the UE, where the CSI-RS may be transmitted in accordance with the QCL configuration.

Some examples of the method, apparatuses, and non-transitory computer-readable medium described herein may further include operations, features, means, or instructions for determining, based on the scheduling offset being greater than or equal to the beam switching threshold of the UE, the QCL configuration based on one or more TCI states which may be determined based on the DCI.

Some examples of the method, apparatuses, and non-transitory computer-readable medium described herein may further include operations, features, means, or instructions for transmitting, to the UE, a downlink transmission within a set of resources associated with the CSI-RS and determining, based on the scheduling offset being less than the beam switching threshold of the UE, the QCL configuration based on one or more TCI states which may be determined based on the downlink transmission.

Some examples of the method, apparatuses, and non-transitory computer-readable medium described herein may further include operations, features, means, or instructions for determining, based on the scheduling offset being less than the beam switching threshold of the UE, the QCL configuration associated with a control resource set within a last TTI of a search space set monitored by the UE.

Some examples of the method, apparatuses, and non-transitory computer-readable medium described herein may further include operations, features, means, or instructions for determining, based on the scheduling offset being less than the beam switching threshold of the UE, the QCL configuration associated with a lowest activated TCI state of a serving cell associated with the CSI-RS.

Some examples of the method, apparatuses, and non-transitory computer-readable medium described herein may further include operations, features, means, or instructions for receiving, from the UE, an indication of the beam switching threshold of the UE and determining one or more parameters associated with transmission of the CSI-RS based on the comparison of the scheduling offset and the beam switching threshold, where the CSI-RS may be transmitted based on the one or more parameters.

Some examples of the method, apparatuses, and non-transitory computer-readable medium described herein may further include operations, features, means, or instructions for determining a timing delay associated with transmission of the CSI-RS based on a SCS of a downlink control channel within which the at least one repetition of DCI was transmitted, determining an adjusted beam switching threshold of the UE based on the timing delay, and determining one or more parameters associated with transmission of the CSI-RS based on the comparison of the scheduling offset and the adjusted beam switching threshold, where the CSI-RS may be transmitted based on the one or more parameters.

In some examples of the method, apparatuses, and non-transitory computer-readable medium described herein, communicating with the UE via the transmission may include operations, features, means, or instructions for transmitting, to the UE, the downlink shared channel transmission, the CSI-RS, or both, in accordance with a minimum scheduling offset, the minimum scheduling offset being less than or equal to the scheduling offset which may be applied based on the timing of the last downlink control channel candidate.

Some examples of the method, apparatuses, and non-transitory computer-readable medium described herein may further include operations, features, means, or instructions for determining a first SCS associated with a downlink control channel on which the at least one repetition of the DCI was received and determining a second SCS associated with a channel on which the transmission scheduled by the DCI is to be performed, where the minimum scheduling offset may be based on a comparison of the first SCS and the second SCS.

In some examples of the method, apparatuses, and non-transitory computer-readable medium described herein, communicating with the base station via the transmission may include operations, features, means, or instructions for receiving, from the UE, the set of SRSs after the scheduling offset which may be applied based on the timing of the last downlink control channel candidate.

In some examples of the method, apparatuses, and non-transitory computer-readable medium described herein, the transmission scheduled by the DCI includes a set of SRSs and the method, apparatuses, and non-transitory computer-readable medium may include further operations, features, means, or instructions for transmitting, to the UE, a RRC message including an indication of the scheduling offset.

In some examples of the method, apparatuses, and non-transitory computer-readable medium described herein, the transmission scheduled by the DCI includes a set of SRSs, and the scheduling offset includes a quantity of TTIs between the second TTI and a TTI of the transmission.

In some examples of the method, apparatuses, and non-transitory computer-readable medium described herein, the transmission scheduled by the DCI includes a set of SRSs and the method, apparatuses, and non-transitory computer-readable medium may include further operations, features, means, or instructions for transmitting, to the UE, a CSI-RS, determining one or more parameters associated with transmission of the set of SRSs based on the CSI-RS, and receiving the set of SRSs based on the one or more parameters.

In some examples of the method, apparatuses, and non-transitory computer-readable medium described herein, the one or more parameters include a precoder for the set of SRSs.

In some examples of the method, apparatuses, and non-transitory computer-readable medium described herein, the CSI-RS may be transmitted within the second TTI.

In some examples of the method, apparatuses, and non-transitory computer-readable medium described herein, the transmission scheduled by the DCI includes a set of SRSs and the method, apparatuses, and non-transitory computer-readable medium may include further operations, features, means, or instructions for transmitting, to the UE, an indication of a TTI offset associated with transmission of a CSI-RS, determining a resource for transmission of the CSI-RS based on the TTI offset and the second TTI, transmitting the CSI-RS within the resource, and receiving the set of SRSs based on the CSI-RS.

In some examples of the method, apparatuses, and non-transitory computer-readable medium described herein, the DCI includes DCI which may be specific to the UE, group-common DCI, or both.

Some examples of the method, apparatuses, and non-transitory computer-readable medium described herein may further include operations, features, means, or instructions for transmitting, via the DCI, a change in one or more values of a minimum scheduling offset indicator field of the DCI and determining that the change in the one or more values of the minimum scheduling offset indicator field is to be applied after the scheduling offset which may be applied based on the timing of the last downlink control channel candidate.

Some examples of the method, apparatuses, and non-transitory computer-readable medium described herein may further include operations, features, means, or instructions for transmitting, to the UE, a RRC message indicating a first minimum scheduling offset and a second minimum scheduling offset associated with the transmission scheduled by the DCI, where the change in the one or more values of the minimum scheduling offset indicator field may be based on the first minimum scheduling offset and the second minimum scheduling offset.

In some examples of the method, apparatuses, and non-transitory computer-readable medium described herein, the transmission scheduled by the DCI includes a PDSCH transmission, a PUSCH transmission, or both, and the scheduling offset includes a minimum K0 value associated with the PDSCH transmission, a minimum K2 value associated with the PUSCH transmission, or both.

In some examples of the method, apparatuses, and non-transitory computer-readable medium described herein, the first TTI and the second TTI may be each a slot.

DETAILED DESCRIPTION

Figure 1:
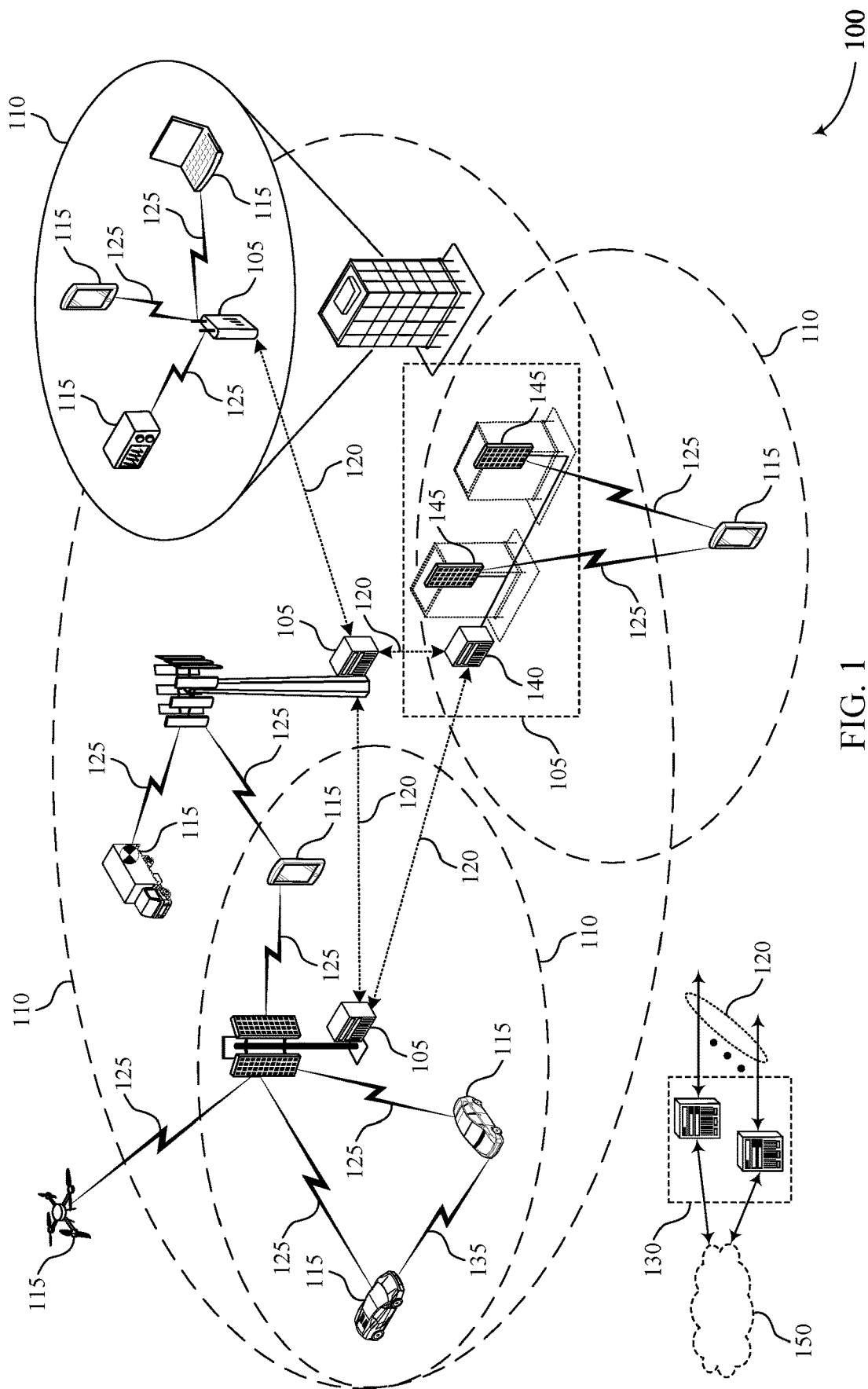
FIG. 1 illustrates an example of a wireless communications system that supports techniques for timing relationships for physical downlink control channel (PDCCH) repetition in accordance with aspects of the present disclosure.

Some wireless systems may support the repetition of various signals, such as control information or data. For example, a UE may be configured to monitor for multiple repetitions of a physical downlink control channel (PDCCH) transmission, where the monitoring occurs at respective PDCCH candidates. The repeated PDCCH transmissions may include downlink control information (DCI), which may schedule transmissions at a UE. When scheduling transmissions at a UE, a behavior of the UE may be dependent not only on the payload (e.g., data) of the DCI, but also on a relative timing of when the DCI was received. For example, in cases where a DCI schedules the UE to transmit sounding reference signals (SRSs), the timing of the SRSs may be based on a time at which the DCI was received. However, when multiple PDCCH candidates may be monitored and when multiple repetitions of PDCCH (e.g., multiple repetitions of DCI) may be received, there may be ambiguity regarding when a specific timing should be triggered.

Accordingly, techniques described herein may provide a set of rules, configurations, and/or signaling for determining a relative timing of a transmission scheduled at a UE via multiple repetitions of control data (e.g., via multiple repetitions of DCI). In some aspects, a relative timing of a transmission scheduled via one or more repetitions of DCI may be defined relative to a last PDCCH candidate of a set of PDCCH candidates in which one or more repetitions of DCI may be received. For example, a UE may monitor a set of related PDCCH candidates which are configured for repetitions of DCI, and may receive at least one repetition of DCI within the set of PDCCH candidates, where the DCI schedules a transmission at the UE. In this example, a scheduling offset defining a relative timing for the scheduled transmission may be based on a last PDCCH candidate of the set of related PDCCH candidates.

In some implementations, the scheduling offset for the transmission scheduled by repetitions of DCI may be dependent upon a type of the transmission (e.g., channel state information (CSI) reports, CSI reference signals (CSI-RSs), physical downlink shared channel (PDSCH) transmissions, physical uplink shared channel (PUSCH) transmissions, SRSs) scheduled by the repetitions of DCI. Depending on the type of the transmission that is scheduled, the scheduling offset may define a quantity of symbols between a last symbol of the last PDCCH candidate and a first symbol of the scheduled transmission, a quantity of slots between the last PDCCH candidate and a first slot in which the scheduled transmission may be transmitted or received, or both. A UE may be preconfigured with various rules for determining scheduling offsets for transmissions scheduled by repetitions of DCI. Additionally or alternatively, the rules for determining scheduling offsets may be signaled to the UE by the network (e.g., via radio resource control (RRC) signaling).

Aspects of the disclosure are initially described in the context of wireless communications systems. Additional aspects of the disclosure are described in the context of example resource allocation schemes and example process flows. Aspects of the disclosure are further illustrated by and described with reference to apparatus diagrams, system diagrams, and flowcharts that relate to techniques for timing relationships for PDCCH repetition.

FIG. 1 illustrates an example of a wireless communications system 100 that supports techniques for timing relationships for PDCCH repetition in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (e.g., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets. Components within a wireless communication system may be coupled (for example, operatively, communicatively, functionally, electronically, and/or electrically) to each other.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115.

A carrier may be operated in a standalone mode where initial acquisition and connection may be conducted by the UEs 115 via the carrier, or the carrier may be operated in a non-standalone mode where a connection is anchored via a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing (SCS) are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, a UE 115 of the wireless communications system 100 may be configured with up to three CORESETS within a given BWP. A CORESET may include one or more activated transmission configuration indicator (TCI) states for PDCCH repetition, and may be associated with a quantity of resource blocks (RBs) in the frequency domain, and a quantity of symbols or other TTI in the time domain (e.g., quantity of OFDM symbols). Resources for a CORESET may be configured via RRC signaling. In some aspects, a CORESET configured at the UE 115 may be associated with a CCE resource element group (CCE-REG) mapping type (e.g., CCE-REG bundle mapping type), a precoding granularity, an identifier (e.g., scrambling identifier) associated with scrambling for PDCCH demodulation reference signals (DMRS), coded bits of DCI content, or any combination thereof.

In some aspects, a UE 115 may be configured with up to ten search space sets within a given BWP of a component carrier. In some aspects, each search space set may be associated with one CORESET, and may include a set of monitoring occasions. In some aspects, a search space set may include a set of control channel monitoring occasions (e.g., PDCCH monitoring occasions). Moreover, a UE 115 may be configured to determine the control channel monitoring occasions associated with a given search space set based on one or more characteristics of the search space set which may be configured (e.g., pre-configured) at the UE 115, indicated to the UE 115 via a base station 105 (e.g., via RRC), or both. A UE 115 may be configured with one or more different types of search space sets (e.g., searchSpaceType), including UE-specific search space sets, common search space sets, or both. Additionally, each search space set may be associated with one or more DCI formats which are to be monitored.

In some aspects, various parameters of a search space set configuration may be configured (e.g., via RRC signaling), including, but not limited to, a CORESET associated with each search space set, a periodicity and offset of monitoring occasions, monitoring symbols within a slot (e.g., time domain monitoring), DCI formats which are to be monitored by a UE 115, a quantity of PDCCH candidates for a given aggregation level, PDCCH candidates associated with each search space set, aggregation levels for each PDCCH candidate, candidate indexes, and the like.

Parameters of a search space set (s) may include a periodicity ($k_s$) of monitoring occasions (e.g., $k_s$ slots), an offset ($o_s$) for monitoring occasions in units of slots (e.g., $o_s$ slots) (e.g., monitoringSlotPeriodicityAndOffset), a duration ($T_s$) indicative of a quantity of slots within a period in which the search space set exists (where $T_s<k_s$), or any combination thereof. A UE 115 of the wireless communications system 100 may determine a quantity of PDCCH monitoring occasions within a slot $\eta_{s,f}^{\mu}$ and a frame $\eta_f$ if $\eta_f$ $N_{slot}^{frame,\mu}+\eta_{s,f}^{\lambda}o_s$ mod $k_s=0$. In some aspects, when monitoring a control channel, a UE 115 may be configured to monitor control channel candidates (e.g., PDCCH candidates) for a search space set s for $T_s$ consecutive slots, starting from slot $\eta_{s,f}^{\mu}$, and may refrain from monitoring control channel candidates for the search space set s for the next $k_s-T_s$ consecutive slots. Quantities of control channel candidates (e.g., PDCCH candidates) may be based on an aggregation level (e.g., quantity of CCEs) of wireless communications at the UE 115.

In some aspects, a UE 115 may be configured to monitor a control channel according to a control channel monitoring pattern (e.g., PDCCH monitoring pattern) within a slot (e.g., monitoringSymbolsWithinSlot). For example, a PDCCH monitoring pattern within a slot may indicate a first symbol(s) of a CORESET within a slot for PDCCH monitoring. For instance, in the context of a slot including fourteen symbols, a CORESET configured at a UE 115 may be associated with a search space set including three symbols, and a control channel monitoring pattern (e.g., monitoringSymbolsWithinSlot) associated with the search space set may be configured as "01000010001000." In this example, the UE 115 may be configured to determine that there are three monitoring occasions within each slot that the search space set exists. Moreover, the UE 115 may be configured to determine that the three monitoring occasions begin at the second, seventh, and eleventh symbols of each respective slot that the search space exists.

In the context of a SFN, SFN PDCCH transmissions (e.g., PDCCH DMRS) may be associated with two TCI states. In particular, for SFN PDCCH transmissions, one CORESET may be activated at a UE 115 with two active TCI states. In such cases, each control channel candidate (e.g., PDCCH candidate) of a search space set associated with the CORESET may be associated with the two active TCI states of the CORESET.

Similarly, for PDCCH repetitions in which each PDCCH repetition includes a PDCCH candidate, two PDCCH candidates (e.g., two PDCCH repetitions) may be linked (e.g., related) together for possible repetitions of the same control channel transmission (e.g., repetitions of DCI). In the context of PDCCH repetitions, the payload (e.g., DCI payload) of the two PDCCH candidates (e.g., two PDCCH repetitions) may be the same. For example, a first PDCCH candidate may be related, or linked, to a second PDCCH candidate. In this example, a first repetition of DCI may be transmitted in the first PDCCH candidate, and a second repetition of DCI may be transmitted in the second PDCCH candidate, where the first and second repetitions of DCI are the same. In this example, a UE 115 may receive and/or decode only the first repetition of DCI or only the second repetition of DCI. Additionally or alternatively, the UE 115 may receive and/or decode both the first and second repetitions of DCI by performing soft combining of the first and second repetitions of DCI. From the perspective of the network (e.g., base station 105), the network may not know whether a UE 115 will decode a first PDCCH repetition (first PDCCH candidate), a second PDCCH repetition (second PDCCH candidate), or both (via soft combining).

In this regard, a UE 115 may monitor PDCCH candidates for blind decoding within a search space set to receive one or more repetitions of a control channel transmissions (e.g., DCI), where at least one control channel transmission (e.g., at least one PDCCH candidate) may pass a cyclic redundancy check (CRC) for successful decoding. In some aspects, related/linked PDCCH candidates may have the same aggregation level (e.g., same quantities of CCEs).

In some aspects, related PDCCH candidates in different search space sets which are associated with corresponding CORESETs may be linked together (e.g., related) for PDCCH repetition. In some cases, two PDCCH candidates with a same candidate index across two related search space sets may be linked or related. In other cases, PDCCH candidates with a same start CCE index may be linked. In some aspects, sets of related/linked PDCCH candidates may be configured via control signaling (e.g., RRC signaling). For example, a UE 115 may receive an RRC message which indicates that a first PDCCH candidate in a first search space set is linked with (e.g., related to) a second PDCCH candidate in a second search space set. Moreover, UEs 115 may be configured with sets of linked/related PDCCH candidates which are within a same slot or TTI (e.g., intra-slot PDCCH repetition), sets of linked/related PDCCH candidates which are in different slots (e.g., intra-slot PDCCH repetition), or both.

As noted previously herein, when scheduling transmissions at a UE 115 via DCI, a behavior of the UE 115 may be dependent not only on the payload (e.g., data) of the DCI, but also on a relative timing of when the DCI was received. As such, when multiple PDCCH candidates may be monitored and when multiple repetitions of PDCCH (e.g., multiple repetitions of DCI) may be received, there may be ambiguity regarding when a specific timing should be triggered.

Accordingly, the wireless communications system 100 may support techniques which provide a set of rules, configurations, and/or signaling for determining a relative timing of a transmission scheduled at a UE 115 via multiple repetitions of control data (e.g., via multiple repetitions of DCI). In some aspects, a relative timing of a transmission scheduled via one or more repetitions of DCI may be defined relative to a last PDCCH candidate of a set of PDCCH candidates in which one or more repetitions of DCI may be received.

For example, a UE 115 of the wireless communications system 100 may monitor a set of related PDCCH candidates which are configured for repetitions of DCI, and may receive at least one repetition of DCI within the set of PDCCH candidates from a base station 105, where the DCI schedules a transmission at the UE 115. In this example, a scheduling offset defining a relative timing for the scheduled transmission may be based on a last PDCCH candidate of the set of related PDCCH candidates. Subsequently, the UE 115 may apply the determined scheduling offset to perform wireless communications with the base station 105. In particular, the UE 115 may apply the determined scheduling offset when performing the transmission (e.g., uplink transmission, downlink transmission) scheduled by the one or more repetitions of DCI.

In some implementations, the scheduling offset for the transmission scheduled by repetitions of DCI may be dependent upon a type of the transmission (e.g., CSI reports, CSI-RSs, PDSCH transmissions, PUSCH transmissions, SRSs) scheduled by the repetitions of DCI. Depending on the type of the transmission that is scheduled, the scheduling offset may define a quantity of symbols between a last symbol of the last PDCCH candidate and a first symbol of the scheduled transmission, a quantity of slots between the last PDCCH candidate and a first slot in which the scheduled transmission may be transmitted or received, or both. In some implementations, the UEs 115 of the wireless communications system 100 may be preconfigured with various rules for determining scheduling offsets for transmissions scheduled by repetitions of DCI. Additionally or alternatively, the rules for determining scheduling offsets may be signaled to the UEs 115 by the network (e.g., via RRC signaling from a base station 105).

Techniques described herein may provide for improved scheduling of wireless communications. In particular, by defining signaling, rules, and/or configurations which enable UEs 115 and base stations 105 to determine a timing of transmissions scheduled via PDCCH repetitions, techniques described herein may enable UEs 115 and base stations 105 to efficiently determine a timing of scheduled transmissions. Moreover, by enabling wireless devices to more efficiently determine a timing of transmissions scheduled via PDCCH repetitions, techniques described herein may enable more widespread use of communications using PDCCH repetitions within the wireless communications system 100, thereby improving a reliability of wireless communications, improving transmission diversity, and further protecting wireless communications against interference.

Figure 2:
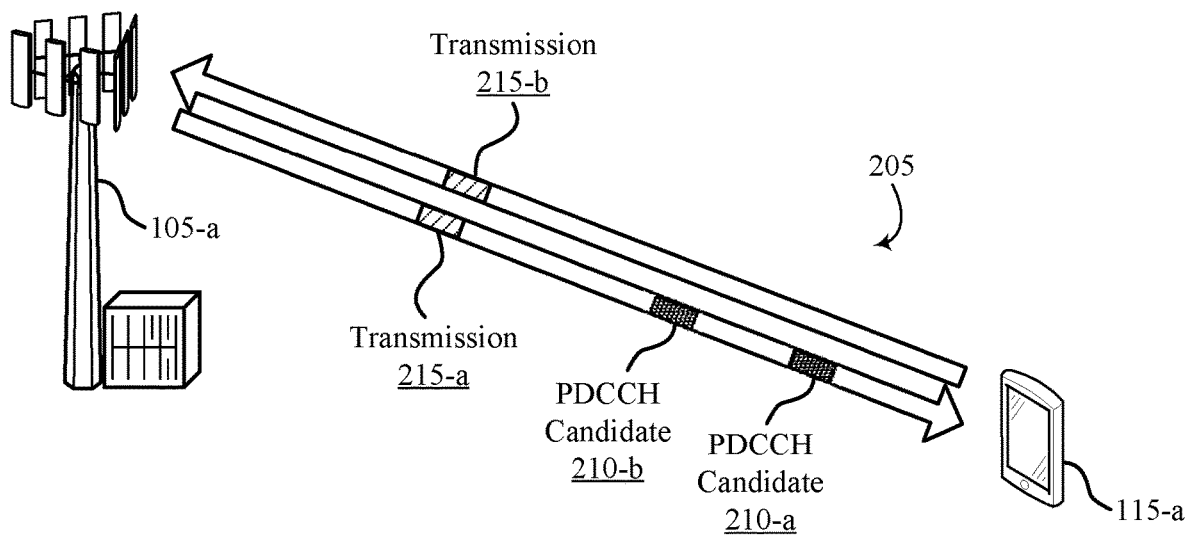
FIG. 2 illustrates an example of a wireless communications system that supports techniques for timing relationships for PDCCH repetition in accordance with aspects of the present disclosure.
Figure 2:
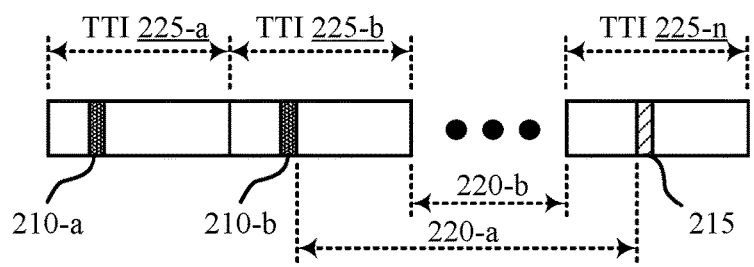

FIG. 2 illustrates an example of a wireless communications system 200 that supports techniques for timing relationships for PDCCH repetition in accordance with aspects of the present disclosure. In some examples, wireless communications system 200 may implement, or be implemented by, aspects of wireless communications system 100. For example, wireless communications system 200 may support signaling and techniques for determining a timing of transmissions which are scheduled via one or more repetitions of a PDCCH transmission.

The wireless communications system 200 may include a base station 105-a and a UE 115-a, which may be examples base stations 105 and UEs 115 as described with reference to FIG. 1. The UE 115-a may communicate with the base station 105-a using a communication link 205, which may be an example of an NR or LTE link between the UE 115-*a* and the base station 105-*a*. In some cases, the communication link 205 between the UE 115-*a* and the base station 105-*a* may include an example of an access link (e.g., Uu link) which may include a bi-directional link that enables both uplink and downlink communication. For example, the UE 115-*a* may transmit uplink signals, such as uplink control signals or uplink data signals, to the base station 105-*a* using the communication link 205 and the base station 105-*a* may transmit downlink signals, such as downlink control signals or downlink data signals, to the UE 115-*a* using the communication link 205.

In some aspects, the wireless communications system 200 may support techniques which provide a set of rules, configurations, and/or signaling for determining a relative timing of a transmission scheduled at the UE 115-*a* via multiple repetitions of control data (e.g., via multiple repetitions of DCI). In some aspects, a relative timing of a transmission scheduled via one or more repetitions of DCI may be defined relative to a last PDCCH candidate of a set of PDCCH candidates in which one or more repetitions of DCI may be received. For the purposes of the present disclosure, the term "last PDCCH candidate" may refer to a PDCCH candidate from a set of PDCCH candidates which starts latest in time, ends latest in time, or both. By providing signaling and a set of rules for determining a timing of transmissions scheduled via multiple repetitions of PDCCH transmissions, techniques described herein may enable improved scheduling of wireless communications at the UE 115-*a* and enable more widespread use of PDCCH repetitions.

For example, the UE 115-*a* may monitor a set of PDCCH candidates 210 that are associated with each other. For instance, as shown in FIG. 2, the UE 115-*a* may monitor a first PDCCH candidate 210-*a* and a last PDCCH candidate 210-*b*, where the first PDCCH candidate 210-*a* and the last PDCCH candidate 210-*b* are associated (e.g., linked, related) with each other for PDCCH repetition. In some aspects, the first PDCCH candidate 210-*a* may be positioned within a first TTI 225-*a* (e.g., first slot), and the last PDCCH candidate 210-*b* may be positioned within a second TTI 225-*b* (e.g., second slot) which is subsequent to (e.g., after) the first TTI 225-*a*.

In some aspects, the UE 115-*a* may receive, from the base station 105-*a*, at least one repetition of a downlink control channel transmission (e.g., DCI) based on the monitoring. In particular, the UE 115-*a* may receive at least one repetition of DCI within the first PDCCH candidate 210-*a*, the last PDCCH candidate 210-*b*, or both. In some aspects, the at least one repetition of DCI may schedule a transmission 215 (e.g., uplink transmission 215-*b*, downlink transmission 215-*a*) between the UE 115-*a* and the base station 105-*a*. The transmission 215 scheduled via the one or more repetitions of DCI may include, but is not limited to, CSI-RSs, CSI reports, PDSCH transmissions, PUSCH transmissions, SRSs, and the like.

In some aspects, the UE 115-*a* and the base station 105-*a* may be configured to determine and/or apply a scheduling offset associated with the transmission 215 in order to determine a relative timing of the scheduled transmission 215. In some aspects, a relative timing of the transmission 215 scheduled via one or more repetitions of DCI may be defined relative to the last PDCCH candidate 210-*b* of the set of PDCCH candidates 210 in which one or more repetitions of DCI may be received. For example, as shown in FIG. 2, the UE 115-*a* and the base station 105-*a* may be configured to determine/apply a scheduling offset 220-*a* of the transmission 215 relative to a last symbol of the last PDCCH candidate 210-*b*. In additional or alternative implementations, the UE 115-*a* and the base station 105-*a* may be configured to determine/apply a scheduling offset 220-*b* of the transmission 215, where the scheduling offset 220-*b* defines a quantity of TTIs 225 (e.g., quantity of slots) which separate a TTI 225 of the last PDCCH candidate 210-*b* (e.g., second TTI 225-*b*) and a TTI 225 of the scheduled transmission 215 (e.g., nth TTI 225-*n*).

Defining the scheduling offset 220 based on the last PDCCH candidate 210-*b* of the set of PDCCH candidates 210 (as opposed to a first/earliest PDCCH candidate 210 or some other PDCCH candidate) is non-trivial. In particular, the UE 115-*a* may be required to adjust reception parameters (e.g., perform beam switching procedures) between being a first time at which the UE 115-*a* is scheduled to perform a communication, and a second time at which the UE 115-*a* is set to perform the communication. As such, the UE 115-*a* may require some minimum amount of time between the latest time at which the UE 115-*a* may be scheduled with a communication, and the time at which the communication is scheduled. In this regard, by defining the scheduling offset 220 relative to the last PDCCH candidate 210 in which the UE 115-*a* may receive a DCI scheduling a communication may ensure that the UE 115-*a* has sufficient time between a scheduling DCI and a scheduled communication to adjust reception parameters. Comparatively, if the scheduling offset 220 were defined relative to the first/earliest PDCCH candidate 210-*a* (or some other PDCCH candidate 210), the UE 115-*a* may receive a scheduling DCI after a start of the scheduling offset 220, and may not be afforded sufficient time to adjust reception parameters between the scheduling DCI 220 and the scheduled communication.

In some implementations, the scheduling offset 220 for the transmission 215 scheduled by repetitions of DCI may be dependent upon a type of the transmission 215. For example, as will be described in further detail herein with respect to FIGS. 3-10, the UE 115-*a* and the base station 105-*a* may be configured to apply the scheduling offset 220-*a* when the scheduled transmission 215 includes a CSI-RS, and may be configured to apply the scheduling offset 220-*b* when the scheduled transmission 215 includes an SRS.

In some cases, the UE 115-*a* may be preconfigured with various rules for determining scheduling offsets 220 for transmissions 215 scheduled by repetitions of DCI received within the PDCCH candidates 210. Additionally or alternatively, the rules for determining scheduling offsets 220 may be signaled to the UE 115-*a* by the base station 105-*a* (e.g., via RRC signaling). The various rules and signaling used by the UE 115-*a* and the base station 105-*a* to determine the scheduling offsets 220 (and therefore relative timing) of the transmissions 215 scheduled by repetitions of DCI received within the PDCCH candidates 210 may be further shown and described with reference to FIGS. 3-10.

Figure 3:
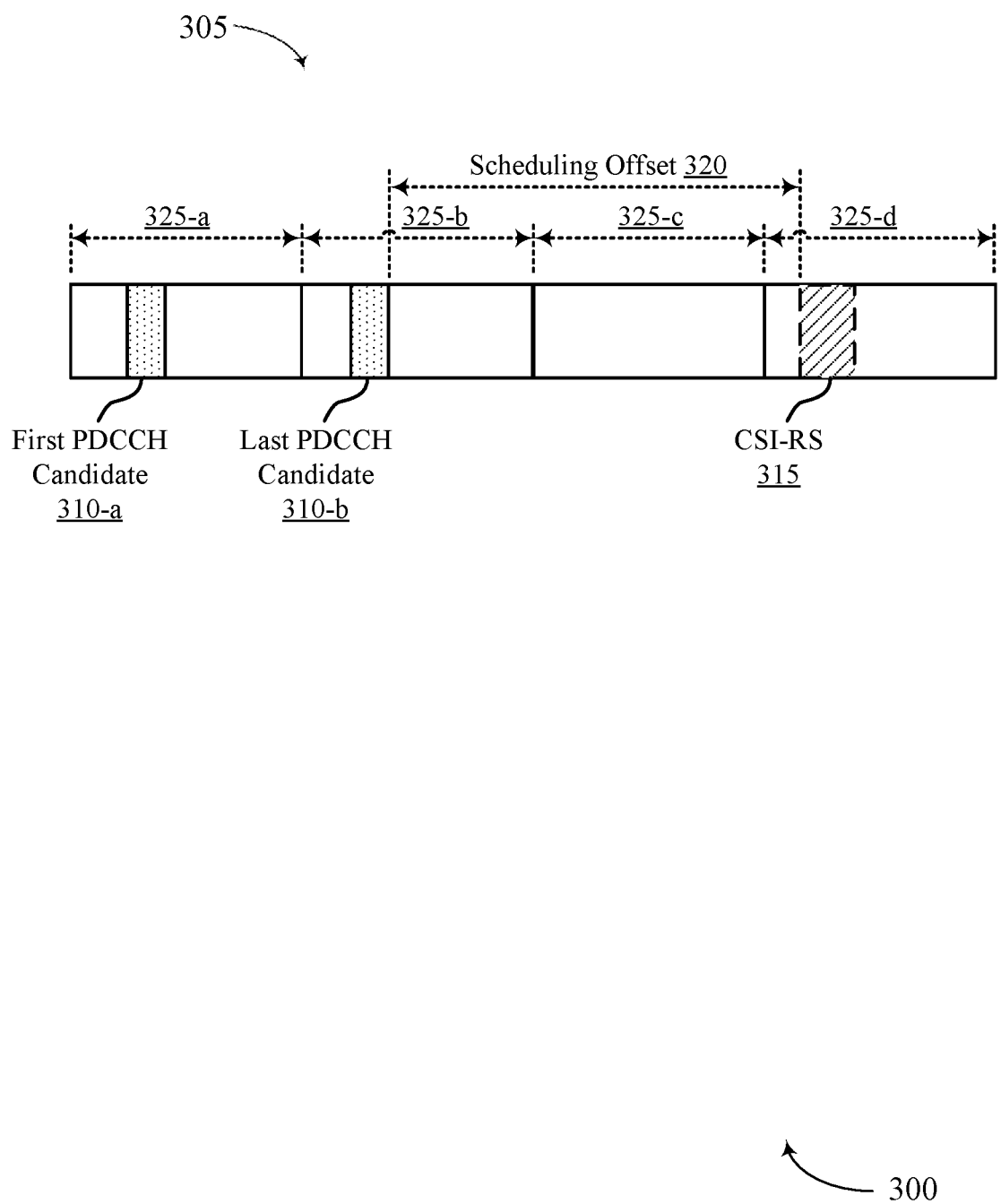
FIG. 3 illustrates an example of a resource allocation scheme that supports techniques for timing relationships for PDCCH repetition in accordance with aspects of the present disclosure.

FIG. 3 illustrates an example of a resource allocation scheme 300 that supports techniques for timing relationships for PDCCH repetition in accordance with aspects of the present disclosure. In some examples, resource allocation scheme 300 may implement, or be implemented by, aspects of wireless communications systems 100, wireless communications system 200, or both. The resource allocation scheme 300 includes a resource configuration 305 which illustrates a scheduling offset 320 for a CSI-RS 315 scheduled via one or more repetitions of DCI received within a set of linked PDCCH candidates 310.

For example, as noted previously herein, the UE 115 may monitor a set of downlink control channel candidates (e.g., PDCCH candidates 310) that are associated with each other. In other words, the UE 115 may monitor a set of PDCCH candidates 310 which are linked to one another for PDCCH repetition. In some aspects, the set of PDCCH candidates 310 monitored by the UE 115 may include at least a first PDCCH candidate 310-*a* in a first TTI (e.g., first slot 325-*a*) and a last PDCCH candidate 310-*b* in a second TTI (e.g., second slot 325-*b*) which is subsequent to (e.g., after) the first TTI.

Subsequently, the UE 115 may receive, from a base station 105, one or more repetitions of DCI. The UE 115 may receive the one or more repetitions of DCI within the first PDCCH candidate 310-*a*, the last PDCCH candidate 310-*b*, or both. In this regard, the UE 115 may receive the one or more repetitions of DCI based on monitoring the set of PDCCH candidates 310. The one or more repetitions of DCI may include any DCI format which may be received and/or decoded by the UE 115 (e.g., DCI format 0_1, 0_2).

In some aspects the repetitions of DCI may schedule a transmission between the base station 105 and the UE 115. For example, as shown in FIG. 3, the repetitions of DCI received within the PDCCH candidates 310 may schedule a CSI-RS 315 in a fourth slot 325-*d*. In some aspects, the repetitions of DCI may indicate a set of resources usable by the UE 115 to receive the CSI-RS 315. In some cases, the one or more repetitions of DCI (e.g., UL DCI) may include an indication of a trigger state configuration. In particular, the repetitions of DCI may indicate a trigger state configuration for CSI-RS 315 which is included within a set of trigger state configurations indicated via an RRC message received from the base station 105 (e.g., may indicate a trigger state configuration included within a set of RRC-configured trigger state configurations). The trigger state configuration may be indicated within a CSI request field of the DCI.

In some aspects, the UE 115 and/or base station 105 may be configured to determine one or more TCI states based on the trigger state configuration indicated in the DCI. In particular, each CSI-RS resource may be associated with a trigger state, and may be configured (e.g., via RRC) with an associated TCI state. In this regard, the indications of the trigger state configuration within the DCI may indicate (e.g., be associated with) one or more TCI states for transmission/reception of the CSI-RS 315.

In some aspects, the UE 115, the base station 105, or both, may determine and/or apply a scheduling offset 320 associated with the CSI-RS 315 scheduled by the repetitions of DCI. The UE 115 and/or the base station 105 may determine/apply the scheduling offset based on an RRC message, monitoring the PDCCH candidates 310, transmitting/receiving the repetitions of DCI within the PDCCH candidates 310, or any combination thereof.

In some aspects, the UE 115 and/or the base station 105 may be configured to apply the scheduling offset 320 regardless of where repetitions of DCI are detected within the set of PDCCH candidates 310. In particular, in some cases, the UE 115 and/or the base station 105 may be configured to apply the scheduling offset 320 based on a timing of the last PDCCH candidate 310-*b* regardless of where (or how many) repetitions of DCI are detected within the set of PDCCH candidates 310. For example, the UE 115 and/or the base station 105 may be configured to apply the scheduling offset 320 regardless of whether a first repetition of the DCI is detected within the first PDCCH candidate 310-*a*, a second repetition of the DCI is detected within the last PDCCH candidate 310-*b*, or whether both the first repetition and the second repetition of DCI are detected within the first PDCCH candidate 310-*a* and the last PDCCH candidate 310-*b*, respectively.

In some aspects, the scheduling offset 320 may be based on a timing of the last PDCCH candidate 310-*b* of the set of PDCCH candidates 310. In particular, the scheduling offset 320 may be based on a positioning of the last PDCCH candidate 310-*b* within the second slot 325-*b*, based on a timing of a first symbol and/or last symbol of the second slot 325-*b* associated with the last PDCCH candidate 310-*b*, or both. For example, as shown in FIG. 3, the scheduling offset 320 may include an offset between a last symbol of the last PDCCH candidate 310-*b* and a first symbol of the CSI-RS 315.

In some aspects, the UE 115 and/or the base station 105 may be configured to determine one or more parameters associated with transmission/reception of the CSI-RS 315 based on a comparison of a duration of the scheduling offset 320 in the time domain relative to a duration of a beam switching threshold associated with the UE 115. For example, the UE 115 and the base station 105 may be configured to determine a QCL configuration associated with the CSI-RS 315 based on a comparison of the scheduling offset 320 and a beam switching threshold and/or adjusted beam switching threshold associated with the UE 115. Details associated with determining parameters for the CSI-RS 315 will be discussed in further detail herein with respect to FIG. 7.

Upon determining the scheduling offset 320, the UE 115 may receive, from the base station 105, the CSI-RS 315 scheduled by the repetitions of DCI. The UE 115 may receive, and the base station 105 may transmit, the CSI-RS 315 based on (e.g., in accordance with) the scheduling offset 320, which is applied based on the timing of the last PDCCH candidate 310-*b*. For example, as noted previously herein, the scheduling offset 320 may define an offset between a last symbol of the last PDCCH candidate 310-*b* and the first symbol of the CSI-RS 315. Additionally or alternatively, the UE 115 may receive the CSI-RS 315 based on parameters indicated via RRC singling and/or the repetitions of DCI, based on parameters (e.g., QCL configurations) determined according to a comparison of the scheduling offset 320 and a beam switching threshold (or adjusted beam switching threshold) of the UE 115, or any combination thereof.

Figure 4:
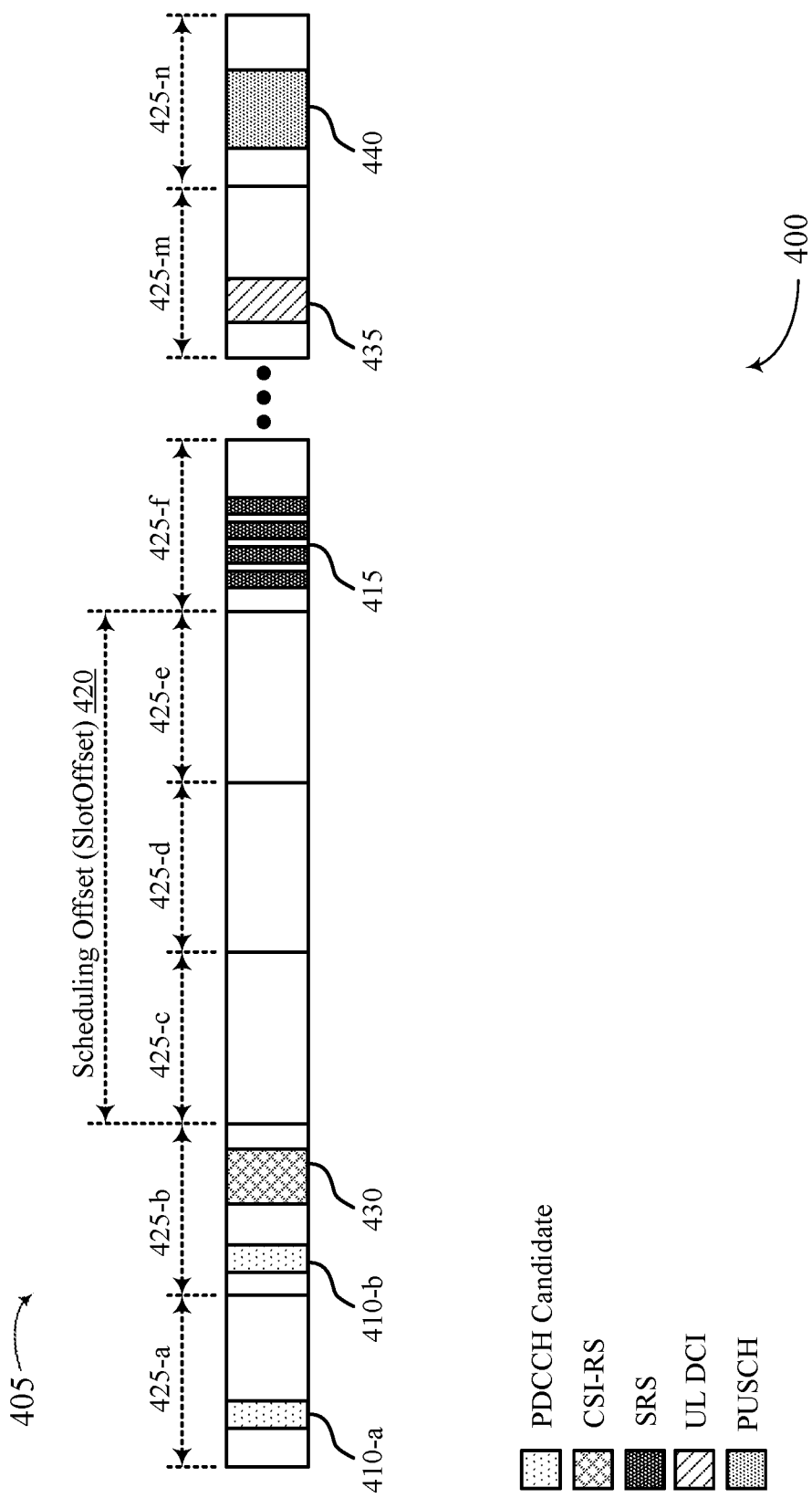
FIG. 4 illustrates an example of a resource allocation scheme that supports techniques for timing relationships for PDCCH repetition in accordance with aspects of the present disclosure.

FIG. 4 illustrates an example of a resource allocation scheme 400 that supports techniques for timing relationships for PDCCH repetition in accordance with aspects of the present disclosure. In some examples, resource allocation scheme 400 may implement, or be implemented by, aspects of wireless communications systems 100, wireless communications system 200, resource allocation scheme 300, or any combination thereof. The resource allocation scheme 400 includes a resource configuration 405 which illustrates a scheduling offset 420 for a set of SRSs 415 scheduled via one or more repetitions of DCI received within a set of linked PDCCH candidates 410.

For example, in some cases, a UE 115 may receive an RRC message from a base station 105, where the RRC message indicates a scheduling offset 420 for one or more transmissions scheduled via PDCCH repetitions. For example, the RRC message may indicate a scheduling offset 420 (e.g., "SlotOffset") for SRSs (e.g., aperiodic SRSs 415) scheduled by repetitions of DCI. In some aspects, the scheduling offset 420 (e.g., SlotOffset) associated with SRSs scheduled via repetitions of DCI may include a quantity of TTIs (e.g., a quantity of slots 425) between a TTI in associated with a last PDCCH candidate 410-*b* in which repetitions of DCI may be received and a TTI associated with the scheduled SRSs 415. In other words, in cases where SRSs 415 are scheduled via multiple repetitions of DCI received in a set of PDCCH candidates 410, the SRSs 415 may be transmitted by the UE 115-*b* a quantity of slots 425 of the scheduling offset 420 (e.g., a "SlotOffset" quantity of slots 425) after a slot associated with a last PDCCH candidate 410-*b* of the set of PDCCH candidates 410.

In some aspects, the RRC message may additionally indicate (e.g., configure) one or more additional parameters associated with the set of SRSs 415. For example, in cases where SRSs 415 scheduled via PDCCH repetitions include a non-codebook resource set, the RRC message may indicate a non-zero power (NZP) CSI-RS 430 resource identifier. In some aspects, the resources for receiving the CSI-RS 430 associated with the SRS 415 may be located in the same TTI (e.g., same slot 425) as the last PDCCH candidate 410-*b*.

Additionally or alternatively, the UE 115 may receive, from the base station 105, an indication of a TTI offset associated with transmission/reception of a CSI-RS 430. In some aspects, the CSI-RS 430 may be associated with an SRS 415 which will be scheduled via repetitions of DCI, as will be explained in further detail herein. In some aspects, the indication of the TTI offset (e.g., "SlotOffset-CSI-RS 430") may be transmitted/received via an RRC message, a DCI message, a MAC-CE message, or any combination thereof. In this regard, in some cases, the UE 115 may receive the indication of the TTI offset (e.g., SlotOffset-CSI-RS 430) via the RRC message.

In some aspects, the UE 115, the base station 105, or both, may determine a resource (e.g., set of resources) for transmission/reception of a CSI-RS 430. In some aspects, the CSI-RS 430 may be associated with an SRS 415 which will be scheduled via repetitions of DCI, as will be explained in further detail herein. In some implementations, the resource for the CSI-RS 430 may be positioned within the same slot 425 as the last PDCCH candidate 410-*b* in which repetitions of DCI scheduling an associated non-codebook SRS 415 may be received. For example, as shown in FIG. 4, in cases where the last PDCCH candidate 410-*b* is positioned within a second slot 425-*b*, the resource(s) for the CSI-RS 430 may also be positioned within the second slot 425-*b*.

In additional or alternative cases, the resource for the CSI-RS 430 may be positioned in a different slot 425 than the slot 425 associated with the last PDCCH candidate 410-*b* (e.g., a different slot than the second slot 425-*b* illustrated in FIG. 4). In such cases, the resource for the CSI-RS 430 may be determined based on the TTI offset (e.g., SlotOffset-CSI-RS) indicated by the base station 105. For example, in cases where the UE 115 and/or base station 105 determine the TTI offset (SlotOffset-CSI-RS), the wireless devices may be configured to determine the resource for transmission/reception of the CSI-RS 430 based on the second slot 425-*b* associated with the last PDCCH candidate 410-*b* and the TTI offset. In particular, the TTI offset may define a quantity of slots 425-*b* after the second slot 425-*b* including the last PDCCH candidate 410-*b* in which the resource for the CSI-RS 430 may be found. In other words, the resource for the CSI-RS 430 may be found a "TTI offset" quantity of slots 425 (e.g., "SlotOffset-CSI-RS" quantity of slots 425) after the second slot 425-*b* of the last PDCCH candidate 410-*b*. In this regard, the second slot 425-*b* associated with the last PDCCH candidate 410-*b* may be used as a "reference slot 425" for determining a slot 425 in which a scheduled SRS 415 may be transmitted, a slot 425 in which a CSI-RS 430 associated with a scheduled SRS 415 may be received, or both.

In some aspects, the UE 115 may monitor a set of downlink control channel candidates (e.g., PDCCH candidates 410) that are associated with each other. In other words, the UE 115 may monitor a set of PDCCH candidates 410 which are linked to one another for PDCCH repetition. In some aspects, the set of PDCCH candidates 410 monitored by the UE 115 may include at least a first PDCCH candidate 410-*a* in a first TTI (e.g., first slot 425-*a*) and a last PDCCH candidate 410-*b* in a second TTI (e.g., second slot 425-*b*) which is subsequent to (e.g., after) the first slot 425-*a*. In some aspects, the UE 115 may monitor the set of PDCCH candidates 410 based on receiving an RRC message, receiving the TTI offset (SlotOffset-CSI-RS), determining the resource(s) for CSI-RS 430, or any combination thereof.

Subsequently, the UE 115 may receive, from the base station 105, one or more repetitions of DCI within the first PDCCH candidate 410-*a*, the last PDCCH candidate 410-*b*, or both. In this regard, the UE 115 may receive the one or more repetitions of DCI based on receiving the RRC message, receiving the TTI offset, determining the resource(s) for CSI-RS 430, monitoring the set of PDCCH candidates 410, or any combination thereof. The one or more repetitions of DCI may include any DCI format which may be received and/or decoded by the UE 115, including UE-specific DCI, group-common DCI, or both. For example, the DCI (e.g., DL DCI) may include a format for triggering aperiodic SRSs, including DL DCI format 1_1, or 1_2, UL DCI format 0_1 or 0_2, group-common DCI format 2_3, or any combination thereof.

In some aspects the repetitions of DCI may schedule a set of SRSs 415 (e.g., set of aperiodic SRSs 415) which are to be transmitted from the UE 115 to the base station 105. In some aspects, the repetitions of DCI may indicate a set of resources usable by the UE 115 to transmit the set of SRSs 415. For example, an SRS request field in the repetitions of DCI may indicate one or more SRS resource sets for transmitting the set of SRSs 415. In some cases, the one or more repetitions of DCI (e.g., UL DCI) may include an indication of a trigger state configuration. In some cases, a mapping between SRS resource sets usable for transmission of the set of SRSs 415 and the SRS request codepoints (e.g., 01, 10, 11) may be given as part of RRC parameters (e.g., aperiodicSRS-ResourceTrigger, aperiodicSRSResource-TriggerList) indicated via the RRC message at 805, the repetition of DCI at 825, or both.

In some aspects, the UE 115 may receive the CSI-RS 430 from the base station 105. In some aspects, the CSI-RS 430 may be associated with the set of SRS 415 scheduled by the repetitions of DCI received within the set of PDCCH candidates 410. The UE 115 may receive, and the base station 105 may transmit, the CSI-RS 430 based on the RRC message, the TTI offset, determining the resource(s) for the CSI-RS 430, monitoring the PDCCH candidates 410, the repetitions of DCI received within the PDCCH candidates 410, or any combination thereof.

For example, the UE 115 may receive the CSI-RS 430 within the determined resource(s) for the CSI-RS 430. In this regard, in some implementations, the CSI-RS 430 may be received within the same TTI (e.g., same slot 425-*b*) as the last PDCCH candidate 410-*b*. Additionally or alternatively, in cases where the UE 115 and/or base station 105 determine/apply the TTI offset (SlotOffset-CSI-RS), the CSI-RS 430 may be received some quantity of slots 425 following the second slot 425-*b* associated with the last PDCCH candidate 410-*b*, where the quantity of slots 425 is based on the TTI offset.

Upon receiving the CSI-RS 430, the UE 115 may perform one or more measurements for the CSI-RS 430. The UE 115 may perform the measurements based on the receiving the RRC message, receiving the TTI offset, determining the resource(s) for the CSI-RS 430, monitoring the PDCCH candidates 410, receiving the repetitions of DCI received within the PDCCH candidates 410, receiving the CSI-RS 430, or any combination thereof.

In some implementations, the UE 115 may determine one or more parameters associated with transmission of the set of SRSs 415 scheduled by the repetitions of DCI. Parameters associated the SRSs 415 may include, but are not limited to, a precoder used for transmission of the SRSs 415. In some aspects, the UE 115 may determine the one or more parameters based on the one or more measurements performed on the CSI-RS 430. For example, the UE 115 may determine (e.g., calculate) a precoder which is to be used for transmission of the set of SRSs 415 based on measurements performed on the NZP CSI-RS 430.

In some aspects, the UE 115, the base station 105, or both, may determine and/or apply a scheduling offset 420 associated with the set of SRSs 415 scheduled by the repetitions of DCI. In some aspects, the UE 115 and/or the base station 105 may be configured to apply the scheduling offset 420 regardless of where repetitions of DCI are detected within the set of PDCCH candidates 410. In particular, in some cases, the UE 115 and/or the base station 105 may be configured to apply the scheduling offset 420 based on a timing of the last PDCCH candidate 410-*b* regardless of where (or how many) repetitions of DCI are detected within the set of PDCCH candidates 410. For example, the UE 115 and/or the base station 105 may be configured to apply the scheduling offset 420 regardless of whether a first repetition of the DCI is detected within the first PDCCH candidate 410-*a*, a second repetition of the DCI is detected within the last PDCCH candidate 410-*b*, or whether both the first repetition and the second repetition of DCI are detected within the first PDCCH candidate 410-*a* and the last PDCCH candidate 410-*b*, respectively.

In some aspects, the scheduling offset 420 may be based on a timing of the last PDCCH candidate 410-*b* of the set of PDCCH candidate. In particular, the scheduling offset 420 may be based on a positioning of the last PDCCH candidate 410-*b* within the second slot 425-*b*, based on a first and/or last symbol of the second slot 425-*b* associated with the last PDCCH candidate 410-*b*, or both. For example, in cases where the transmission scheduled by the repetitions of DCI includes a set of SRSs 415, the scheduling offset 420 may include a quantity of slots 425 between the second slot 425-*b* of the last PDCCH candidate 410-*b* and the slot 425 (e.g., sixth slot 425-*f*) in which the set of SRSs 415 are scheduled.

The UE 115 may transmit the set of SRSs 415 scheduled by the repetitions of DCI based on (e.g., in accordance with) the scheduling offset 420, which was applied based on the timing of the last PDCCH candidate 410-*b*. For example, the UE 115 may transmit the set of SRSs 415 after the scheduling offset 420 (e.g., SlotOffset) which is applied based on the second slot 425-*b* of the last PDCCH candidate 410-*b*. In other words, the UE 115 may transmit the set of SRSs 415 within a slot 425 (e.g., sixth slot 425-*f*) which is a quantity of slots 425 after the second slot 425-*b* associated with the last PDCCH candidate 410-*b*, where the quantity of slots 425 is based on (e.g., defined by) the scheduling offset 420 (e.g., SlotOffset).

In this regard, the UE 115 may transmit, and the base station 105 may receive, the set of SRSs 415 based on transmitting/receiving the RRC message, transmitting/receiving the TTI offset, determining the resource(s) for the CSI-RS 430, monitoring the PDCCH candidates 410, transmitting/receiving the repetitions of DCI, receiving the CSI-RS 430, performing the measurements on the CSI-RS 430, determining the parameters for the set of SRSs 415, determining/applying the scheduling offset 420, or any combination thereof. For example, the UE 115 may transmit the set of SRSs 415 based on (e.g., in accordance with) using a determined precoder for the set of SRSs 415. As such, the UE 115 may transmit the set of SRSs based on receiving the CSI-RS 430.

In some cases, the UE 115 may receive, from the base station 105, a DCI 435 which schedules an uplink transmission (e.g., PUSCH transmission 440) from the UE 115 to the base station 105. In particular, the DCI 435 may schedule a non-codebook based PUSCH transmission 440. In some aspects, the base station 105 may transmit the DCI 435 (e.g., UL DCI 435) based on receiving the set of SRSs 415. In some aspects, the DCI 435 may indicate a set of resources usable by the UE 115 for transmission of the PUSCH transmission 440. Subsequently, the UE 115 may transmit, to the base station 105, the uplink transmission (e.g., PUSCH transmission 440) which was scheduled by the DCI 435. In this regard, the UE 115 may transmit the uplink transmission (e.g., PUSCH transmission 440) message based on receiving the DCI 435. For example, the UE 115 may transmit the PUSCH transmission 440 (e.g., non-codebook based PUSCH transmission 440) within the set of resources indicated by the DCI 435.

Figure 5:
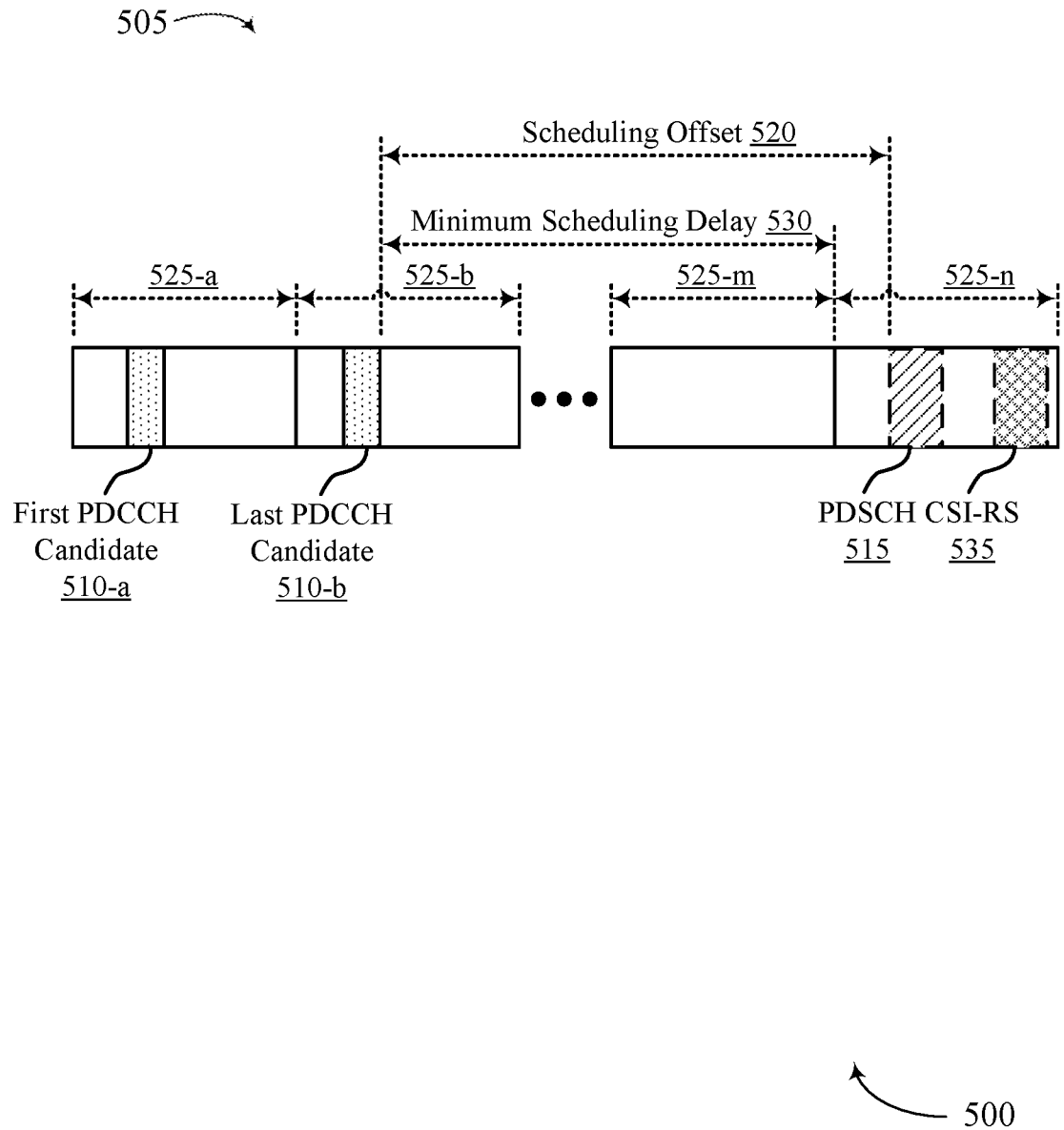
FIG. 5 illustrates an example of a resource allocation scheme that supports techniques for timing relationships for PDCCH repetition in accordance with aspects of the present disclosure.

FIG. 5 illustrates an example of a resource allocation scheme 500 that supports techniques for timing relationships for PDCCH repetition in accordance with aspects of the present disclosure. In some examples, resource allocation scheme 500 may implement, or be implemented by, aspects of wireless communications systems 100, wireless communications system 200, resource allocation schemes 300-400, or any combination thereof. The resource allocation scheme 500 includes a resource configuration 505 which illustrates a scheduling offset 520 for a PDSCH transmission 515 and/or a CSI-RS 535 scheduled via one or more repetitions of DCI received within a set of linked PDCCH candidates 510.

For example, in some cases, a UE 115 may receive, from the base station 105, an RRC message. In some aspects, the RRC message may indicate one or more minimum scheduling delays 530 ($\Delta$) associated with PDCCH decoding. Additionally or alternatively, the UE 115 may be configured (e.g., pre-configured) with one or more minimum scheduling delays 530. In some cases, one or more minimum scheduling delays 530 may be configured at the UE 115 to avoid excessive buffering of downlink samples due to PDCCH decoding. In particular, the minimum scheduling delay 530 may be configured to enable the UE 115 enough time to process a PDCCH transmission (e.g., repetitions of DCI) in cases where a PDCCH channel and a PDSCH channel on which a transmission is scheduled have different SCSs. In some aspects, a minimum scheduling delay 530 may define a minimum time duration (e.g., minimum number of symbols, minimum quantity of TTIs, minimum quantity of slots) between a DCI scheduling a transmission and a start of the transmission scheduled by the DCI.

In some aspects, the UE 115 may monitor a set of downlink control channel candidates (e.g., PDCCH candidates 510) that are associated with each other. In other words, the UE 115 may monitor a set of PDCCH candidates 510 which are linked to one another for PDCCH repetition. In some aspects, the set of PDCCH candidates 510 monitored by the UE 115 may include at least a first PDCCH candidate 510-a in a first TTI (e.g., first slot 525-a) and a last PDCCH candidate 510-b in a second TTI (e.g., second slot 525-b) which is subsequent to (e.g., after) the first slot 525-a. In some aspects, the UE 115 may monitor the set of PDCCH candidates 510 based on receiving the RRC message.

In some aspects, the UE 115 may receive, from the base station 105, one or more repetitions of DCI within the first PDCCH candidate 510-a, the last PDCCH candidate 510-b, or both. In this regard, the UE 115 may receive the one or more repetitions of DCI based on receiving the RRC message, monitoring the set of PDCCH candidates 510, or both. The one or more repetitions of DCI may include any DCI format which may be received and/or decoded by the UE 115.

In some aspects the repetitions of DCI may schedule a transmission between the base station 105 and the UE 115. For example, as shown in FIG. 5, the DCI message may schedule a PDSCH 515 transmission, a CSI-RS 535 (e.g., aperiodic CSI-RS 535), or both. In some aspects, the DCI message may indicate a set of resources usable by the UE 115 to receive the PDSCH 515 transmission and/or the CSI-RS 535. In some cases, the repetitions of DCI may schedule the PDSCH 515 transmission and/or CSI-RS 535 in a same or different component carrier as a control channel (e.g., PDCCH) within which the repetitions of DCI were received (e.g., cross-carrier scheduling). For example, the PDCCH candidates 510 (and therefore repetitions of DCI) may be associated with a PDCCH with a first SCS, and the PDSCH 515 transmission and/or CSI-RS 535 may be scheduled on a different channel (e.g., PDSCH 515) associated with a second SCS which is different from the first SCS.

In some implementations, the UE 115, the base station 105, or both, may determine SCSs associated with a channel on which the repetitions of DCI were received, a channel on which the PDSCH 515 transmission and/or CSI-RS 535 are scheduled, or both. The UE 115 and/or the base station 105 may determine the SCSs of the respective channels based on monitoring the PDCCH candidates 510, transmitting/receiving the repetitions of DCI, or both. For example, the UE 115 and/or the base station 105 may determine a first SCS associated with a downlink control channel (e.g., PDCCH) on which at least one repetition of DCI was received, and may determine a second SCS associated with a channel (e.g., PDSCH 515) on which the PDSCH 515 transmission/CSI-RS 535 scheduled by the repetitions of DCI are to be performed.

The UE 115, the base station 105, or both, may determine a minimum scheduling delay 530 associated with the scheduled PDSCH transmission 515 and/or CSI-RS 535. In some aspects, the UE 115 and/or the base station 105 may determine the minimum scheduling delay 530 based on transmitting/receiving the RRC message, monitoring the PDCCH candidates 510, transmitting/receiving the repetitions of DCI, determining the SCSs of the respective channels, or both.

As noted previously herein, the minimum scheduling delay 530 may define a minimum time duration (e.g., minimum number of OFDM symbols, minimum quantity of TTIs, minimum quantity of slots 525) between a DCI scheduling a transmission and a start of the transmission scheduled by the DCI. For example, the minimum scheduling delay 530 may define a minimum quantity of symbols (e.g., OFDM symbols) between a last symbol of the last PDCCH candidate 510-b and a first symbol associated with the scheduled PDSCH 515 transmission and/or CSI-RS 535.

In some aspects, a value of a minimum scheduling delay 530 may be based on the SCS of the control channel (e.g., PDCCH) on which the repetition(s) of DCI were received. In particular, the minimum scheduling delay 530 may be based on whether an SCS of the PDCCH is less than (or greater than) an SCS of the channel (e.g., PDSCH 515) on which the PDSCH 515 transmission and/or CSI-RS 535 is scheduled. In some aspects, the value of the minimum scheduling delay 530 may be quantized to a next slot if an SCS of the PDCCH ($\mu_{PDCCH}$) is less than a SCS of the channel associated with the PDSCH 515/CSI-RS 535 scheduled by the repetitions of DCI ($\mu_{PDSCH}$, $\mu_{CSI-RS}$). Conversely, no quantization may be performed to determine the value of the minimum scheduling delay 530 in cases where the SCS of the PDCCH ($\mu_{PDCCH}$) is greater than or equal to the SCS of the channel associated with the PDSCH 515/CSI-RS 535 scheduled by the repetitions of DCI ($\mu_{PDSCH}$, $\mu_{CSI-RS}$).

By way of example, the UE 115 and/or base station 105 may determine a first SCS associated with a downlink control channel (e.g., PDCCH) on which the at least one repetition of the DCI was received, and may determine a second SCS associated with a channel (e.g., PDSCH 515) on which the PDSCH 515 transmission and/or CSI-RS 535 scheduled by the repetition of DCI is to be performed. In this example, the UE 115 and the base station 105 may determine the minimum scheduling delay 530 based on a comparison of the first SCS and the second SCS. In particular, the UE 115 and/or the base station 105 may be configured to perform quantization to determine the minimum scheduling delay 530 based on a comparison of the first and second SCSs.

In some aspects, the UE 115, the base station 105, or both, determine and/or apply a scheduling offset 520 associated with the transmission scheduled by the repetitions of DCI. The UE 115 and/or the base station 105 may determine/apply the scheduling offset 520 based on transmitting/receiving the RRC message, monitoring the PDCCH candidates 510, transmitting/receiving the repetitions of DCI, determining the SCSs of the respective channels, determining the minimum scheduling delay 530, or any combination thereof.

In some aspects, the UE 115 and/or the base station 105 may be configured to apply the scheduling offset 520 regardless of where repetitions of DCI are detected within the set of PDCCH candidates 510. In particular, in some cases, the UE 115 and/or the base station 105 may be configured to apply the scheduling offset 520 based on a timing of the last PDCCH candidate 510-b regardless of where (or how many) repetitions of DCI are detected within the set of PDCCH candidates 510. For example, the UE 115 and/or the base station 105 may be configured to apply the scheduling offset 520 regardless of whether a first repetition of the DCI is detected within the first PDCCH candidate 510-a, a second repetition of the DCI is detected within the last PDCCH candidate 510-b, or both the first repetition and the second repetition of DCI are detected within the first PDCCH candidate 510-a and the last PDCCH candidate 510-b, respectively.

In some aspects, the scheduling offset 520 may be based on a timing of the last PDCCH candidate 510-b of the set of PDCCH candidates 510. In particular, the scheduling offset 520 may be based on a positioning of the last PDCCH candidate 510-b within the second slot 525-b, based on a first and/or last symbol of the second slot 525-b associated with the last PDCCH candidate 510-b, or both. In some aspects, the scheduling offset 520 may be based on the minimum scheduling delay 530. For example, in some cases, the scheduling offset 520 may be greater than or equal to the minimum scheduling delay 530. For example, in cases where the UE 115 and the base station 105 determine the minimum scheduling delay 530 to be four slots 525, the scheduling offset 520 may be determined to be four or more slots 525.

Subsequently, the UE 115 may receive, from the base station 105, the PDSCH 515 transmission and/or CSI-RS 535 scheduled by the repetitions of DCI. The UE 115 may receive, and the base station 105 may transmit, the PDSCH 515 transmission and/or CSI-RS 535 based on (e.g., in accordance with) the scheduling offset 520, the minimum scheduling delay 530, or both.

For example, the UE 115 may receive, and the base station 105 may transmit, the PDSCH 515 transmission and/or CSI-RS 535 based on (e.g., in accordance with) the minimum scheduling delay 530 and/or the scheduling offset 520 which was applied based on the timing of the last PDCCH candidate 510-*b*, where the minimum scheduling delay 530 is less than or equal to the scheduling offset 520. For instance, in cases where the UE 115 and the base station 105 determines the minimum scheduling delay 530 to be four slots 525, the scheduling offset 520 may be determined to be five slots 525. In this example, the base station 105 may transmit, and the UE 115 may receive, the PDSCH 515 transmission and/or CSI-RS 535 five slots 525 following the second slot 525-*b* associated with the last PDCCH candidate 510-*b*.

Techniques described herein may provide for improved scheduling of wireless communications. In particular, by defining signaling, rules, and/or configurations which enable the UE 115 and base station 105 to determine a timing of transmissions (e.g., PDSCH 515 transmissions, CSI-RS 535) scheduled via PDCCH repetitions, techniques described herein may enable the UE 115 and base station 105 to efficiently determine a timing of scheduled transmissions. Moreover, by enabling wireless devices to more efficiently determine a timing of transmissions scheduled via PDCCH repetitions, techniques described herein may enable more widespread use of communications using PDCCH repetitions within the wireless communications system, thereby improving a reliability of wireless communications, improving transmission diversity, and further protecting wireless communications against interference.

Figure 6:
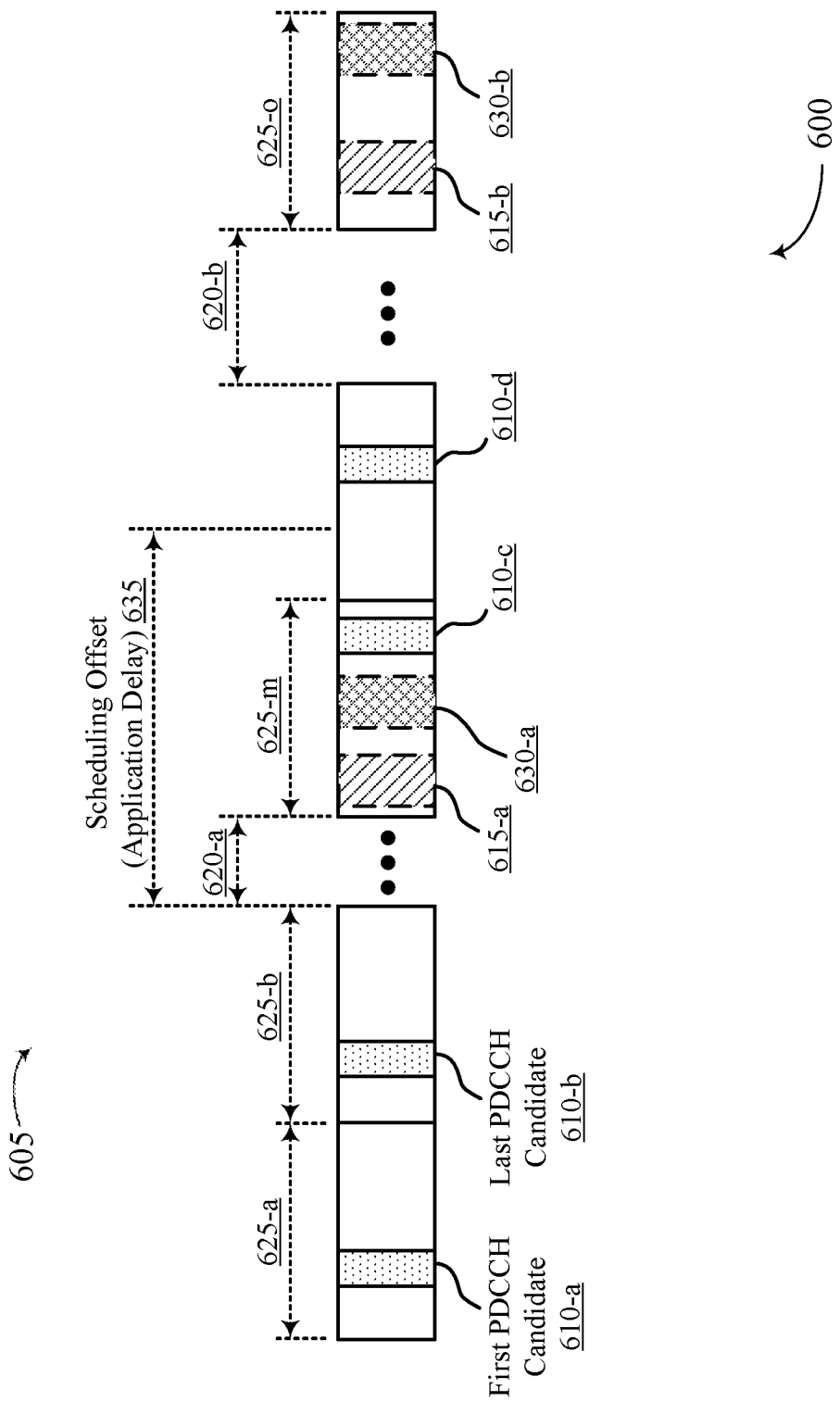
FIG. 6 illustrates an example of a resource allocation scheme that supports techniques for timing relationships for PDCCH repetition in accordance with aspects of the present disclosure.

FIG. 6 illustrates an example of a resource allocation scheme 600 that supports techniques for timing relationships for PDCCH repetition in accordance with aspects of the present disclosure. In some examples, resource allocation scheme 600 may implement, or be implemented by, aspects of wireless communications systems 100, wireless communications system 200, resource allocation schemes 300-500, or any combination thereof. The resource allocation scheme 600 includes a resource configuration 605 which illustrates a scheduling offset 620 (e.g., minimum scheduling offset 620) for a PDSCH transmission 615 and/or a PUSCH transmission 630 scheduled via one or more repetitions of DCI received within a set of linked PDCCH candidates 610.

For example, in some implementations, the UE 115 may receive, from the base station 105, an RRC message. In some aspects, the RRC message may indicate one or more minimum scheduling offsets 620 associated with transmissions scheduled by the base station 105. In some cases, one or more minimum scheduling offsets 620 may be configured at the UE 115 to decrease a power consumption at the UE 115 and base station 105. In some cases, the minimum scheduling offsets 620 may include one or more K0 values (e.g., minK0) associated with scheduled PDSCH transmissions 615, one or more K2 values (e.g., minK2) associated with scheduled PUSCH transmissions 630, or both. For example, in some cases, the UE 115 may be configured with up to two values for each of a minK0 and a minK2. In some aspects, a minimum scheduling offset 620 may define a minimum time duration (e.g., minimum quantity of TTIs, minimum quantity of slots 625) between a DCI scheduling a transmission and a slot including the transmission scheduled by the DCI.

In some aspects, the UE 115 may monitor a set of downlink control channel candidates (e.g., PDCCH candidates 610) that are associated with each other. In other words, the UE 115 may monitor a set of PDCCH candidates 610 which are linked to one another for PDCCH repetition. In some aspects, the set of PDCCH candidates 610 monitored by the UE 115 may include at least a first PDCCH candidate 610-*a* in a first TTI (e.g., first slot 625-*a*) and a last PDCCH candidate 610-*b* in a second TTI (e.g., second slot 625-*b*) which is subsequent to (e.g., after) the first slot 625-*b*. In some aspects, the UE 115 may monitor the set of PDCCH candidates 610 based on receiving the RRC message including the indication of the minimum scheduling offsets 620.

Subsequently, the UE 115 may receive, from the base station 105, one or more repetitions of DCI within the first PDCCH candidate 610-*a*, the last PDCCH candidate 610-*b*, or both. In this regard, the UE 115 may receive the one or more repetitions of DCI based on receiving the RRC message, monitoring the set of PDCCH candidates 610, or both. The one or more repetitions of DCI may include any DCI format which may be received and/or decoded by the UE 115 (e.g., DCI format 0_1, 1_1).

In some aspects the repetitions of DCI may schedule a transmission between the base station 105-*a* and the UE 115-*a*. For example, as shown in FIG. 6, the DCI may schedule a PDSCH transmission 615-*a*, a PUSCH transmission 630-*a*, or both. In some aspects, the DCI may indicate a set of resources usable by the UE 115 to receive the PDSCH transmission 615-*a* and/or PUSCH transmission 630-*b*.

In some aspects, the repetitions of DCI may include one or more bit fields indicating which minimum scheduling offset 620 is to be applied (e.g., which minimum scheduling offset 620 is active). For example, in cases where the repetitions of DCI schedule a PDSCH transmission 615-*a* and the UE 115 is configured with two minK0 values for PDSCH transmissions 615, the repetitions of DCI may indicate which minK0 value is to be applied for the minimum scheduling offset 620-*a* for performing the scheduled PDSCH transmission 615-*a*. By way of another example, in cases where the repetitions of DCI schedule a PUSCH transmission 630-*a* and the UE 115 is configured with two minK2 values for PUSCH transmissions 630, the repetitions of DCI may indicate which minK2 value is to be applied for the minimum scheduling offset 620-*a* for performing the scheduled PUSCH transmission 630-*a*.

Additionally or alternatively, the repetitions of DCI may indicate a change in one or more values of a minimum scheduling offset 620. In particular, the repetitions of DCI may indicate a change in one or more values of a minimum scheduling offset indicator field of the repetitions of DCI. For example, in cases where the UE 115 is configured with a first minK0 value and a second minK0 value for PDSCH transmissions 615, the repetitions of DCI may indicate a change to the first minK0 value (e.g., changed minimum scheduling offset 620-*b*). In other words, the repetitions of DCI may indicate an adjusted minimum scheduling offset 620-*b* (e.g., adjusted minK0 value, adjusted minK2 value) which is different from the minimum scheduling offset 620-*a* (e.g., minK0 value, minK2 value) which is applied for the PDSCH transmission 615-*a* and/or PUSCH transmission 630-*a*. In some cases, an indication of a change of the minimum scheduling offset 620 may also indicate an activation of the respective changed minimum scheduling offset 620. For example, continuing with the example above, if the repetitions of DCI indicate a change to the first minK0 value (e.g., first minK0 value applied for the minimum scheduling offset 620-*a*), the change to the first minK0 value may also serve as a selection of the adjusted (changed) first minK0 value (e.g., adjusted minK0 value applied for the minimum scheduling offset 620-*b*).

In cases where the repetitions of DCI indicate a change in the minimum scheduling offset 620, the repetitions of DCI may additionally indicate a scheduling offset 635 (e.g., application delay 635). In some aspects, the scheduling offset 635 (e.g., application delay) may indicate when the change to the minimum scheduling offset 620 (e.g., when the changes to the minK0 and/or minK2 values) are to be applied. In some aspects, the scheduling offset 635 may define a quantity of slots, a quantity of symbols, and/or a quantity of TTIs relative to a last symbol of the second slot 625-*b* including the last PDCCH candidate 610-*b*.

The UE 115, the base station 105, or both, may determine and/or apply the scheduling offset 635 associated with the repetitions of DCI. In particular, the UE 115 and/or the base station 105 may determine that the change in the one or more values of the minimum scheduling offset 620-*a* is to be applied after the scheduling offset 635, which is applied based on the timing of the last PDCCH candidate 610-*b*. apply the scheduling offset. The UE 115 and/or the base station 105 may determine/apply the minimum scheduling offset 635 (e.g., apply the changes to the minimum scheduling offset 620-*a* after the scheduling offset 635) based on transmitting/receiving the RRC message, monitoring the PDCCH candidates 610, transmitting/receiving the repetitions of DCI, determining the change in the minimum scheduling offset 620, or any combination thereof.

In some aspects, the UE 115 and/or the base station 105 may be configured to apply the scheduling offset 635 (e.g., apply the one or more changes to the minimum scheduling offset 620-*a* based on the scheduling offset 635) regardless of where repetitions of DCI are detected within the set of PDCCH candidates 610. In particular, in some cases, the UE 115 and/or the base station 105 may be configured to apply the scheduling offset 635 based on a timing of the last PDCCH candidate 610-*b* regardless of where (or how many) repetitions of DCI are detected within the set of PDCCH candidates 610. For example, the UE 115 and/or the base station 105 may be configured to apply the scheduling offset 635 regardless of whether a first repetition of the DCI is detected within the first PDCCH candidate 610-*a*, a second repetition of the DCI is detected within the last PDCCH candidate 610-*b*, or both the first repetition and the second repetition of DCI are detected within the first PDCCH candidate 610-*a* and the last PDCCH candidate 610-*b*, respectively.

In some aspects, the scheduling offset 635 may be based on a timing of the last PDCCH candidate 610-*b* of the set of PDCCH candidates 610. In particular, the scheduling offset 635 may be based on a positioning of the last PDCCH candidate 610-*b* within the second slot 625-*b*, based on a first and/or last symbol of the second slot 625-*b* associated with the last PDCCH candidate 610-*b*, or both. For example, the scheduling offset 635 may define a quantity of slots 625 (or quantity of TTIs or symbols) following the second slot 625-*b* associated with the last PDCCH candidate 610-*b*.

In some cases, the scheduling offset may define a quantity of slots or symbols following the second slot 625-*b* including the last PDCCH candidate 610-*b*. For example, in cases where the scheduling offset 635 indicates three slots 625, the UE 115 and/or the base station 105 may be configured to apply the one or more changes to the minimum scheduling offset 620-*a* after an end of the scheduling offset 635, which is applied based on the timing of the last PDCCH candidate 610-*b*. In this regard, because the changes to the minimum scheduling offset 620 are not implemented until an end of the scheduling offset 635, schedule PDSCH transmissions 615 and/or PUSCH transmissions 630 scheduled via DCI messages which are received before an end of the scheduling offset 635 may be associated with the old (e.g., unchanged) minimum scheduling offset 620-*a*. For example, a DCI message which schedules a PDSCH transmission 615 may be received within a PDCCH candidate 610-*c* within the scheduling offset 635. In this example, the PDSCH transmission 615 may be scheduled before an end of the scheduling offset 635, and may therefore be scheduled before the changes to the minimum scheduling offset 620-*a* are implemented (e.g., before the changes to the minK2 values are implemented). Accordingly, the PDSCH transmission 615 scheduled via the DCI received within the PDCCH candidate 610-*c* may be associated with the old, unchanged minimum scheduling offset 620-*a* (e.g., unchanged minK2 value).

Comparatively, the UE 115 may receive a DCI message in a PDCCH candidate 610-*d* following an end of the scheduling offset 635, where the DCI message schedules a PDSCH 615-*b* and/or PUSCH transmission 630-*b*. In this example, because the PDSCH 615-*b* and/or PUSCH transmission 630-*b* were scheduled following an end of the scheduling offset 635 (and therefore following an implementation of the changes to the minimum scheduling offset 620-*z*), the PDSCH 615-*b* and/or PUSCH transmission 630-*b* may be associated with an adjusted minimum scheduling offset 620-*b* (e.g., adjusted minK2 value, adjusted minK0 value).

In this regard, which minK0 values and/or minK0 values (e.g., which minimum scheduling offset 620) is applied to a respective PDSCH transmission 615 and/or PUSCH transmission 630 may be based on the scheduling offset 635 (e.g., application delay). If a PDSCH transmission 615 and/or PUSCH transmission 630 is scheduled via a DCI received before an end of the scheduling offset 635, the old (e.g., unchanged) minimum scheduling offset 620-*a* is applied (e.g., unchanged minK2 values, min K0 values). Conversely, if a PDSCH transmission 615 and/or PUSCH transmission 630 is scheduled via a DCI received after an end of the scheduling offset 635, the new changed (e.g., adjusted) minimum scheduling offset 620-*b* is applied (e.g., adjusted minK2 values, adjusted min K0 values).

Techniques described herein may provide for improved scheduling of wireless communications. In particular, by defining signaling, rules, and/or configurations which enable the UE 115 and base station 105 to determine a timing of transmissions (e.g., PDSCH transmissions 615, PUSCH transmissions 630) scheduled via PDCCH repetitions, techniques described herein may enable the UE 115 and base station 105 to efficiently determine a timing of scheduled transmissions. Moreover, by enabling wireless devices to more efficiently determine a timing of transmissions scheduled via PDCCH repetitions, techniques described herein may enable more widespread use of communications using PDCCH repetitions within the wireless communications system, thereby improving a reliability of wireless communications, improving transmission diversity, and further protecting wireless communications against interference.

Figure 7:
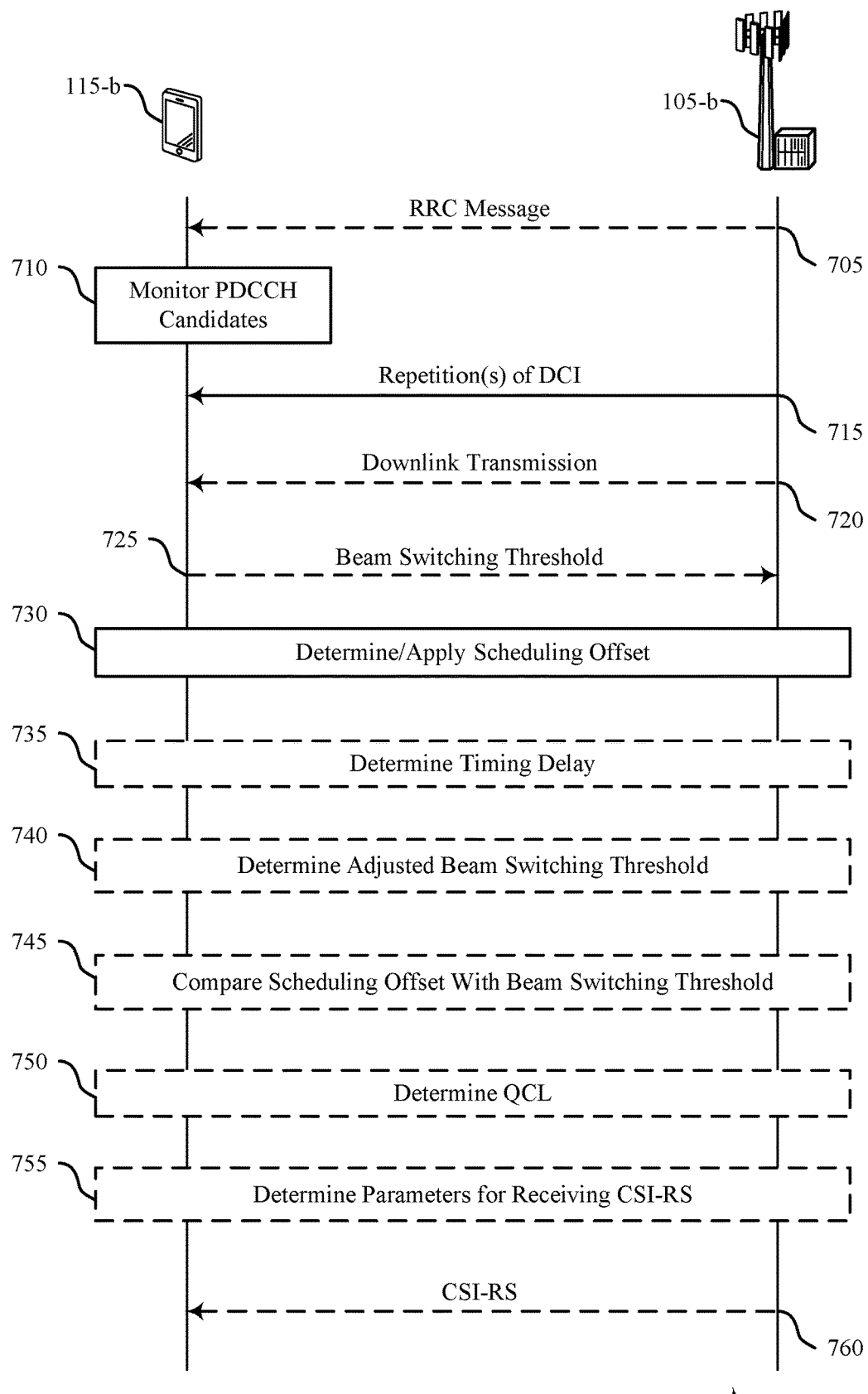
FIG. 7 illustrates an example of a process flow that supports techniques for timing relationships for PDCCH repetition in accordance with aspects of the present disclosure.

FIG. 7 illustrates an example of a process flow 700 that supports techniques for timing relationships for PDCCH repetition in accordance with aspects of the present disclosure. In some examples, process flow 700 may implement, or be implemented by, aspects of wireless communications systems 100, wireless communication system 200, resource allocation schemes 300-600, or any combination thereof. For example, the process flow 700 may illustrate a UE 115-*b* monitoring a set of PDCCH candidates, receiving one or more repetitions of DCI, applying a scheduling offset based on a last PDCCH candidate, and communicating with a base station 105-*b* based on the scheduling offset, as described with reference to FIGS. 1-6.

In some cases, process flow 700 may include a UE 115-*a*, and a base station 105-*b*, which may be examples of corresponding devices as described herein. In particular, the UE 115-*b* and the base station 105-*b* illustrated in FIG. 7 may include examples of the UE 115-*a* and the base station 105-*a* illustrated in FIG. 2.

In some examples, the operations illustrated in process flow 700 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 705, the UE 115-*b* may receive an RRC message from the base station 105-*b*, where the RRC message indicates a set of trigger state configurations. The set of trigger state configurations may be associated with triggering CSI reports on a PUSCH (e.g., trigger sates for triggering aperiodic CSI reports). For example, the UE 115-*b* may be configured with a set of trigger state configurations using a higher layer parameter AperiodicTriggerStateList via RRC signaling. In some aspects, each trigger state configuration in the set of trigger state configurations may be linked to a CSI-RS resource set, where the CSI-RS resource set may include multiple CSI-RS resources. In some implementations, a TCI state for each of the CSI-RS resources may be associated with a trigger state configuration.

In some aspects, the RRC message received at 705 may include additional control information associated with receiving/decoding PDCCH repetitions at the UE 115-*b*. For example, the RRC message may configure the UE 115-*b* with one or more CORESETs, search space sets, monitoring occasions, PDCCH candidates, or any combination thereof. Moreover, the RRC message may configure the UE 115-*b* with a set of resources for transmitting or receiving transmissions.

At 710, the UE 115-*b* may monitor a set of downlink control channel candidates (e.g., PDCCH candidates) that are associated with each other. In other words, the UE 115-*b* may monitor a set of PDCCH candidates which are linked to one another for PDCCH repetition. In some aspects, the set of PDCCH candidates monitored by the UE 115-*b* may include at least a first PDCCH candidate in a first TTI (e.g., first slot) and a last PDCCH candidate in a second TTI (e.g., second TTI) which is subsequent to (e.g., after) the first TTI.

In some aspects, the UE 115-*b* may monitor the set of PDCCH candidates based on receiving the RRC message at 705.

At 715, the UE 115-*b* may receive, from the base station 105-*b*, one or more repetitions of DCI. The UE 115-*b* may receive the one or more repetitions of DCI within the first PDCCH candidate, the last PDCCH candidate, or both. In this regard, the UE 115-*b* may receive the one or more repetitions of DCI based on receiving the RRC message at 705, monitoring the set of PDCCH candidates at 710, or both. The one or more repetitions of DCI may include any DCI format which may be received and/or decoded by the UE 115-*b* (e.g., DCI format 0_1, 0_2).

In some aspects the repetitions of DCI may schedule a transmission between the base station 105-*b* and the UE 115-*b*. For example, as shown in FIG. 7, the transmission scheduled by the DCI message may include a CSI-RS transmitted by the base station 105-*b*. In some aspects, the DCI message may indicate a set of resources usable by the UE 115-*b* to receive the CSI-RS. In some cases, the one or more repetitions of DCI (e.g., UL DCI) may include an indication of a trigger state configuration. In particular, the repetitions of DCI may indicate a trigger state configuration for CSI-RS which is included within the set of trigger state configurations indicated via the RRC message received at 705. The trigger state configuration may be indicated within a CSI request field of the repetitions of DCI.

In some cases, the trigger state configuration indicated via the repetitions of DCI may be associated with one or more TCI states for transmission/reception of the CSI-RS. In particular, the UE 115-*b* may be configured to determine the trigger state configuration based on the DCI, and may be configured to determine the CSI-RS resource set, the corresponding TCI states, or both, based on the trigger state configuration.

At 720, the UE 115-*b* may receive, from the base station 105-*b*, a downlink transmission within a set of resources associated with receiving CSI-RS(s) at the UE 115-*b*. The downlink transmission may include, but is not limited to, a PDSCH transmission, an additional CSI-RS (e.g., aperiodic CSI-RS, periodic CSI-RS, semi-persistent CSI-RS), and the like. In some aspects, the downlink transmission may indicate one or more TCI states for transmission/reception of the CSI-RS. In some cases, the TCI states indicated in the downlink transmission may be the same or different as the TCI states associated with the trigger state configurations indicated via the DCI. As will be noted in further detail herein, the UE 115-*b* may be configured to determine QCL states for receiving a CSI-RS based on the downlink transmission received at 720. In some aspects, the UE 115-*b* may receive the downlink transmission based on receiving the RRC message at 705, monitoring the PDCCH candidates at 710, receiving the one or more repetitions of DCI at 715, or any combination thereof.

At 725, the UE 115-*b* may transmit, to the base station 105-*b*, an indication of a beam switching threshold (e.g., beamSwitchTiming) at the UE 115-*b*. In some aspects, the beam switching threshold may include a timing metric associated with switching from one beam to another at the UE 115-*b*. As will be noted in further detail herein, the UE 115-*b* and/or the base station 105-*b* may be configured to determine parameters for transmitting/receiving the CSI-RS scheduled by the repetitions of DCI based on a comparison of the scheduling offset determined at 730 and a beam switching threshold at the UE 115-*b*.

At 730, the UE 115-*b*, the base station 105-*b*, or both, may determine and/or apply a scheduling offset associated with the transmission scheduled by the repetitions of DCI. The UE 115-*b* and/or the base station 105-*b* may determine/apply the scheduling offset at 725 based on transmitting/receiving the RRC message at 705, monitoring the PDCCH candidates at 710, transmitting/receiving the repetitions of DCI at 715, transmitting/receiving the downlink transmission at 720, transmitting/receiving the beam switching threshold at 725, or any combination thereof.

In some aspects, the UE 115-*b* and/or the base station 105-*b* may be configured to apply the scheduling offset regardless of where repetitions of DCI are detected within the set of PDCCH candidates. In particular, in some cases, the UE 115-*b* and/or the base station 105-*b* may be configured to apply the scheduling offset based on a timing of the last PDCCH candidate regardless of where (or how many) repetitions of DCI are detected within the set of PDCCH candidates. For example, the UE 115-*b* and/or the base station 105-*b* may be configured to apply the scheduling offset regardless of whether a first repetition of the DCI is detected within the first PDCCH candidate, a second repetition of the DCI is detected within the last PDCCH candidate, or both the first repetition and the second repetition of DCI are detected within the first PDCCH candidate and the last PDCCH candidate, respectively.

In some aspects, the scheduling offset may be based on a timing of the last PDCCH candidate of the set of PDCCH candidate. In particular, the scheduling offset may be based on a positioning of the last PDCCH candidate within a TTI, based on the TTI associated with the last PDCCH candidate, or both. For example, in cases where the transmission scheduled by the repetitions of DCI includes a CSI-RS, the scheduling offset may include an offset between a last symbol of the last PDCCH candidate and a first symbol of the CSI-RS (as shown in the scheduling offset 220-*a* illustrated in FIG. 2 and the scheduling offset 320 illustrated in FIG. 3).

At 735, the UE 115-*b*, the base station 105-*b*, or both, may determine a timing delay. In some aspects, the timing delay may be associated with transmission/reception of the CSI-RS. Moreover, the timing delay may be indicative of an additional beam switching delay at the UE 115-*b* and/or base station 105-*b*, and may therefore be associated with the beam switching threshold reported at 725.

In particular, in some cases, the timing delay (d) may be associated with cross-carrier scheduling in which the PDCCH candidates (e.g., repetitions of DCI) are transmitted in a first component carrier, and the scheduled CSI-RS is scheduled in a second component carrier with a different SCS as compared to the first component carrier. As such, in some cases, the timing delay determined at 735 may be a function of an SCS of the component carrier associated with the PDCCH candidates, an SCS of the component carrier associated with the scheduled CSI-RS, or both. For example, in some cases, the UE 115-*b* and/or the base station 105-*b* may determine the timing delay associated with the CSI-RS based on an SCS of a downlink control channel (e.g., PDCCH) within which the repetitions of DCI were received at 715. For instance, the timing delay (d) may be defined as a quantity of symbols (e.g., PDCCH symbols), and may be a function of the SCS of the PDCCH ($\mu_{PDCCH}$) associated with the repetitions of DCI, as shown in Table 1 below:

TABLE 1

Beam Switching Timing Delay (d)

| PPDCCH | d (PDCCH symbols) |
|---|---|
| 0 | 8 |
| 1 | 8 |
| 2 | 14 |

At 740, the UE 115-*b*, the base station 105-*b*, or both, may determine an adjusted beam switching threshold associated with the UE 115-*b*. In some aspects, the UE 115-*b* and/or the base station 105-*b* may determine the adjusted beam switching threshold based on the beam switching threshold reported at 725, determining the timing delay at 735, or both. In particular, the UE 115-*b* and/or the base station 105-*b* may be configured to determine the adjusted beam switching threshold by applying the determined timing delay (d) to the beam switching threshold of the UE 115-*b*.

For example, in some cases, the UE 115-*b* and/or the base station 105-*b* may be configured to determine an adjusted beam switching threshold based on the equation $BST_{Adj} = BST + d(2^{\mu CSI-RS}/2^{\mu PDCCH})$, where BST is the beam switching threshold of the UE 115-*b* (e.g., beam switching threshold reported at 725), $BST_{Adj}$ is the adjusted beam switching threshold, d is the timing delay determined at 735, $\mu CSI\text{-}RS$ is an SCS associated with a component carrier on which the CSI-RS is scheduled, and $\mu PDCCH$ is an SCS associated with a control channel (e.g., PDCCH) on which the repetitions of DCI were received at 715.

At 745, the UE 115-*b*, the base station 105-*b*, or both, may compare the scheduling offset with the beam switching threshold, the adjusted beam switching threshold, or both. In some aspects, the UE 115-*b* and/or the base station 105-*b* may compare the scheduling offset with the beam switching threshold and/or the adjusted beam switching threshold based on transmitting/receiving the RRC message at 705, monitoring the PDCCH candidates at 710, transmitting/receiving the repetitions of DCI at 715, transmitting/receiving the beam switching threshold at 725, determining the scheduling offset at 730, determining the timing delay at 735, determining the adjusted beam switching threshold at 745, or any combination thereof.

At 750, the UE 115-*b*, the base station 105-*b*, or both, may determine one or more QCL configurations for transmission/reception of the CSI-RS scheduled by the repetitions of DCI. In some aspects, the UE 115-*b* and/or the base station 105-*b* may be configured to determine the QCL configuration based on the comparison of the scheduling offset with the beam switching threshold (or adjusted beam switching threshold). In particular, the QCL configuration associated with transmission/reception of the CSI-RS may be based on whether the scheduling offset determined at 745 (e.g., offset between a last symbol of the last PDCCH candidate and a first symbol of the CSI-RS) is less than the beam switching threshold (BST). Additionally or alternatively, in cases where the UE 115-*b* and/or base station 105-*b* are configured to apply the adjusted beam switching threshold, the QCL configuration associated with transmission/reception of the CSI-RS may be based on whether the scheduling offset determined at 745 (e.g., offset between a last symbol of the last PDCCH candidate and a first symbol of the CSI-RS) is less than the adjusted beam switching threshold ($BST_{Adj}$).

For example, in cases where the scheduling offset (SO) is greater than or equal to the beam switching threshold (or adjusted beam switching threshold) (e.g., $SO \geq BST$ or $SO \geq BST_{Adj}$), the QCL configuration associated with the CSI-RS may be based on the one or more TCI states associated with the trigger state configurations indicated via the repetitions of DCI received at 715. For instance, in cases where the scheduling offset (SO) is greater than or equal to the beam switching threshold (or adjusted beam switching threshold), the QCL configuration may be indicated in the TCI states for the aperiodic CSI-RS in the CSI trigger state configuration indicated in the CSI field of the repetitions of DCI.

By way of another example, in cases where the scheduling offset (SO) is less than the beam switching threshold (or adjusted beam switching threshold) (e.g., SO<BST or SO<$BST_{Adj}$), the QCL configuration associated with the CSI-RS may be based on the one or more TCI states indicated in the downlink transmission received at 720. In this regard, in cases where the scheduling offset (SO) is less than the beam switching threshold (or adjusted beam switching threshold) and there is another downlink transmission with indicated TCI states received in the same resources for CSI-RS, the UE 115-b and/or the base station 105-b may be configured to apply the QCL configuration of the downlink transmission (e.g., downlink transmission received at 720) for the CSI-RS. For instance, in cases where the scheduling offset (SO) is greater than or equal to the beam switching threshold (or adjusted beam switching threshold), the QCL configuration may be indicated in the TCI states for the aperiodic CSI-RS in the CSI trigger state configuration indicated in the CSI field of the repetitions of DCI.

Additionally or alternatively, in cases where the scheduling offset (SO) is less than the beam switching threshold (or adjusted beam switching threshold) (e.g., SO<BST or SO<$BST_{Adj}$), the UE 115-b and/or the base station 105-b may determine/apply a default QCL configuration. For example, in cases where the scheduling offset (SO) is less than the beam switching threshold (or adjusted beam switching threshold) (e.g., SO<BST or SO<$BST_{Adj}$), the UE 115-b and/or the base station 105-b may determine a QCL configuration associated with a CORESET within a last TTI of a search space set monitored by the UE 115-b. For instance, in cases where one default beam is configured and at least one CORESET is configured, the QCL configuration may be associated with a CORESET associated with a search space set monitored by the UE 115-b within a lowest controlResourceSetId in the last slot in which the one or more CORESETs within the active BWP of the serving cell of the base station 105-b are monitored.

By way of another example, in cases where the scheduling offset (SO) is less than the beam switching threshold (or adjusted beam switching threshold) (e.g., SO<BST or SO<$BST_{Adj}$), the UE 115-b and/or the base station 105-b may determine a QCL configuration associated with a lowest activated TCI state of a serving cell associated with the CSI-RS. For instance, in the case of cross-carrier scheduling in which there is no CORESET configured in the cell in which the CSI-RS is to be received, the QCL configuration may be associated with the lowest-ID activated TCI state applicable to the PDSCH within the active BWP of the cell in which the CSI-RS is to be received. It is noted herein that other configurations may be used in cases where more than one QCL configurations may be applied to the CSI-RS.

At 755, the UE 115-b, the base station 105-b, or both, may determine one or more parameters associated with transmission/reception of the CSI-RS scheduled by the repetitions of DCI. In some aspects, the UE 115-b and/or the base station 105-b may be configured to determine the parameters associated with the CSI-RS based on the comparison of the scheduling offset with the beam switching threshold (or adjusted beam switching threshold). Parameters associated with the CSI-RS may include, but are not limited to, CSI trigger configurations, TCI states, and the like.

In some aspects, the UE 115-b and the base station 105-b may communicate with one another via the transmission scheduled by the repetitions of DCI, where the transmission is performed based on (e.g., in accordance with) the scheduling offset, as shown at 760 of process flow 700.

At 760, the UE 115-b may receive, from the base station 105-b, the CSI-RS scheduled by the repetitions of DCI. The UE 115-b may receive, and the base station 105-b may transmit, the CSI-RS based on (e.g., in accordance with) the scheduling offset, which was applied at 730 based on the timing of the last PDCCH candidate. For example, the scheduling offset may define an offset between a last symbol of the last PDCCH candidate and the first symbol of the CSI-RS received at 760. In this regard, the UE 115-b may receive, and the base station 105-b may transmit, the CSI-RS based on transmitting/receiving the RRC message at 705, monitoring the PDCCH candidates at 710, transmitting/receiving the repetitions of DCI at 715, transmitting/receiving the beam switching threshold at 725, determining the scheduling offset at 730, determining the timing delay at 735, determining the adjusted beam switching threshold at 745, determining the QCL configuration at 750, determining the parameters for transmitting/receiving the CSI-RS at 755, or any combination thereof.

For example, the UE 115-b may receive the CSI-RS based on the trigger state configuration indicated in the repetitions of DCI received at 715. Similarly, the UE 115-b may receive (and the base station 105-b may transmit) the CSI-RS based on (e.g., in accordance with) the QCL state determined at 730, which may be based on a comparison of the scheduling offset and the beam switching threshold (or the adjusted beam switching threshold). Furthermore, the UE 115-b may receive (and the base station 105-b may transmit) the CSI-RS based on (e.g., in accordance with) the parameters associated with the CSI-RS determined at 735.

Techniques described herein may provide for improved scheduling of wireless communications. In particular, by defining signaling, rules, and/or configurations which enable the UE 115-b and base station 105-b to determine a timing of transmissions (e.g., CSI-RS) scheduled via PDCCH repetitions, techniques described herein may enable the UE 115-b and base station 105-b to efficiently determine a timing of scheduled transmissions. Moreover, by enabling wireless devices to more efficiently determine a timing of transmissions scheduled via PDCCH repetitions, techniques described herein may enable more widespread use of communications using PDCCH repetitions within the wireless communications system, thereby improving a reliability of wireless communications, improving transmission diversity, and further protecting wireless communications against interference.

Figure 8:
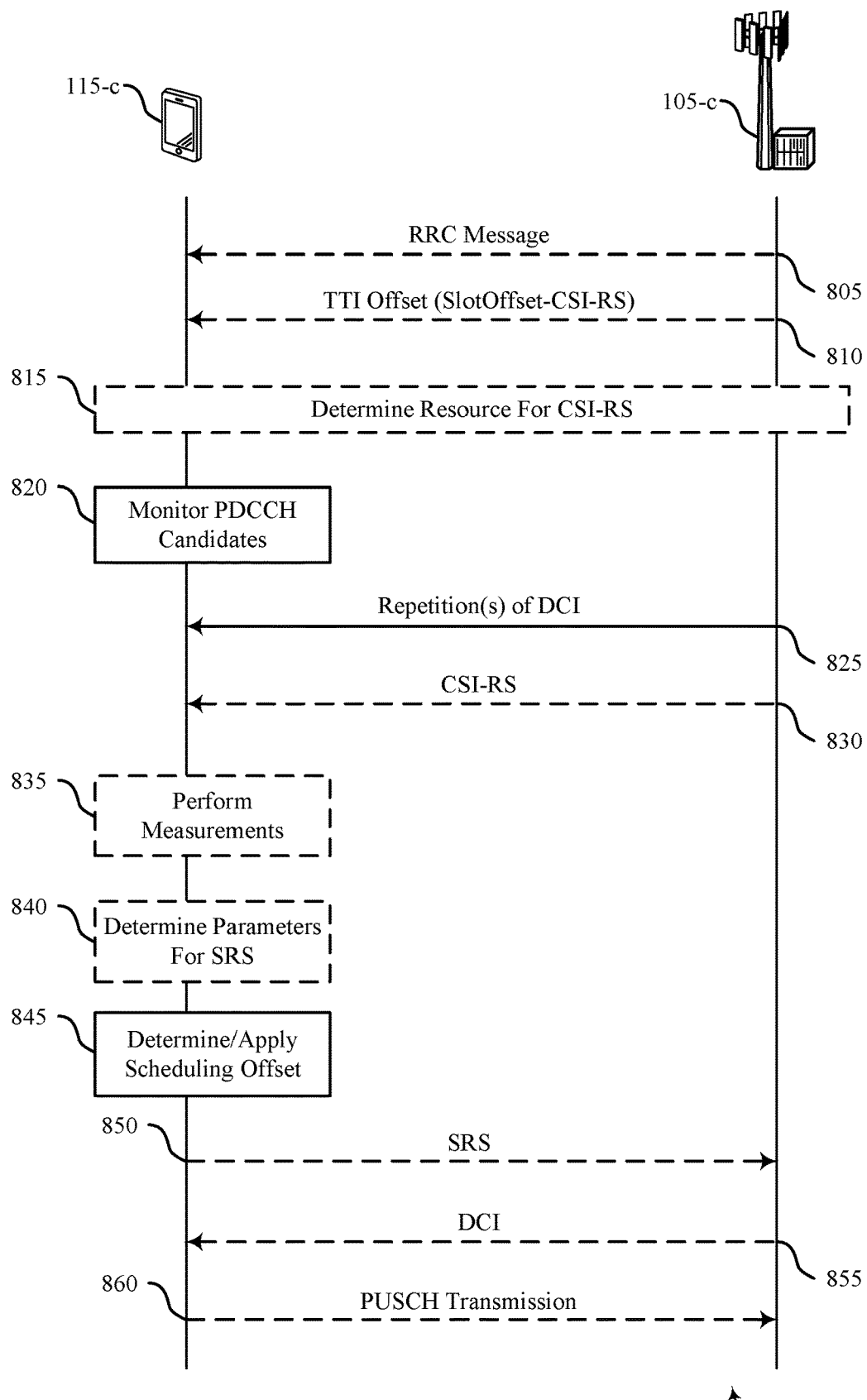
FIG. 8 illustrates an example of a process flow that supports techniques for timing relationships for PDCCH repetition in accordance with aspects of the present disclosure.

FIG. 8 illustrates an example of a process flow 800 that supports techniques for timing relationships for PDCCH repetition in accordance with aspects of the present disclosure. In some examples, process flow 800 may implement, or be implemented by, aspects of wireless communications systems 100, wireless communications system 200, resource allocation schemes 300-600, process flow 700, or any combination thereof. For example, the process flow 800 may illustrate a UE 115-c monitoring a set of PDCCH candidates, receiving one or more repetitions of DCI, applying a scheduling offset based on a last PDCCH candidate, and communicating with a base station 105-c based on the scheduling offset, as described with reference to FIGS. 1-7.

In some cases, process flow 800 may include a UE 115-c, and a base station 105-c, which may be examples of corresponding devices as described herein. In particular, the UE 115-c and the base station 105-c illustrated in FIG. 8 may include examples of the UE 115-a and the base station 105-a illustrated in FIG. 2.

In some examples, the operations illustrated in process flow 800 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 805, the UE 115-c may receive an RRC message from the base station 105-c, where the RRC message indicates a scheduling offset for one or more transmissions scheduled via PDCCH repetitions. For example, the RRC message may indicate a scheduling offset (e.g., "SlotOffset") for SRSs (e.g., aperiodic SRSs) scheduled by repetitions of DCI. In some aspects, the scheduling offset (e.g., SlotOffset) associated with SRSs scheduled via repetitions of DCI may include a quantity of TTIs (e.g., a quantity of slots) between a TTI in associated with the last PDCCH candidate in which repetitions of DCI may be received and a TTI associated with the scheduled SRSs. In other words, in cases where SRSs are scheduled via multiple repetitions of DCI received in a set of PDCCH candidates, the SRSs may be transmitted by the UE 115-b a quantity of slots of the scheduling offset (e.g., a "SlotOffset" quantity of slots) after a slot associated with a last PDCCH candidate of the set of PDCCH candidates.

In some aspects, the RRC message may additionally indicate (e.g., configure) one or more additional parameters associated with the SRSs. For example, in cases where SRSs scheduled via PDCCH repetitions includes a non-codebook resource set, the RRC message may indicate a non-zero power (NZP) CSI-RS resource identifier. In some aspects, the resources for receiving the CSI-RS associated with the SRS may be located in the same TTI (e.g., same slot) as the last PDCCH candidate.

At 810, the UE 115-c may receive, from the base station 105-c, an indication of a TTI offset associated with transmission/reception of a CSI-RS. In some aspects, the CSI-RS may be associated with an SRS which will be scheduled via repetitions of DCI, as will be explained in further detail herein. In some aspects, the indication of the TTI offset (e.g., "SlotOffset-CSI-RS") may be transmitted/received via an RRC message, a DCI message, a MAC-CE message, or any combination thereof. In this regard, in some cases, the UE 115-b may receive the indication of the TTI offset (e.g., SlotOffset-CSI-RS) via the RRC message received at 805.

At 815, the UE 115-b, the base station 105-b, or both, may determine a resource (e.g., set of resources) for transmission/reception of a CSI-RS. In some aspects, the CSI-RS may be associated with an SRS which will be scheduled via repetitions of DCI, as will be explained in further detail herein. In some implementations, the resource for the CSI-RS may be positioned within the same slot as the last PDCCH candidate in which repetitions of DCI scheduling an associated non-codebook SRS may be received. For example, in cases where the SRS scheduled via repetitions of DCI and/or a CSI-RS associated with the SRS are aperiodic, the UE 115-b and/or the base station 105-b may determine a resource within the slot of the last PDCCH candidate which may be used for transmission/reception of the CSI-RS.

In additional or alternative cases, the resource for the CSI-RS may be positioned in a different slot than the slot associated with the last PDCCH candidate. In such cases, the resource for the CSI-RS may be determined based on the TTI offset (e.g., SlotOffset-CSI-RS) determined at 810. For example, in cases where the UE 115-c and/or base station 105-c determine the TTI offset at 810, the wireless devices may be configured to determine the resource for transmission/reception of the CSI-RS based on a TTI associated with the last PDCCH candidate and the TTI offset. In particular, the TTI offset may define a quantity of slots after the slot including the last PDCCH candidate in which the resource for the CSI-RS may be found. In other words, the resource for the CSI-RS may be found a "TTI offset" quantity of slots (e.g., "SlotOffset-CSI-RS" quantity of slots) after the slot of the last PDCCH candidate. In this regard, the TTI (e.g., slot) associated with the last PDCCH candidate may be used as a "reference TTI" (e.g., "reference slot") for determining a slot in which a scheduled SRS may be transmitted, a slot in which a CSI-RS associated with a scheduled SRS may be received, or both.

At 820, the UE 115-c may monitor a set of downlink control channel candidates (e.g., PDCCH candidates) that are associated with each other. In other words, the UE 115-c may monitor a set of PDCCH candidates which are linked to one another for PDCCH repetition. In some aspects, the set of PDCCH candidates monitored by the UE 115-c may include at least a first PDCCH candidate in a first TTI (e.g., first slot) and a last PDCCH candidate in a second TTI (e.g., second TTI) which is subsequent to (e.g., after) the first TTI. In some aspects, the UE 115-c may monitor the set of PDCCH candidates based on receiving the RRC message at 805, receiving the TTI offset at 810, determining the resource(s) for CSI-RS at 815, or any combination thereof.

At 825, the UE 115-c may receive, from the base station 105-c, one or more repetitions of DCI. The UE 115-c may receive the one or more repetitions of DCI within the first PDCCH candidate, the last PDCCH candidate, or both. In this regard, the UE 115-c may receive the one or more repetitions of DCI based on receiving the RRC message at 805, receiving the TTI offset at 810, determining the resource(s) for CSI-RS at 815, monitoring the set of PDCCH candidates at 820, or any combination thereof. The one or more repetitions of DCI may include any DCI format which may be received and/or decoded by the UE 115-c, including UE-specific DCI, group-common DCI, or both. For example, the DCI (e.g., DL DCI) may include a format for triggering aperiodic SRSs, including DL DCI format 1_1, or 1_2, UL DCI format 0_1 or 0_2, group-common DCI format 2_3, or any combination thereof.

In some aspects the repetitions of DCI may schedule a transmission between the base station 105-a and the UE 115-a. For example, as shown in FIG. 8, the transmission scheduled by the repetitions of DCI may include a set of SRSs (e.g., set of aperiodic SRSs). In some aspects, the repetitions of DCI may indicate a set of resources usable by the UE 115-c to transmit the set of SRSs. For example, an SRS request field in the repetitions of DCI may indicate one or more SRS resource sets for transmitting the set of SRSs. In some cases, the one or more repetitions of DCI (e.g., UL DCI) may include an indication of a trigger state configuration. In some cases, a mapping between SRS resource sets usable for transmission of the set of SRSs and the SRS request codepoints (e.g., 01, 10, 11) may be given as part of RRC parameters (e.g., aperiodicSRS-ResourceTrigger, aperiodicSRSResourceTriggerList) indicated via the RRC message at 805, the repetition of DCI at 825, or both.

At 830, the UE 115-c may receive a CSI-RS from the base station 105-c. In some aspects, the CSI-RS transmitted/received at 830 may be associated with the SRS scheduled by the repetitions of DCI received at 825. The UE 115-c may receive, and the base station 105-c may transmit, the CSI-RS at 830 based on transmitting/receiving the RRC message at 805, transmitting/receiving the TTI offset at 810, determining the resource(s) for the CSI-RS at 815, monitoring the PDCCH candidates at 820, transmitting/receiving the repetitions of DCI at 825, or any combination thereof.

For example, the UE 115-c may receive the CSI-RS within the resource(s) for the CSI-RS which were determined at 815. In this regard, in some implementations, the CSI-RS may be received within the same TTI (e.g., same slot) as the last PDCCH candidate which was monitored at 820. Additionally or alternatively, in cases where the UE 115-c and/or base station 105-c determine/apply the TTI offset (SlotOffset-CSI-RS), the CSI-RS may be received some quantity of TTIs following the TTI associated with the last PDCCH candidate, where the quantity of TTIs is based on the TTI offset.

At 835, the UE 115-c may perform one or more measurements for the CSI-RS received at 830. The UE 115-c may perform the measurements at 835 based on transmitting/receiving the RRC message at 805, transmitting/receiving the TTI offset at 810, determining the resource(s) for the CSI-RS at 815, monitoring the PDCCH candidates at 820, transmitting/receiving the repetitions of DCI at 825, receiving the CSI-RS at 830, or any combination thereof.

At 840, the UE 115-c may determine one or more parameters associated with transmission of the set of SRSs scheduled by the repetitions of DCI received at 825. Parameters associated the SRSs may include, but are not limited to, a precoder used for transmission of the SRSs. In some aspects, the UE 115-c may determine the one or more parameters at 840 based on the one or more measurements performed at 835. For example, the UE 115-c may determine (e.g., calculate) a precoder which is to be used for transmission of the set of SRSs based on measurements performed on the NZP CSI-RS received at 830.

At 845, the UE 115-c, the base station 105-c, or both, may determine and/or apply a scheduling offset associated with the transmission scheduled by the repetitions of DCI. The UE 115-c and/or the base station 105-c may determine/apply the scheduling offset at 845 based on transmitting/receiving the RRC message at 805, transmitting/receiving the TTI offset at 810, determining the resource(s) for the CSI-RS at 815, monitoring the PDCCH candidates at 820, transmitting/receiving the repetitions of DCI at 825, receiving the CSI-RS at 830, performing the measurements at 835, determining the parameters for the set of SRSs at 840, or any combination thereof.

In some aspects, the UE 115-c and/or the base station 105-c may be configured to apply the scheduling offset regardless of where repetitions of DCI are detected within the set of PDCCH candidates. In particular, in some cases, the UE 115-c and/or the base station 105-c may be configured to apply the scheduling offset based on a timing of the last PDCCH candidate regardless of where (or how many) repetitions of DCI are detected within the set of PDCCH candidates. For example, the UE 115-c and/or the base station 105-c may be configured to apply the scheduling offset regardless of whether a first repetition of the DCI is detected within the first PDCCH candidate, a second repetition of the DCI is detected within the last PDCCH candidate, or both the first repetition and the second repetition of DCI are detected within the first PDCCH candidate and the last PDCCH candidate, respectively.

In some aspects, the scheduling offset may be based on a timing of the last PDCCH candidate of the set of PDCCH candidate. In particular, the scheduling offset may be based on a positioning of the last PDCCH candidate within a TTI, based on the TTI associated with the last PDCCH candidate, or both. For example, in cases where the transmission scheduled by the repetitions of DCI includes a set of SRSs, the scheduling offset may include a quantity of TTIs (e.g., quantity of slots) between a TTI of the last PDCCH candidate and a TTI in which the set of SRSs are scheduled (as shown in the scheduling offset 220-b illustrated in FIG. 2 and the scheduling offset 420 illustrated in FIG. 4).

At 850, the UE 115-c may transmit the set of SRSs scheduled by the repetitions of DCI. The UE 115-c may transmit, and the base station 105-c may receive, the set of SRSs based on (e.g., in accordance with) the scheduling offset, which was applied at 845 based on the timing of the last PDCCH candidate. For example, the UE 115-c may transmit the set of SRSs after the scheduling offset (e.g., SlotOffset) which is applied based on the TTI of the last PDCCH candidate. In other words, the UE 115-c may transmit the set of SRSs within a slot which is a quantity of slots after a slot associated with the last PDCCH candidate, where the quantity of slots is based on (e.g., defined by) the scheduling offset (e.g., SlotOffset).

In this regard, the UE 115-c may transmit, and the base station 105-c may receive, the set of SRSs based on transmitting/receiving the RRC message at 805, transmitting/receiving the TTI offset at 810, determining the resource(s) for the CSI-RS at 815, monitoring the PDCCH candidates at 820, transmitting/receiving the repetitions of DCI at 825, receiving the CSI-RS at 830, performing the measurements at 835, determining the parameters for the set of SRSs at 840, determining/applying the scheduling offset at 845, or any combination thereof. For example, the UE 115-c may transmit the set of SRSs based on (e.g., in accordance with) the one or more parameters determined at 840. For instance, in cases where the UE 115-c determines a precoder for the set of SRSs at 840, the UE 115-c may transmit the set of SRSs at 850 using the determined precoder. As such, the UE 115-c may transmit the set of SRSs based on receiving the CSI-RS associated with the set of SRSs at 830.

At 855, the UE 115-c may receive, from the base station 105-c, a DCI which schedules an uplink transmission (e.g., PUSCH transmission) from the UE 115-c to the base station 105-c. In particular, the DCI may schedule a non-codebook based PUSCH transmission. In some aspects, the base station 105-c may transmit the DCI (e.g., UL DCI) based on receiving the set of SRSs at 850. In some aspects, the DCI may indicate a set of resources usable by the UE 115-c for transmission of the uplink transmission (e.g., SRS resource indicator).

At 860, the UE 115-c may transmit, to the base station 105-c, the uplink transmission (e.g., PUSCH transmission) which was scheduled by the DCI. In this regard, the UE 115-c may transmit the uplink transmission (e.g., PDSCH transmission) message based on receiving the DCI at 855. For example, the UE 115-c may transmit the PDSCH transmission (e.g., non-codebook based PUSCH transmission) within the set of resources indicated by the DCI (e.g., based on the SRS resource indicator).

Techniques described herein may provide for improved scheduling of wireless communications. In particular, by defining signaling, rules, and/or configurations which enable the UE 115-c and base station 105-c to determine a timing of transmissions (e.g., SRSs) scheduled via PDCCH repetitions, techniques described herein may enable the UE 115-c and base station 105-c to efficiently determine a timing of scheduled transmissions. Moreover, by enabling wireless devices to more efficiently determine a timing of transmissions scheduled via PDCCH repetitions, techniques described herein may enable more widespread use of communications using PDCCH repetitions within the wireless communications system, thereby improving a reliability of wireless communications, improving transmission diversity, and further protecting wireless communications against interference.

Figure 9:
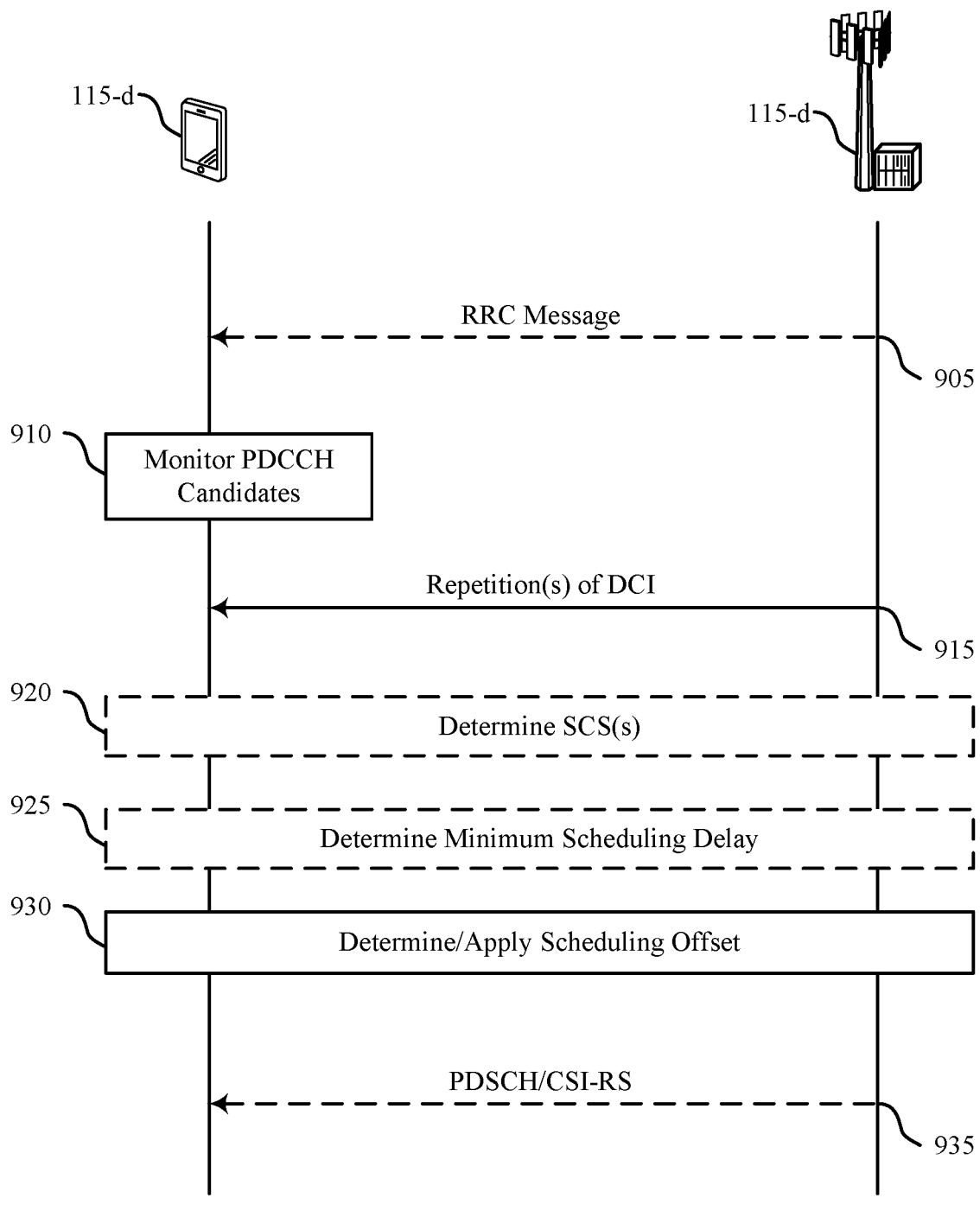
FIG. 9 illustrates an example of a process flow that supports techniques for timing relationships for PDCCH repetition in accordance with aspects of the present disclosure.

FIG. 9 illustrates an example of a process flow 900 that supports techniques for timing relationships for PDCCH repetition in accordance with aspects of the present disclosure. In some examples, process flow 900 may implement, or be implemented by, aspects of wireless communications systems 100, wireless communications system 200, resource allocation schemes 300-600, process flows 700-800, or any combination thereof. For example, the process flow 900 may illustrate a UE 115-d monitoring a set of PDCCH candidates, receiving one or more repetitions of DCI, applying a scheduling offset based on a last PDCCH candidate, and communicating with a base station 105-d based on the scheduling offset, as described with reference to FIGS. 1-8.

In some cases, process flow 900 may include a UE 115-d, and a base station 105-d, which may be examples of corresponding devices as described herein. In particular, the UE 115-d and the base station 105-d illustrated in FIG. 9 may include examples of the UE 115-a and the base station 105-a illustrated in FIG. 2.

In some examples, the operations illustrated in process flow 900 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 905, the UE 115-d may receive, from the base station 105-d, an RRC message. In some aspects, the RRC message may indicate one or more minimum scheduling delay ($\Delta$) associated with PDCCH decoding. In some cases, one or more minimum scheduling delay may be configured at the UE 115-d to avoid excessive buffering of downlink samples due to PDCCH decoding. In particular, the minimum scheduling delay may be configured to enable the UE 115-d enough time to process a PDCCH transmission (e.g., repetitions of DCI) in cases where a PDCCH channel and a PDSCH channel on which a transmission is scheduled have different SCSs. In some aspects, a minimum scheduling delay may define a minimum time duration (e.g., minimum quantity of TTIs, minimum quantity of slots) between a DCI scheduling a transmission and a start of the transmission scheduled by the DCI.

At 910, the UE 115-d may monitor a set of downlink control channel candidates (e.g., PDCCH candidates) that are associated with each other. In other words, the UE 115-d may monitor a set of PDCCH candidates which are linked to one another for PDCCH repetition. In some aspects, the set of PDCCH candidates monitored by the UE 115-d may include at least a first PDCCH candidate in a first TTI (e.g., first slot) and a last PDCCH candidate in a second TTI (e.g., second TTI) which is subsequent to (e.g., after) the first TTI.

In some aspects, the UE 115-d may monitor the set of PDCCH candidates based on receiving the RRC message at 905.

At 915, the UE 115-d may receive, from the base station 105-d, one or more repetitions of DCI. The UE 115-d may receive the one or more repetitions of DCI within the first PDCCH candidate, the last PDCCH candidate, or both. In this regard, the UE 115-d may receive the one or more repetitions of DCI based on receiving the RRC message at 905, monitoring the set of PDCCH candidates at 910, or both. The one or more repetitions of DCI may include any DCI format which may be received and/or decoded by the UE 115-d.

In some aspects the repetitions of DCI may schedule a transmission between the base station 105-a and the UE 115-a. For example, as shown in FIG. 9, the DCI message may schedule a PDSCH transmission, a CSI-RS (e.g., aperiodic CSI-RS), or both. In some aspects, the DCI message may indicate a set of resources usable by the UE 115-d to receive the PDSCH transmission and/or the CSI-RS. In some cases, the repetitions of DCI may schedule the PDSCH transmission and/or CSI-RS in a same or different component carrier as a control channel (e.g., PDCCH) within which the repetitions of DCI were received (e.g., cross-carrier scheduling). For example, the PDCCH candidates (and therefore repetitions of DCI) may be associated with a PDCCH with a first SCS, and the PDSCH transmission and/or CSI-RS may be scheduled on a different channel (e.g., PDSCH) associated with a second SCS which is different from the first SCS.

At 920, the UE 115-d, the base station 105-d, or both, may determine SCSs associated with a channel on which the repetitions of DCI were received, a channel on which the PDSCH transmission and/or CSI-RS are scheduled, or both. The UE 115-d and/or the base station 105-d may determine the SCSs at 915 based on monitoring the PDCCH candidates at 905, transmitting/receiving the repetitions of DCI at 910, or both.

For example, the UE 115-d and/or the base station 105-d may determine a first SCS associated with a downlink control channel (e.g., PDCCH) on which at least one repetition of DCI was received, and may determine a second SCS associated with a channel (e.g., PDSCH) on which the PDSCH transmission/CSI-RS scheduled by the repetitions of DCI are to be performed.

At 925, the UE 115-d, the base station 105-d, or both, may determine a minimum scheduling delay associated with the scheduled PDCCH transmission and/or CSI-RS. In some aspects, the UE 115-d and/or the base station 105-d may determine the minimum scheduling delay based on transmitting/receiving the RRC message at 905, monitoring the PDCCH candidates at 910, transmitting/receiving the repetition of DCI at 915, determining the SCSs at 920, or both.

In some aspects, a value of a minimum scheduling delay may be based on the SCS of the control channel (e.g., PDCCH) on which the repetition of DCI were received. In particular, the minimum scheduling delay may be based on whether an SCS of the PDCCH is less than (or greater than) an SCS of the channel (e.g., PDSCH) on which the PDSCH transmission and/or CSI-RS is scheduled. In some aspects, the value of the minimum scheduling delay may be quantized to a next slot if an SCS of the PDCCH ($\mu_{PDCCH}$) is less than a SCS of the channel associated with the PDSCH/CSI-RS scheduled by the repetitions of DCI ($\mu_{PDSCH}$, $\mu_{CSI-RS}$). Conversely, no quantization may be preformed to determine the value of the minimum scheduling delay in cases where the SCS of the PDCCH ($\mu_{PDCCH}$) is greater than or equal to the SCS of the channel associated with the PDSCH/CSI-RS scheduled by the repetitions of DCI ($\mu_{PDSCH}$, $\mu_{CSI-RS}$).

For instance, the minimum scheduling delay ($\Delta$), defined as a quantity of symbols, may be a based on an SCS of the PDCCH ($\mu_{PDCCH}$) associated with the repetitions of DCI, as shown in Table 2 below:

TABLE 2

| Beam Switching Timing Delay (d) | |
|---|---|
| $\mu_{PDCCH}$ | $\Delta$ (symbols) |
| 0 | 4 |
| 1 | 5 |
| 2 | 10 |
| 3 | 14 |

By way of example, the UE 115-d and/or base station 105-d may determine a first SCS associated with a downlink control channel (e.g., PDCCH) on which the at least one repetition of the DCI was received, and may determine a second SCS associated with a channel (e.g., PDSCH) on which the PDSCH transmission and/or CSI-RS scheduled by the repetition of DCI is to be performed. In this example, the UE 115-d and the base station 105-d may determine the minimum scheduling delay based on a comparison of the first SCS and the second SCS. In particular, the UE 115-d and/or the base station 105-d may be configured to perform quantization to determine the minimum scheduling delay based on a comparison of the first and second SCSs.

At 930, the UE 115-d, the base station 105-d, or both, determine and/or apply a scheduling offset associated with the transmission scheduled by the repetitions of DCI. The UE 115-d and/or the base station 105-d may determine/apply the scheduling offset at 930 based on transmitting/receiving the RRC message at 905, monitoring the PDCCH candidates at 910, transmitting/receiving the repetitions of DCI at 915, determining the SCSs at 920, determining the minimum scheduling delay at 925, or any combination thereof.

In some aspects, the UE 115-d and/or the base station 105-d may be configured to apply the scheduling offset regardless of where repetitions of DCI are detected within the set of PDCCH candidates. In particular, in some cases, the UE 115-d and/or the base station 105-d may be configured to apply the scheduling offset based on a timing of the last PDCCH candidate regardless of where (or how many) repetitions of DCI are detected within the set of PDCCH candidates. For example, the UE 115-d and/or the base station 105-d may be configured to apply the scheduling offset regardless of whether a first repetition of the DCI is detected within the first PDCCH candidate, a second repetition of the DCI is detected within the last PDCCH candidate, or both the first repetition and the second repetition of DCI are detected within the first PDCCH candidate and the last PDCCH candidate, respectively.

In some aspects, the scheduling offset may be based on a timing of the last PDCCH candidate of the set of PDCCH candidate. In particular, the scheduling offset may be based on a positioning of the last PDCCH candidate within a TTI, based on the TTI associated with the last PDCCH candidate, or both. In some aspects, the scheduling offset determined/applied at 930 may be based on the minimum scheduling delay determined at 925. For example, in some cases, the scheduling offset may be greater than or equal to the minimum scheduling delay. For example, in cases where the UE 115-d and the base station 105-d determine the minimum scheduling delay to be four slots, the scheduling offset may be determined to be four or more slots.

At 935, the UE 115-d may receive, from the base station 105-d, the PDSCH transmission and/or CSI-RS scheduled by the repetitions of DCI. The UE 115-d may receive, and the base station 105-d may transmit, the PDSCH transmission and/or CSI-RS based on (e.g., in accordance with) the scheduling offset, the minimum scheduling delay, or both.

For example, the UE 115-b may receive, and the base station 105-d may transmit, the PDSCH transmission and/or CSI-RS based on (e.g., in accordance with) the minimum scheduling delay determined at 925 and/or the scheduling offset determined at 930 applied at 930 based on the timing of the last PDCCH candidate, where the minimum scheduling delay is less than or equal to the scheduling offset. For instance, in cases where the UE 115-d and the base station 105-d determine the minimum scheduling delay to be four slots, the scheduling offset may be determined to be five slots. In this example, the base station 105-d may transmit, and the UE 115-d may receive, the PDSCH transmission and/or CSI-RS five slots following a slot associated with the last PDCCH candidate.

Techniques described herein may provide for improved scheduling of wireless communications. In particular, by defining signaling, rules, and/or configurations which enable the UE 115-d and base station 105-d to determine a timing of transmissions (e.g., PDSCH transmissions, CSI-RS) scheduled via PDCCH repetitions, techniques described herein may enable the UE 115-d and base station 105-d to efficiently determine a timing of scheduled transmissions. Moreover, by enabling wireless devices to more efficiently determine a timing of transmissions scheduled via PDCCH repetitions, techniques described herein may enable more widespread use of communications using PDCCH repetitions within the wireless communications system, thereby improving a reliability of wireless communications, improving transmission diversity, and further protecting wireless communications against interference.

Figure 10:
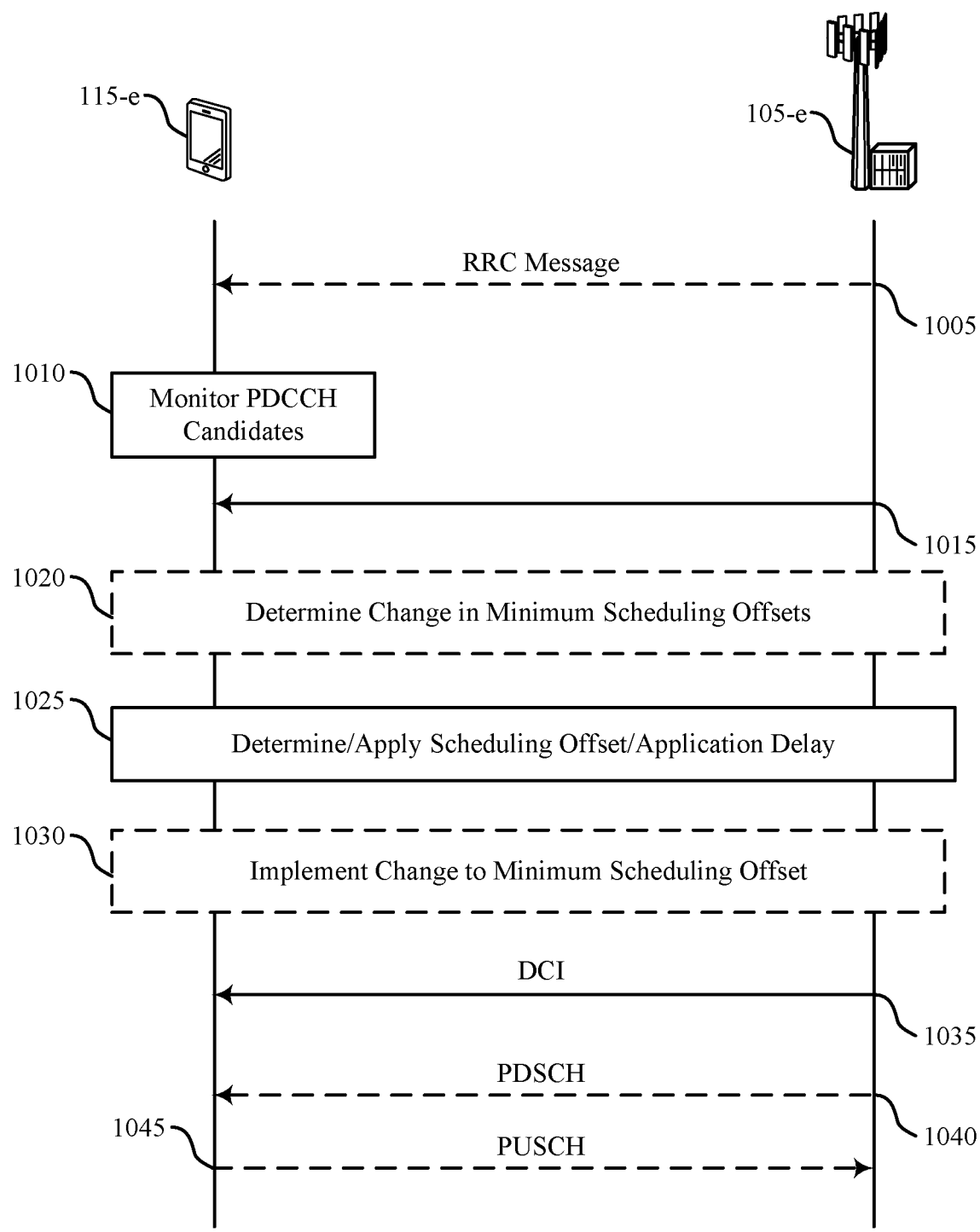
FIG. 10 illustrates an example of a process flow that supports techniques for timing relationships for PDCCH repetition in accordance with aspects of the present disclosure.

FIG. 10 illustrates an example of a process flow 1000 that supports techniques for timing relationships for PDCCH repetition in accordance with aspects of the present disclosure. In some examples, process flow 1000 may implement, or be implemented by, aspects of wireless communications systems 100, wireless communications system 200, resource allocation schemes 300-600, process flows 800-900, or any combination thereof. For example, the process flow 1000 may illustrate a UE 115-e monitoring a set of PDCCH candidates, receiving one or more repetitions of DCI, applying a scheduling offset based on a last PDCCH candidate, and communicating with a base station 105-e based on the scheduling offset, as described with reference to FIGS. 1-9.

In some cases, process flow 1000 may include a UE 115-e, and a base station 105-e, which may be examples of corresponding devices as described herein. In particular, the UE 115-e and the base station 105-e illustrated in FIG. 10 may include examples of the UE 115-a and the base station 105-a illustrated in FIG. 2.

In some examples, the operations illustrated in process flow 1000 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

At 1005, the UE 115-e may receive, from the base station 105-e, an RRC message. In some aspects, the RRC message may indicate one or more minimum scheduling offsets associated with transmissions scheduled by the base station. In some cases, one or more minimum scheduling offsets may be configured at the UE 115-e to avoid excessive buffering of downlink samples due to PDCCH decoding, and to enable the UE 115-e to perform any beam switching or retuning procedures required to perform the scheduled transmission. Minimum scheduling offsets may additionally be used to decrease a power consumption at the UE 115-e and base station 105-e. In some cases, the minimum scheduling offsets may include one or more K0 values (e.g., minK0) associated with scheduled PDSCH transmissions, one or more K2 values (e.g., minK2) associated with scheduled PUSCH transmissions, or both. For example, in some cases, the UE 115-e may be configured with up to two values for each of a minK0 and a minK2 parameter. In some aspects, a minimum scheduling offset may define a minimum time duration (e.g., minimum quantity of TTIs, minimum quantity of slots) between a DCI scheduling a transmission and a start of the transmission scheduled by the DCI.

At 1010, the UE 115-e may monitor a set of downlink control channel candidates (e.g., PDCCH candidates) that are associated with each other. In other words, the UE 115-e may monitor a set of PDCCH candidates which are linked to one another for PDCCH repetition. In some aspects, the set of PDCCH candidates monitored by the UE 115-e may include at least a first PDCCH candidate in a first TTI (e.g., first slot) and a last PDCCH candidate in a second TTI (e.g., second TTI) which is subsequent to (e.g., after) the first TTI. In some aspects, the UE 115-e may monitor the set of PDCCH candidates based on receiving the RRC message at 1005.

At 1015, the UE 115-e may receive, from the base station 105-e, one or more repetitions of DCI. The UE 115-e may receive the one or more repetitions of DCI within the first PDCCH candidate, the last PDCCH candidate, or both. In this regard, the UE 115-e may receive the one or more repetitions of DCI based on receiving the RRC message at 1005, monitoring the set of PDCCH candidates at 1010, or both. The one or more repetitions of DCI may include any DCI format which may be received and/or decoded by the UE 115-e (e.g., DCI format 0_1, 1_1).

In some aspects the repetitions of DCI may schedule a transmission between the base station 105-a and the UE 115-a. For example, as shown in FIG. 10, the DCI message may schedule a PDSCH transmission, a PDSCH transmission, or both. In some aspects, the DCI message may indicate a set of resources usable by the UE 115-e to receive the PDSCH transmission and/or PUSCH transmission.

In some aspects, the repetitions of DCI may include one or more bit fields indicating which minimum scheduling offset is to be applied (e.g., which minimum scheduling offset is active). For example, in cases where the repetitions of DCI schedule a PDSCH transmission and the UE 115-e is configured with two minK0 values for PDSCH transmissions, the repetitions of DCI may indicate which minK0 value is to be applied when performing the scheduled PDSCH transmission.

Additionally or alternatively, the repetitions of DCI may indicate a change in one or more values of a minimum scheduling offset. In particular, the repetitions of DCI may indicate a change in one or more values of a minimum scheduling offset indicator field of the repetitions of DCI. For example, in cases where the UE 115-e is configured with a first minK0 value and a second minK0 value for PDSCH transmissions, the repetitions of DCI may indicate a change to the first minK0 value. In other words, the repetitions of DCI may indicate an adjusted minimum scheduling offset for the PDSCH/PDSCH transmissions (e.g., adjusted minK0 value, adjusted minK2 value) which is different from the original minimum scheduling offset (e.g., original minK0 value, minK2 value). In some cases, an indication of a change of the minimum scheduling offset may also indicate an activation of the respective changed minimum scheduling offset. For example, continuing with the example above, if the repetitions of DCI indicate a change to the first minK0 value, the change to the first minK0 value may also serve as a selection of the adjusted (changed) first minK0 value).

In cases where the repetitions of DCI indicate a change in the minimum scheduling offset, the repetitions of DCI may additionally indicate a scheduling offset (e.g., application delay). In some aspects, the scheduling offset (e.g., application delay) may indicate when the change to the minimum scheduling offset (e.g., when the changes to the minK0 and/or minK2 values) are to be applied. In some aspects, the scheduling offset/application delay may define a quantity of slots, a quantity of symbols, and/or a quantity of TTIs relative to a last symbol of the second slot including the last PDCCH candidate 610-b.

At 1020, the UE 115-e, the base station 105-e, or both, may determine a change in the one or more values of the minimum scheduling offset. The UE 115-e and the base station 105-e may determine the change to one or more minimum scheduling offsets based on the indication of the change received via the repetition of DCI received at 1020 (e.g., via one or more minimum scheduling offset indicator fields of the DCI).

At 1025, the UE 115-e, the base station 105-e, or both, determine and/or apply the scheduling offset/application delay indicated via the repetitions of DCI. In particular, the UE 115-e and/or the base station 105-e may determine that the change in the one or more values of the minimum scheduling offset is to be applied after the scheduling offset/application delay, which is applied based on the timing of the last PDCCH candidate. The UE 115-e and/or the base station 105-e may determine/apply the minimum scheduling offset at 1020 based on transmitting/receiving the RRC message at 1005, monitoring the PDCCH candidates at 1010, transmitting/receiving the repetitions of DCI at 1015, determining the change in the minimum scheduling offset at 1020, or any combination thereof.

In some aspects, the UE 115-e and/or the base station 105-e may be configured to apply the scheduling offset/application delay (e.g., apply the one or more changes to the minimum scheduling offset based on the scheduling offset/application delay) regardless of where repetitions of DCI are detected within the set of PDCCH candidates. In particular, in some cases, the UE 115-e and/or the base station 105-e may be configured to apply the scheduling offset/application delay based on a timing of the last PDCCH candidate regardless of where (or how many) repetitions of DCI are detected within the set of PDCCH candidates. For example, the UE 115-e and/or the base station 105-e may be configured to apply the scheduling offset/application delay regardless of whether a first repetition of the DCI is detected within the first PDCCH candidate, a second repetition of the DCI is detected within the last PDCCH candidate, or both the first repetition and the second repetition of DCI are detected within the first PDCCH candidate and the last PDCCH candidate, respectively.

In some aspects, the scheduling offset/application delay may be based on a timing of the last PDCCH candidate of the set of PDCCH candidate. In particular, the scheduling offset/application delay may be based on a positioning of the last PDCCH candidate within a TTI, based on the TTI associated with the last PDCCH candidate, or both. For example, the scheduling offset/application delay may define a quantity of slots between a slot associated with the last PDCCH candidate. In some aspects, by applying the scheduling offset/application delay, the UE 115-*e* and/or the base station 105-*e* may be configured to apply the changes to the minimum scheduling offset (e.g., apply the changes to the minK2 value, minK0 value) following an end of the scheduling offset/application delay.

At 1030, the UE 115-*e* and/or the base station 105-*e* may implement the changes to the minimum scheduling offset which were determined at 1020. In some aspects, the UE 115-*e* and the base station 105-*e* may implement the changes to the minimum scheduling offset based on the application of the scheduling offset/application delay. In particular, the UE 115-*e* and/or the base station 105-*e* may be configured to implement the changes to the minimum scheduling offset after an end of the scheduling offset/application delay, which was applied based on a timing of the last PDCCH candidate (e.g., based on a last symbol of a slot including the last PDCCH candidate).

In this regard, which minK0 values and/or minK0 values (e.g., which minimum scheduling offset) is applied to a respective PDSCH/PUSCH transmission may be based on the scheduling offset/application delay. If a PDSCH/PUSCH transmission is scheduled via a DCI received before an end of the scheduling offset/application delay, the old (e.g., unchanged) minimum scheduling offset is applied (e.g., unchanged minK2 values, min K0 values). Conversely, if a PDSCH/PUSCH transmission is scheduled via a DCI received after an end of the scheduling offset/application delay, the new changed (e.g., adjusted) minimum scheduling offset is applied (e.g., adjusted minK2 values, adjusted min K0 values).

At 1035, the UE 115-*e* may receive a DCI from the base station 105-*e*, where the DCI schedules a PDSCH transmission and/or a PUSCH transmission. In some aspects, the UE 115-*e* may receive the DCI scheduling the PDSCH transmission and/or a PUSCH transmission following an end of the scheduling offset/application delay (and therefore after the changes to the minimum scheduling offset have been implemented).

At 1040, the UE 115-*e* may receive, from the base station 105-*e*, a PDSCH transmission scheduled by the DCI received at 1035. The UE 115-*e* may receive, and the base station 105-*e* may transmit, the PDSCH transmission based on the scheduling offset/application delay at 1025, changing the minimum scheduling offset at 1030, or both. For example, the UE 115-*e* may receive the PDSCH transmission at 1040 in accordance with the adjusted minimum scheduling offset which was implemented at 1030 based on the application of the scheduling offset/application delay.

At 1045, the UE 115-*e* may transmit, to the base station 105-*e*, a PUSCH transmission scheduled by the DCI received at 1030. The UE 115-*e* may transmit, and the base station 105-*e* may receive, the PUSCH transmission based on the scheduling offset/application delay at 1025, changing the minimum scheduling offset at 1030, or both. For example, the UE 115-*e* may transmit the PUSCH transmission at 1045 in accordance with the adjusted minimum scheduling offset which was implemented at 1030 based on the application of the scheduling offset/application delay.

Techniques described herein may provide for improved scheduling of wireless communications. In particular, by defining signaling, rules, and/or configurations which enable the UE 115-*e* and base station 105-*e* to determine a timing of transmissions (e.g., PDSCH transmissions, PUSCH transmissions) scheduled via PDCCH repetitions, techniques described herein may enable the UE 115-*e* and base station 105-*e* to efficiently determine a timing of scheduled transmissions. Moreover, by enabling wireless devices to more efficiently determine a timing of transmissions scheduled via PDCCH repetitions, techniques described herein may enable more widespread use of communications using PDCCH repetitions within the wireless communications system, thereby improving a reliability of wireless communications, improving transmission diversity, and further protecting wireless communications against interference.

Figure 11:
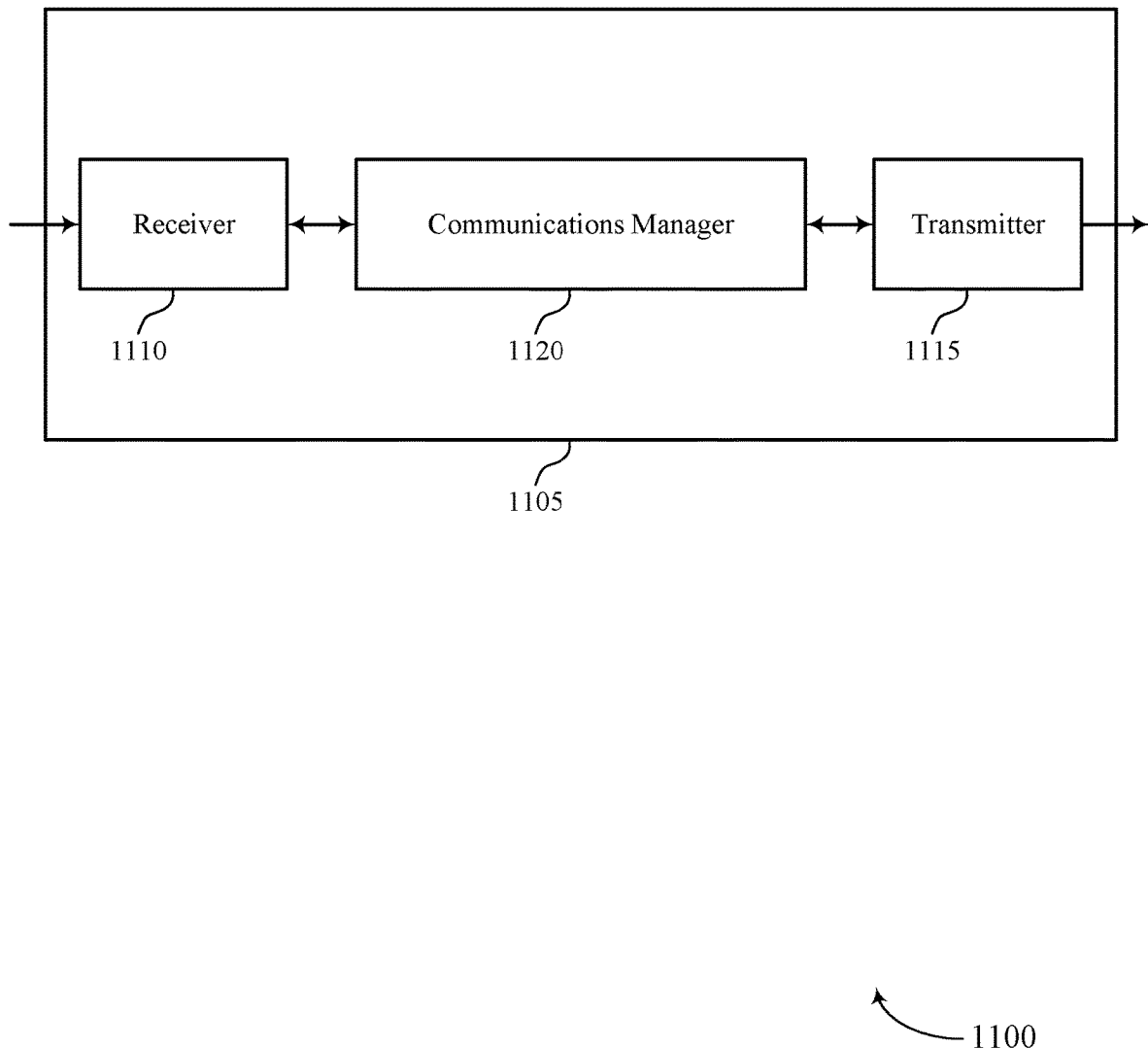
FIGS. 11 and 12 show block diagrams of devices that support techniques for timing relationships for PDCCH repetition in accordance with aspects of the present disclosure.

FIG. 11 shows a block diagram 1100 of a device 1105 that supports techniques for timing relationships for PDCCH repetition in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for timing relationships for PDCCH repetition). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for timing relationships for PDCCH repetition). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for timing relationships for PDCCH repetition as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. For example, the communications manager 1120 may be configured as or otherwise support a means for monitoring a set of multiple downlink control channel candidates that are associated with each other, the set of multiple downlink control channel candidates including at least a first downlink control channel candidate in a first TTI and a last downlink control channel candidate in a second TTI that is after the first TTI. The communications manager 1120 may be configured as or otherwise support a means for receiving, from a base station and based on the monitoring, at least one repetition of DCI within one of the first downlink control channel candidate or the last downlink control channel candidate, the DCI scheduling a transmission between the base station and the UE. The communications manager 1120 may be configured as or otherwise support a means for applying a scheduling offset associated with the transmission based on a timing of the last downlink control channel candidate. The communications manager 1120 may be configured as or otherwise support a means for communicating with the base station via the transmission based on the scheduling offset.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for signaling, rules, and/or configurations which enable UEs 115 and base stations 105 to determine a timing of transmissions scheduled via PDCCH repetitions. In particular, techniques described herein may enable UEs 115 and base stations 105 to efficiently determine a timing of scheduled transmissions. Moreover, by enabling wireless devices to more efficiently determine a timing of transmissions scheduled via PDCCH repetitions, techniques described herein may enable more widespread use of communications using PDCCH repetitions within the wireless communications system, thereby improving a reliability of wireless communications, improving transmission diversity, and further protecting wireless communications against interference.

Figure 12:
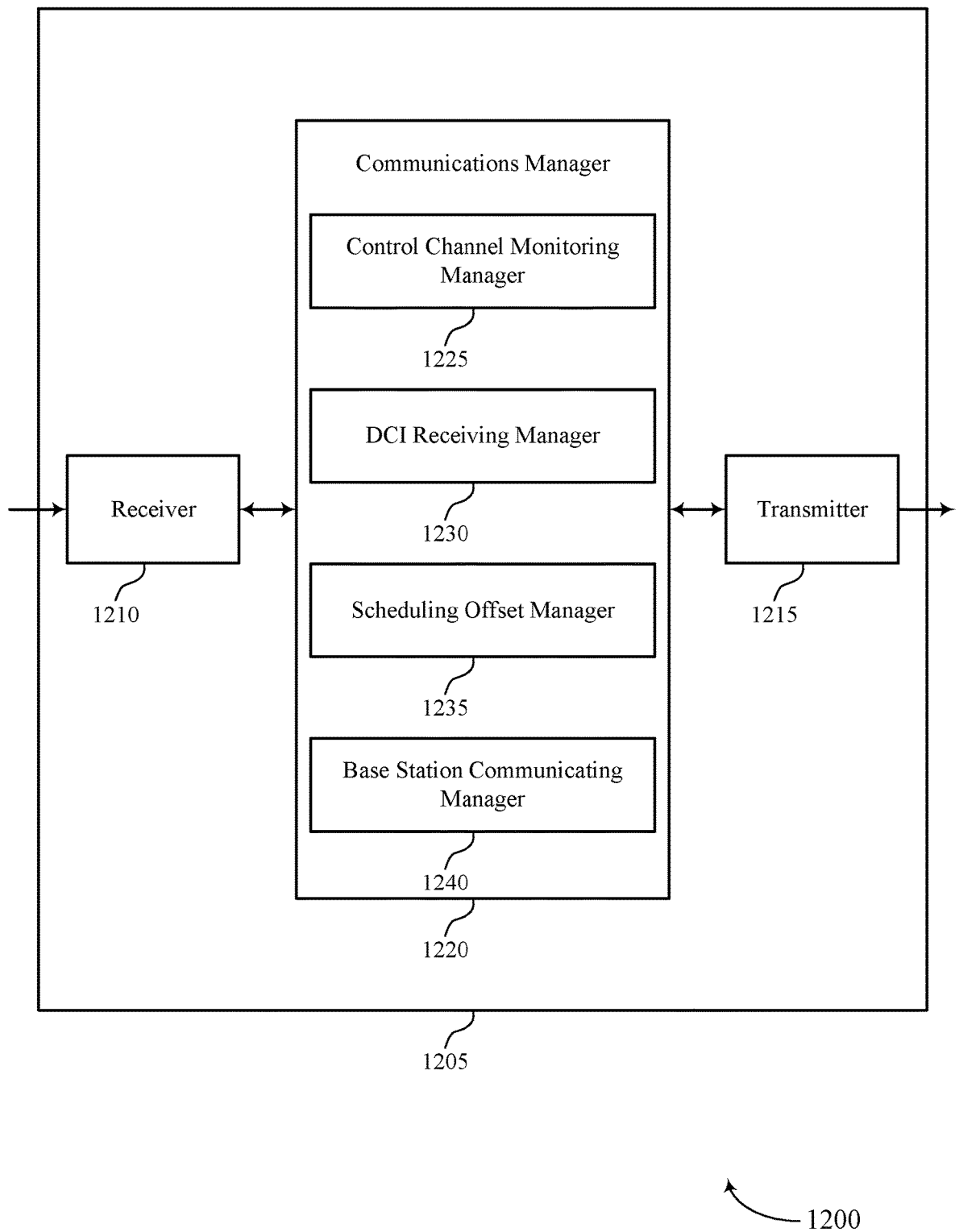

FIG. 12 shows a block diagram 1200 of a device 1205 that supports techniques for timing relationships for PDCCH repetition in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for timing relationships for PDCCH repetition). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for timing relationships for PDCCH repetition). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for timing relationships for PDCCH repetition as described herein. For example, the communications manager 1220 may include a control channel monitoring manager 1225, a DCI receiving manager 1230, a scheduling offset manager 1235, a base station communicating manager 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a UE in accordance with examples as disclosed herein. The control channel monitoring manager 1225 may be configured as or otherwise support a means for monitoring a set of multiple downlink control channel candidates that are associated with each other, the set of multiple downlink control channel candidates including at least a first downlink control channel candidate in a first TTI and a last downlink control channel candidate in a second TTI that is after the first TTI. The DCI receiving manager 1230 may be configured as or otherwise support a means for receiving, from a base station and based on the monitoring, at least one repetition of DCI within one of the first downlink control channel candidate or the last downlink control channel candidate, the DCI scheduling a transmission between the base station and the UE. The scheduling offset manager 1235 may be configured as or otherwise support a means for applying a scheduling offset associated with the transmission based on a timing of the last downlink control channel candidate. The base station communicating manager 1240 may be configured as or otherwise support a means for communicating with the base station via the transmission based on the scheduling offset.

Figure 13:
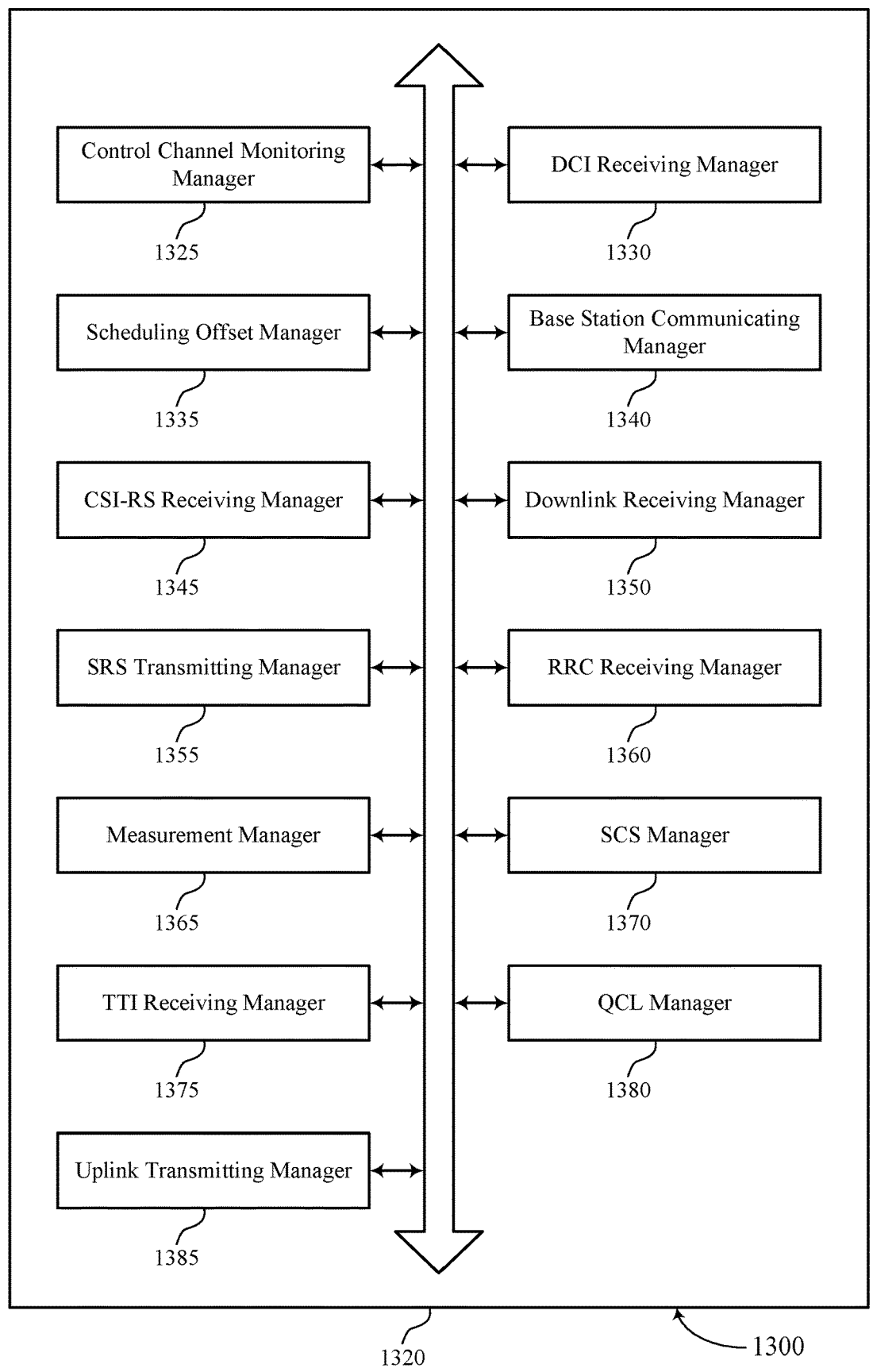
FIG. 13 shows a block diagram of a communications manager that supports techniques for timing relationships for PDCCH repetition in accordance with aspects of the present disclosure.

FIG. 13 shows a block diagram 1300 of a communications manager 1320 that supports techniques for timing relationships for PDCCH repetition in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for timing relationships for PDCCH repetition as described herein. For example, the communications manager 1320 may include a control channel monitoring manager 1325, a DCI receiving manager 1330, a scheduling offset manager 1335, a base station communicating manager 1340, a CSI-RS receiving manager 1345, a downlink receiving manager 1350, an SRS transmitting manager 1355, an RRC receiving manager 1360, a measurement manager 1365, an SCS manager 1370, a TTI receiving manager 1375, a QCL manager 1380, an uplink transmitting manager 1385, or any combination thereof. Each of these components may communicate, directly or indirectly, with one another (e.g., via one or more buses).

The communications manager 1320 may support wireless communication at a UE in accordance with examples as disclosed herein. The control channel monitoring manager 1325 may be configured as or otherwise support a means for monitoring a set of multiple downlink control channel candidates that are associated with each other, the set of multiple downlink control channel candidates including at least a first downlink control channel candidate in a first TTI and a last downlink control channel candidate in a second TTI that is after the first TTI. The DCI receiving manager 1330 may be configured as or otherwise support a means for receiving, from a base station and based on the monitoring, at least one repetition of DCI within one of the first downlink control channel candidate or the last downlink control channel candidate, the DCI scheduling a transmission between the base station and the UE. The scheduling offset manager 1335 may be configured as or otherwise support a means for applying a scheduling offset associated with the transmission based on a timing of the last downlink control channel candidate. The base station communicating manager 1340 may be configured as or otherwise support a means for communicating with the base station via the transmission based on the scheduling offset.

In some examples, to support applying the scheduling offset based on the timing of the last downlink control channel candidate, the scheduling offset manager 1335 may be configured as or otherwise support a means for applying the scheduling offset regardless of whether a first repetition of the DCI is detected within the first downlink control channel candidate, a second repetition of the DCI is detected within the last downlink control channel candidate, or both the first repetition and the second repetition are detected within the first downlink control channel candidate and the last downlink control channel candidate, respectively.

In some examples, to support communicating with the base station via the transmission, the CSI-RS receiving manager 1345 may be configured as or otherwise support a means for receiving the CSI-RS in accordance with the scheduling offset which is applied based on the timing of the last downlink control channel candidate.

In some examples, the RRC receiving manager 1360 may be configured as or otherwise support a means for receiving, from the base station, a RRC message indicating a set of trigger state configurations. In some examples, the DCI receiving manager 1330 may be configured as or otherwise support a means for receiving, via the at least one repetition of the DCI, an indication of a trigger state configuration included within the set of trigger state configurations, where receiving the CSI-RS is based on the trigger state configuration.

In some examples, the scheduling offset includes an offset between a last symbol of the last downlink control channel candidate and a first symbol of the CSI-RS.

In some examples, the QCL manager 1380 may be configured as or otherwise support a means for determining a QCL configuration for receiving the CSI-RS based on a comparison of the scheduling offset and a beam switching threshold of the UE, where the CSI-RS is received in accordance with the QCL configuration.

In some examples, the QCL manager 1380 may be configured as or otherwise support a means for determining, based on the scheduling offset being greater than or equal to the beam switching threshold of the UE, the QCL configuration based on one or more TCI states received via the DCI.

In some examples, the downlink receiving manager 1350 may be configured as or otherwise support a means for receiving, from the base station, a downlink transmission within a set of resources associated with the CSI-RS. In some examples, the QCL manager 1380 may be configured as or otherwise support a means for determining, based on the scheduling offset being less than the beam switching threshold of the UE, the QCL configuration based on one or more TCI states received via the downlink transmission.

In some examples, the QCL manager 1380 may be configured as or otherwise support a means for determining, based on the scheduling offset being less than the beam switching threshold of the UE, the QCL configuration associated with a CORESET within a last TTI of a search space set monitored by the UE.

In some examples, the QCL manager 1380 may be configured as or otherwise support a means for determining, based on the scheduling offset being less than the beam switching threshold of the UE, the QCL configuration associated with a lowest activated TCI state of a serving cell associated with the CSI-RS.

In some examples, the uplink transmitting manager 1385 may be configured as or otherwise support a means for transmitting, to the base station, an indication of the beam switching threshold of the UE. In some examples, the CSI-RS receiving manager 1345 may be configured as or otherwise support a means for determining one or more parameters associated with reception of the CSI-RS based on the comparison of the scheduling offset and the beam switching threshold, where the CSI-RS is received based on the one or more parameters.

In some examples, the scheduling offset manager 1335 may be configured as or otherwise support a means for determining a timing delay associated with reception of the CSI-RS based on a SCS of a downlink control channel within which the at least one repetition of DCI was received. In some examples, the scheduling offset manager 1335 may be configured as or otherwise support a means for determining an adjusted beam switching threshold of the UE based on the timing delay. In some examples, the CSI-RS receiving manager 1345 may be configured as or otherwise support a means for determining one or more parameters associated with reception of the CSI-RS based on the comparison of the scheduling offset and the adjusted beam switching threshold, where the CSI-RS is received based on the one or more parameters.

In some examples, to support communicating with the base station via the transmission, the downlink receiving manager 1350 may be configured as or otherwise support a means for receiving, from the base station, the downlink shared channel transmission, the CSI-RS, or both, in accordance with a minimum scheduling offset, the minimum scheduling offset being less than or equal to the scheduling offset which is applied based on the timing of the last downlink control channel candidate.

In some examples, the SCS manager 1370 may be configured as or otherwise support a means for determining a first SCS associated with a downlink control channel on which the at least one repetition of the DCI was received. In some examples, the SCS manager 1370 may be configured as or otherwise support a means for determining a second SCS associated with a channel on which the transmission scheduled by the DCI is to be performed, where the minimum scheduling offset is based on a comparison of the first SCS and the second SCS.

In some examples, to support communicating with the base station via the transmission, the SRS transmitting manager 1355 may be configured as or otherwise support a means for transmitting, to the base station, the set of SRSs after the scheduling offset which is applied based on the timing of the last downlink control channel candidate.

In some examples, the transmission scheduled by the DCI includes a set of SRSs, and the RRC receiving manager 1360 may be configured as or otherwise support a means for receiving, from the base station, a RRC message including an indication of the scheduling offset. In some examples, the scheduling offset includes a quantity of TTIs between the second TTI and a TTI of the transmission.

In some examples, the transmission scheduled by the DCI includes a set of SRSs, and the CSI-RS receiving manager 1345 may be configured as or otherwise support a means for receiving, from the base station, a CSI-RS. In some examples, the transmission scheduled by the DCI includes a set of SRSs, and the measurement manager 1365 may be configured as or otherwise support a means for performing one or more measurements for the CSI-RS. In some examples, the transmission scheduled by the DCI includes a set of SRSs, and the SRS transmitting manager 1355 may be configured as or otherwise support a means for determining one or more parameters associated with transmission of the set of SRSs based on the one or more measurements. In some examples, the transmission scheduled by the DCI includes a set of SRSs, and the SCS manager 1370 may be configured as or otherwise support a means for transmitting the set of SRSs based on the one or more parameters.

In some examples, the one or more parameters include a precoder for the set of SRSs.

In some examples, the CSI-RS is received within the second TTI.

In some examples, the transmission scheduled by the DCI includes a set of SRSs, and the TTI receiving manager 1375 may be configured as or otherwise support a means for receiving, from the base station, an indication of a TTI offset associated with reception of a CSI-RS. In some examples, the transmission scheduled by the DCI includes a set of SRSs, and the CSI-RS receiving manager 1345 may be configured as or otherwise support a means for determining a resource for reception of the CSI-RS based on the TTI offset and the second TTI. In some examples, the transmission scheduled by the DCI includes a set of SRSs, and the CSI-RS receiving manager 1345 may be configured as or otherwise support a means for receiving the CSI-RS within the resource. In some examples, the transmission scheduled by the DCI includes a set of SRSs, and the SRS transmitting manager 1355 may be configured as or otherwise support a means for transmitting the set of SRSs based on the CSI-RS.

In some examples, the DCI includes DCI which is specific to the UE, group-common DCI, or both.

In some examples, the DCI receiving manager 1330 may be configured as or otherwise support a means for receiving, via the DCI, a change in one or more values of a minimum scheduling offset indicator field of the DCI. In some examples, the scheduling offset manager 1335 may be configured as or otherwise support a means for determining that the change in the one or more values of the minimum scheduling offset indicator field is to be applied after the scheduling offset which is applied based on the timing of the last downlink control channel candidate.

In some examples, the RRC receiving manager 1360 may be configured as or otherwise support a means for receiving, from the base station, a RRC message indicating a first minimum scheduling offset and a second minimum scheduling offset associated with the transmission scheduled by the DCI, where the change in the one or more values of the minimum scheduling offset indicator field are based on the first minimum scheduling offset and the second minimum scheduling offset.

In some examples, the transmission scheduled by the DCI includes a PDSCH, a PUSCH, or both. In some examples, the scheduling offset includes a minimum K0 value associated with the PDSCH, a minimum K2 value associated with the PUSCH, or both.

In some examples, the first TTI and the second TTI are each a slot.

Figure 14:
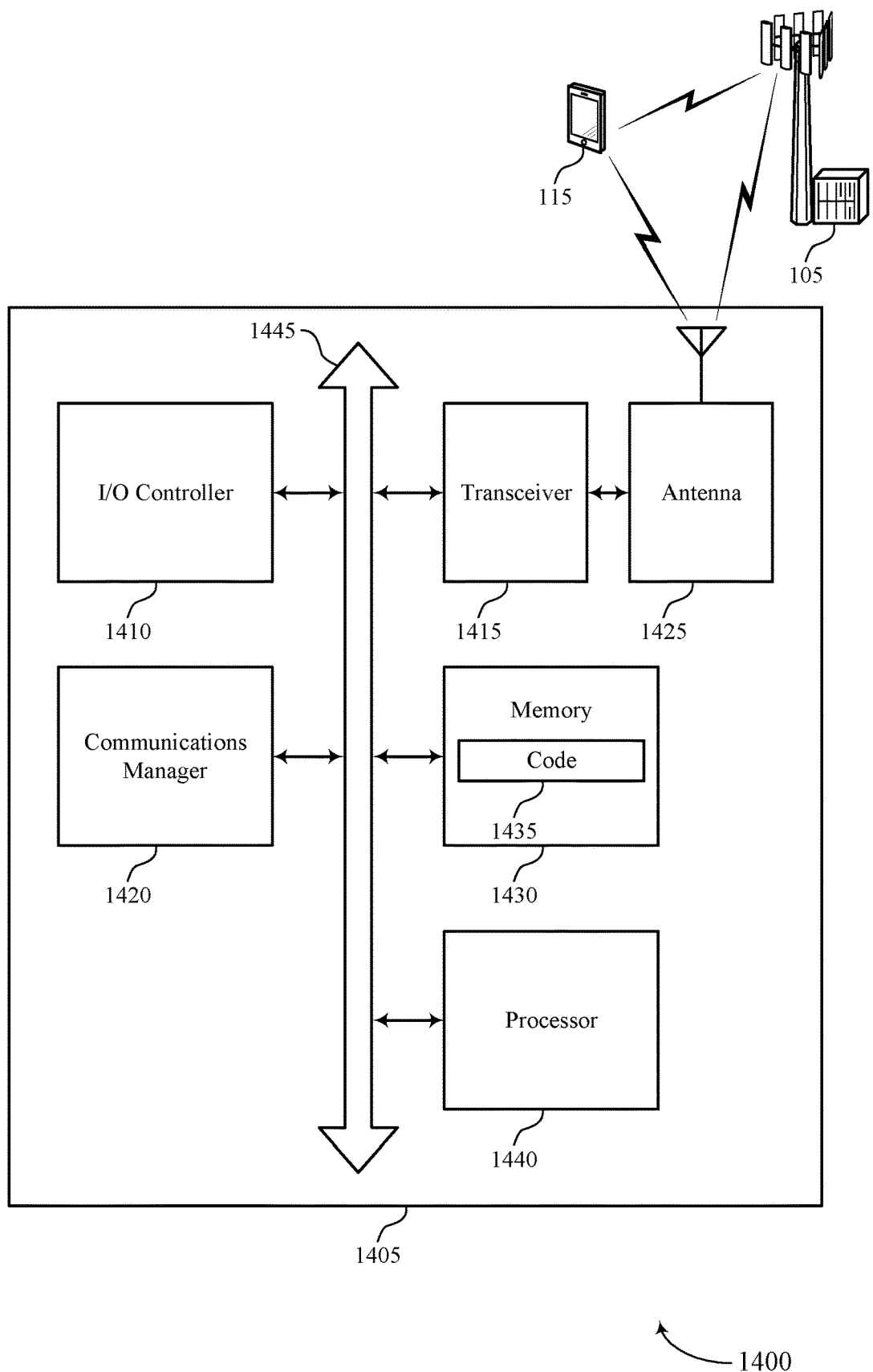
FIG. 14 shows a diagram of a system including a device that supports techniques for timing relationships for PDCCH repetition in accordance with aspects of the present disclosure.

FIG. 14 shows a diagram of a system 1400 including a device 1405 that supports techniques for timing relationships for PDCCH repetition in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for timing relationships for PDCCH repetition). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a UE in accordance with examples as disclosed herein. For example, the communications manager 1420 may be configured as or otherwise support a means for monitoring a set of multiple downlink control channel candidates that are associated with each other, the set of multiple downlink control channel candidates including at least a first downlink control channel candidate in a first TTI and a last downlink control channel candidate in a second TTI that is after the first TTI. The communications manager 1420 may be configured as or otherwise support a means for receiving, from a base station and based on the monitoring, at least one repetition of DCI within one of the first downlink control channel candidate or the last downlink control channel candidate, the DCI scheduling a transmission between the base station and the UE. The communications manager 1420 may be configured as or otherwise support a means for applying a scheduling offset associated with the transmission based on a timing of the last downlink control channel candidate. The communications manager 1420 may be configured as or otherwise support a means for communicating with the base station via the transmission based on the scheduling offset.

By including or configuring the communications manager 1420 in accordance with examples as described herein, the device 1405 may support techniques for signaling, rules, and/or configurations which enable UEs 115 and base stations 105 to determine a timing of transmissions scheduled via PDCCH repetitions. In particular, techniques described herein may enable UEs 115 and base stations 105 to efficiently determine a timing of scheduled transmissions. Moreover, by enabling wireless devices to more efficiently determine a timing of transmissions scheduled via PDCCH repetitions, techniques described herein may enable more widespread use of communications using PDCCH repetitions within the wireless communications system, thereby improving a reliability of wireless communications, improving transmission diversity, and further protecting wireless communications against interference.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for timing relationships for PDCCH repetition as described herein, or the processor 1440 and the memory 1430 may be otherwise configured to perform or support such operations.

Figure 15:
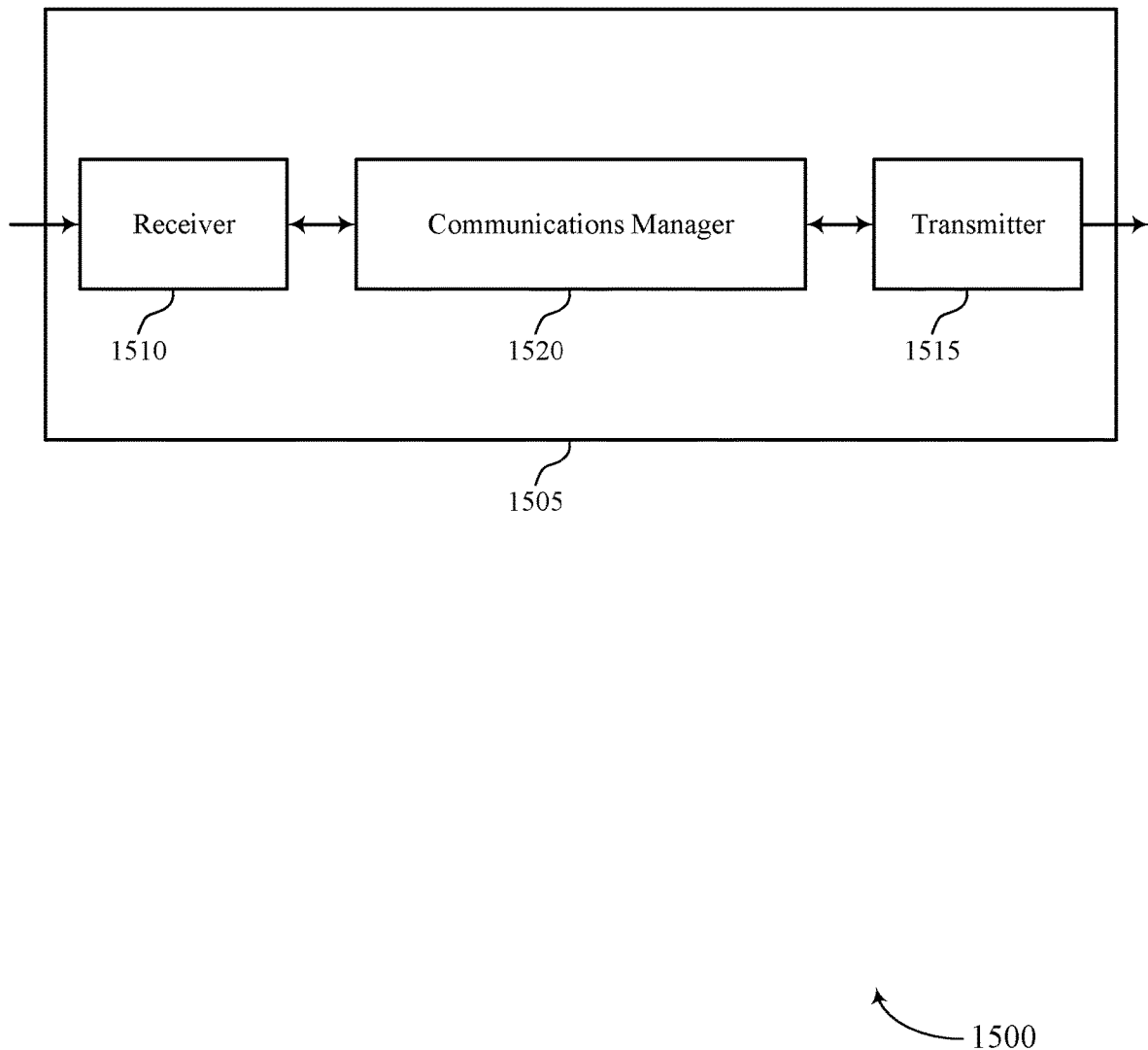
FIGS. 15 and 16 show block diagrams of devices that support techniques for timing relationships for PDCCH repetition in accordance with aspects of the present disclosure.

FIG. 15 shows a block diagram 1500 of a device 1505 that supports techniques for timing relationships for PDCCH repetition in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for timing relationships for PDCCH repetition). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for timing relationships for PDCCH repetition). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of techniques for timing relationships for PDCCH repetition as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software) executed by a processor. If implemented in code executed by a processor, the functions of the communications manager 1520, the receiver 1510, the transmitter 1515, or various combinations or components thereof may be performed by a general-purpose processor, a DSP, a CPU, a GPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a base station in accordance with examples as disclosed herein. For example, the communications manager 1520 may be configured as or otherwise support a means for transmitting, to a UE within a set of multiple downlink control channel candidates that are associated with each other, at least one repetition of DCI within a first downlink control channel candidate of the set of multiple downlink control channel candidates or a last downlink control channel candidate of the set of multiple downlink control channel candidates, the first downlink control channel candidate being in a first TTI and the last downlink control channel candidate being in a second TTI that is after the first TTI, the DCI scheduling a transmission between the base station and the UE. The communications manager 1520 may be configured as or otherwise support a means for applying a scheduling offset associated with the transmission based on a timing of the last downlink control channel candidate. The communications manager 1520 may be configured as or otherwise support a means for communicating with the UE via the transmission based on the scheduling offset.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for signaling, rules, and/or configurations which enable UEs 115 and base stations 105 to determine a timing of transmissions scheduled via PDCCH repetitions. In particular, techniques described herein may enable UEs 115 and base stations 105 to efficiently determine a timing of scheduled transmissions. Moreover, by enabling wireless devices to more efficiently determine a timing of transmissions scheduled via PDCCH repetitions, techniques described herein may enable more widespread use of communications using PDCCH repetitions within the wireless communications system, thereby improving a reliability of wireless communications, improving transmission diversity, and further protecting wireless communications against interference.

Figure 16:
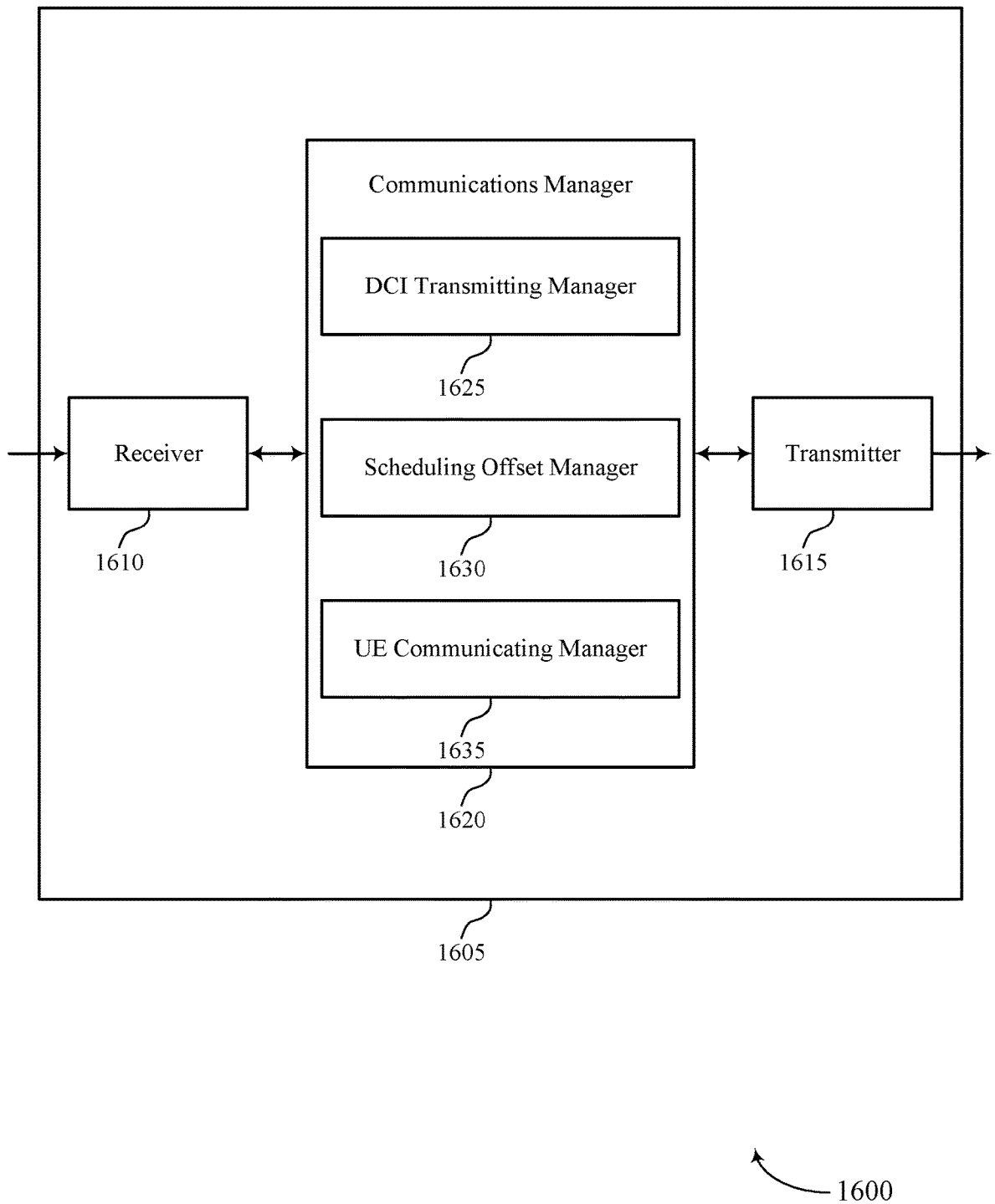

FIG. 16 shows a block diagram 1600 of a device 1605 that supports techniques for timing relationships for PDCCH repetition in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to techniques for timing relationships for PDCCH repetition). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to techniques for timing relationships for PDCCH repetition). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of techniques for timing relationships for PDCCH repetition as described herein. For example, the communications manager 1620 may include a DCI transmitting manager 1625, a scheduling offset manager 1630, a UE communicating manager 1635, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a base station in accordance with examples as disclosed herein. The DCI transmitting manager 1625 may be configured as or otherwise support a means for transmitting, to a UE within a set of multiple downlink control channel candidates that are associated with each other, at least one repetition of DCI within a first downlink control channel candidate of the set of multiple downlink control channel candidates or a last downlink control channel candidate of the set of multiple downlink control channel candidates, the first downlink control channel candidate being in a first TTI and the last downlink control channel candidate being in a second TTI that is after the first TTI, the DCI scheduling a transmission between the base station and the UE. The scheduling offset manager 1630 may be configured as or otherwise support a means for applying a scheduling offset associated with the transmission based on a timing of the last downlink control channel candidate. The UE communicating manager 1635 may be configured as or otherwise support a means for communicating with the UE via the transmission based on the scheduling offset.

Figure 17:
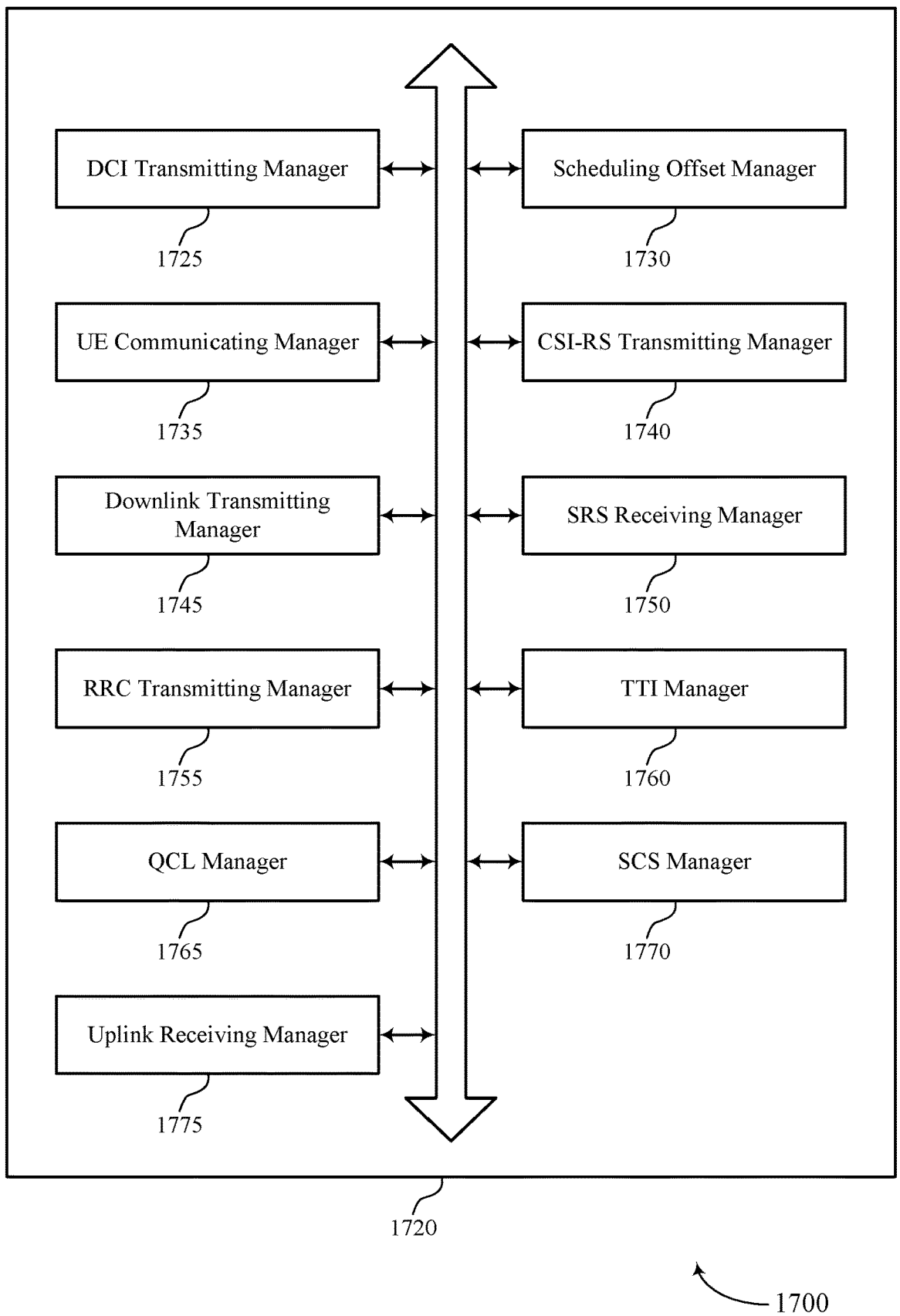
FIG. 17 shows a block diagram of a communications manager that supports techniques for timing relationships for PDCCH repetition in accordance with aspects of the present disclosure.

FIG. 17 shows a block diagram 1700 of a communications manager 1720 that supports techniques for timing relationships for PDCCH repetition in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of techniques for timing relationships for PDCCH repetition as described herein. For example, the communications manager 1720 may include a DCI transmitting manager 1725, a scheduling offset manager 1730, a UE communicating manager 1735, a CSI-RS transmitting manager 1740, a downlink transmitting manager 1745, an SRS receiving manager 1750, an RRC transmitting manager 1755, a TTI manager 1760, a QCL manager 1765, an SCS manager 1770, an uplink receiving manager 1775, or any combination thereof. Each of these components may communicate, directly or indirectly, with one another (e.g., via one or more buses).

The communications manager 1720 may support wireless communication at a base station in accordance with examples as disclosed herein. The DCI transmitting manager 1725 may be configured as or otherwise support a means for transmitting, to a UE within a set of multiple downlink control channel candidates that are associated with each other, at least one repetition of DCI within a first downlink control channel candidate of the set of multiple downlink control channel candidates or a last downlink control channel candidate of the set of multiple downlink control channel candidates, the first downlink control channel candidate being in a first TTI and the last downlink control channel candidate being in a second TTI that is after the first TTI, the DCI scheduling a transmission between the base station and the UE. The scheduling offset manager 1730 may be configured as or otherwise support a means for applying a scheduling offset associated with the transmission based on a timing of the last downlink control channel candidate. The UE communicating manager 1735 may be configured as or otherwise support a means for communicating with the UE via the transmission based on the scheduling offset.

In some examples, to support transmitting the at least one repetition of DCI, the DCI transmitting manager 1725 may be configured as or otherwise support a means for transmitting a first repetition of the DCI within the first downlink control channel candidate. In some examples, to support transmitting the at least one repetition of DCI, the DCI transmitting manager 1725 may be configured as or otherwise support a means for transmitting a second repetition of the DCI within the last downlink control channel candidate.

In some examples, to support communicating with the UE via the transmission, the CSI-RS transmitting manager 1740 may be configured as or otherwise support a means for transmitting the CSI-RS in accordance with the scheduling offset which is applied based on the timing of the last downlink control channel candidate.

In some examples, the RRC transmitting manager 1755 may be configured as or otherwise support a means for transmitting, to the UE, a RRC message indicating a set of trigger state configurations. In some examples, the DCI transmitting manager 1725 may be configured as or otherwise support a means for transmitting, via the at least one repetition of the DCI, an indication of a trigger state configuration included within the set of trigger state configurations, where transmitting the CSI-RS is based on the trigger state configuration.

In some examples, the scheduling offset includes an offset between a last symbol of the last downlink control channel candidate and a first symbol of the CSI-RS.

In some examples, the QCL manager 1765 may be configured as or otherwise support a means for determining a QCL configuration for transmitting the CSI-RS based on a comparison of the scheduling offset and a beam switching threshold of the UE, where the CSI-RS is transmitted in accordance with the QCL configuration.

In some examples, the QCL manager 1765 may be configured as or otherwise support a means for determining, based on the scheduling offset being greater than or equal to the beam switching threshold of the UE, the QCL configuration based on one or more TCI states transmitted via the DCI.

In some examples, the downlink transmitting manager 1745 may be configured as or otherwise support a means for transmitting, to the UE, a downlink transmission within a set of resources associated with the CSI-RS. In some examples, the QCL manager 1765 may be configured as or otherwise support a means for determining, based on the scheduling offset being less than the beam switching threshold of the UE, the QCL configuration based on one or more TCI states received via the downlink transmission.

In some examples, the QCL manager 1765 may be configured as or otherwise support a means for determining, based on the scheduling offset being less than the beam switching threshold of the UE, the QCL configuration associated with a CORESET within a last TTI of a search space set monitored by the UE.

In some examples, the QCL manager 1765 may be configured as or otherwise support a means for determining, based on the scheduling offset being less than the beam switching threshold of the UE, the QCL configuration associated with a lowest activated TCI state of a serving cell associated with the CSI-RS.

In some examples, the uplink receiving manager 1775 may be configured as or otherwise support a means for receiving, from the UE, an indication of the beam switching threshold of the UE. In some examples, the CSI-RS transmitting manager 1740 may be configured as or otherwise support a means for determining one or more parameters associated with transmission of the CSI-RS based on the comparison of the scheduling offset and the beam switching threshold, where the CSI-RS is transmitted based on the one or more parameters.

In some examples, the scheduling offset manager 1730 may be configured as or otherwise support a means for determining a timing delay associated with transmission of the CSI-RS based on a SCS of a downlink control channel within which the at least one repetition of DCI was transmitted. In some examples, the scheduling offset manager 1730 may be configured as or otherwise support a means for determining an adjusted beam switching threshold of the UE based on the timing delay. In some examples, the CSI-RS transmitting manager 1740 may be configured as or otherwise support a means for determining one or more parameters associated with transmission of the CSI-RS based on the comparison of the scheduling offset and the adjusted beam switching threshold, where the CSI-RS is transmitted based on the one or more parameters.

In some examples, to support communicating with the UE via the transmission, the downlink transmitting manager 1745 may be configured as or otherwise support a means for transmitting, to the UE, the downlink shared channel transmission, the CSI-RS, or both, in accordance with a minimum scheduling offset, the minimum scheduling offset being less than or equal to the scheduling offset which is applied based on the timing of the last downlink control channel candidate.

In some examples, the SCS manager 1770 may be configured as or otherwise support a means for determining a first SCS associated with a downlink control channel on which the at least one repetition of the DCI was received. In some examples, the SCS manager 1770 may be configured as or otherwise support a means for determining a second SCS associated with a channel on which the transmission scheduled by the DCI is to be performed, where the minimum scheduling offset is based on a comparison of the first SCS and the second SCS.

In some examples, to support communicating with the base station via the transmission, the SRS receiving manager 1750 may be configured as or otherwise support a means for receiving, from the UE, the set of SRSs after the scheduling offset which is applied based on the timing of the last downlink control channel candidate.

In some examples, the transmission scheduled by the DCI includes a set of SRSs, and the RRC transmitting manager 1755 may be configured as or otherwise support a means for transmitting, to the UE, a RRC message including an indication of the scheduling offset.

In some examples, the transmission scheduled by the DCI includes a set of SRSs. In some examples, the scheduling offset includes a quantity of TTIs between the second TTI and a TTI of the transmission.

In some examples, the transmission scheduled by the DCI includes a set of SRSs, and the CSI-RS transmitting manager 1740 may be configured as or otherwise support a means for transmitting, to the UE, a CSI-RS. In some examples, the transmission scheduled by the DCI includes a set of SRSs, and the SRS receiving manager 1750 may be configured as or otherwise support a means for determining one or more parameters associated with transmission of the set of SRSs based on the CSI-RS. In some examples, the transmission scheduled by the DCI includes a set of SRSs, and the SRS receiving manager 1750 may be configured as or otherwise support a means for receiving the set of SRSs based on the one or more parameters.

In some examples, the one or more parameters include a precoder for the set of SRSs.

In some examples, the CSI-RS is transmitted within the second TTI.

In some examples, the transmission scheduled by the DCI includes a set of SRSs, and the TTI manager 1760 may be configured as or otherwise support a means for transmitting, to the UE, an indication of a TTI offset associated with transmission of a CSI-RS. In some examples, the transmission scheduled by the DCI includes a set of SRSs, and the CSI-RS transmitting manager 1740 may be configured as or otherwise support a means for determining a resource for transmission of the CSI-RS based on the TTI offset and the second TTI. In some examples, the transmission scheduled by the DCI includes a set of SRSs, and the CSI-RS transmitting manager 1740 may be configured as or otherwise support a means for transmitting the CSI-RS within the resource. In some examples, the transmission scheduled by the DCI includes a set of SRSs, and the SRS receiving manager 1750 may be configured as or otherwise support a means for receiving the set of SRSs based on the CSI-RS.

In some examples, the DCI includes DCI which is specific to the UE, group-common DCI, or both.

In some examples, the DCI transmitting manager 1725 may be configured as or otherwise support a means for transmitting, via the DCI, a change in one or more values of a minimum scheduling offset indicator field of the DCI. In some examples, the scheduling offset manager 1730 may be configured as or otherwise support a means for determining that the change in the one or more values of the minimum scheduling offset indicator field is to be applied after the scheduling offset which is applied based on the timing of the last downlink control channel candidate.

In some examples, the RRC transmitting manager 1755 may be configured as or otherwise support a means for transmitting, to the UE, a RRC message indicating a first minimum scheduling offset and a second minimum scheduling offset associated with the transmission scheduled by the DCI, where the change in the one or more values of the minimum scheduling offset indicator field are based on the first minimum scheduling offset and the second minimum scheduling offset.

In some examples, the transmission scheduled by the DCI includes a PDSCH, a PUSCH, or both. In some examples, the scheduling offset includes a minimum K0 value associated with the PDSCH, a minimum K2 value associated with the PUSCH, or both.

In some examples, the first TTI and the second TTI are each a slot.

Figure 18:
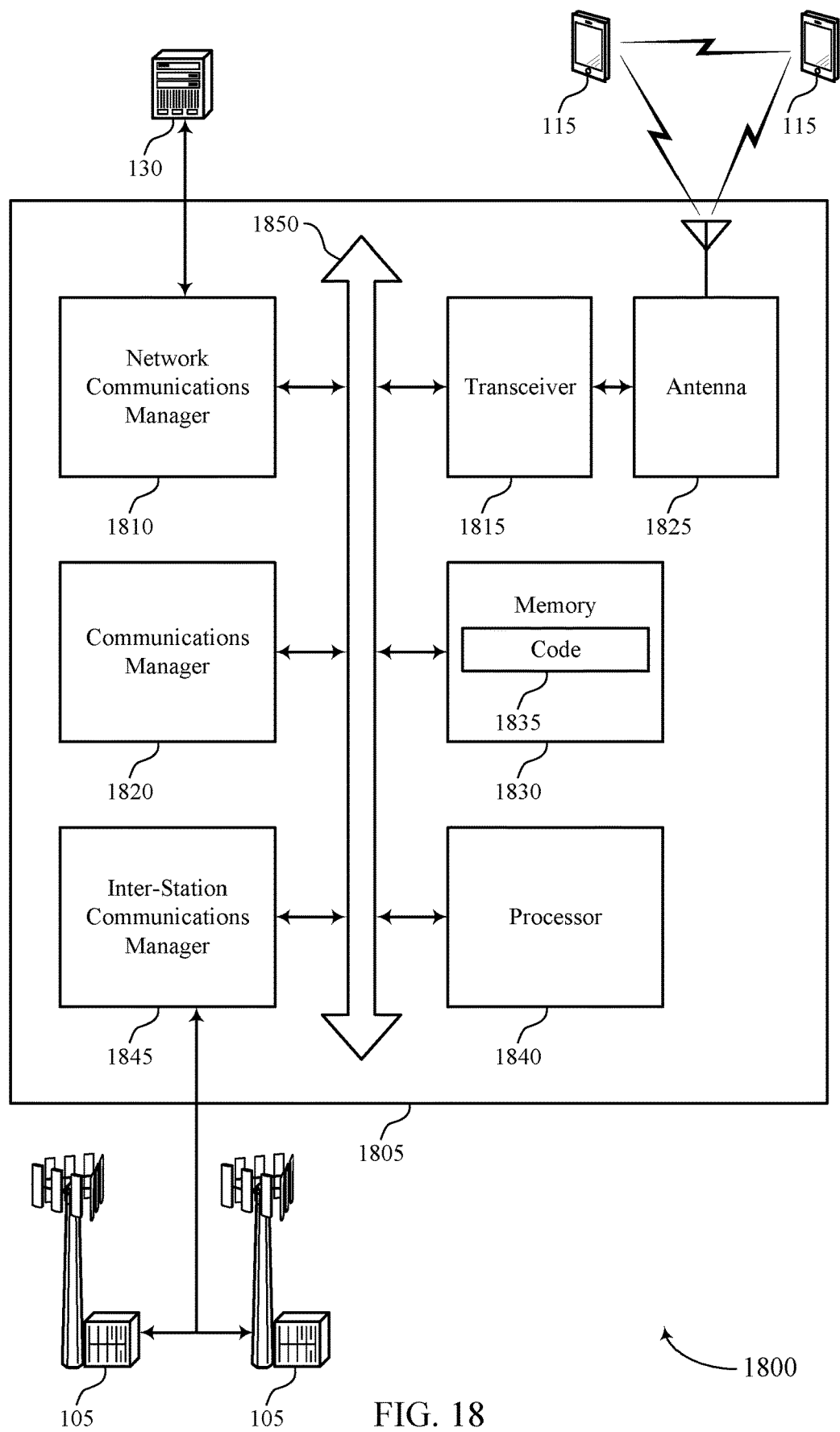
FIG. 18 shows a diagram of a system including a device that supports techniques for timing relationships for PDCCH repetition in accordance with aspects of the present disclosure.

FIG. 18 shows a diagram of a system 1800 including a device 1805 that supports techniques for timing relationships for PDCCH repetition in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting techniques for timing relationships for PDCCH repetition). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication at a base station in accordance with examples as disclosed herein. For example, the communications manager 1820 may be configured as or otherwise support a means for transmitting, to a UE within a set of multiple downlink control channel candidates that are associated with each other, at least one repetition of DCI within a first downlink control channel candidate of the set of multiple downlink control channel candidates or a last downlink control channel candidate of the set of multiple downlink control channel candidates, the first downlink control channel candidate being in a first TTI and the last downlink control channel candidate being in a second TTI that is after the first TTI, the DCI scheduling a transmission between the base station and the UE. The communications manager 1820 may be configured as or otherwise support a means for applying a scheduling offset associated with the transmission based on a timing of the last downlink control channel candidate. The communications manager 1820 may be configured as or otherwise support a means for communicating with the UE via the transmission based on the scheduling offset.

By including or configuring the communications manager 1820 in accordance with examples as described herein, the device 1805 may support techniques for signaling, rules, and/or configurations which enable UEs 115 and base stations 105 to determine a timing of transmissions scheduled via PDCCH repetitions. In particular, techniques described herein may enable UEs 115 and base stations 105 to efficiently determine a timing of scheduled transmissions. Moreover, by enabling wireless devices to more efficiently determine a timing of transmissions scheduled via PDCCH repetitions, techniques described herein may enable more widespread use of communications using PDCCH repetitions within the wireless communications system, thereby improving a reliability of wireless communications, improving transmission diversity, and further protecting wireless communications against interference.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of techniques for timing relationships for PDCCH repetition as described herein, or the processor 1840 and the memory 1830 may be otherwise configured to perform or support such operations.

Figure 19:
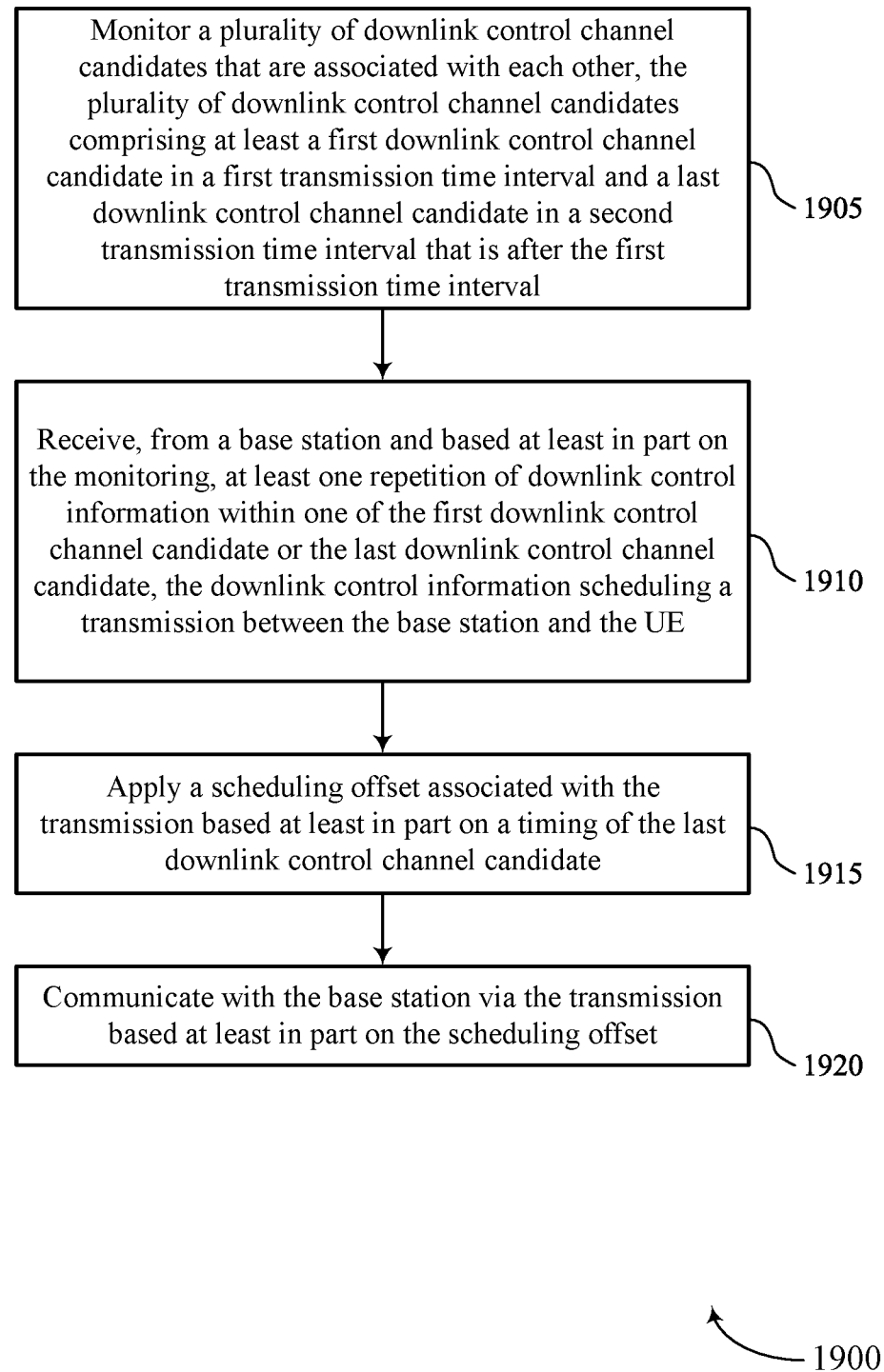
FIGS. 19 through 21 show flowcharts illustrating methods that support techniques for timing relationships for PDCCH repetition in accordance with aspects of the present disclosure.

FIG. 19 shows a flowchart illustrating a method 1900 that supports techniques for timing relationships for PDCCH repetition in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include monitoring a set of multiple downlink control channel candidates that are associated with each other, the set of multiple downlink control channel candidates including at least a first downlink control channel candidate in a first TTI and a last downlink control channel candidate in a second TTI that is after the first TTI. The operations of 1905 may be performed in accordance with examples as disclosed herein. In some examples, aspects of the operations of 1905 may be performed by a control channel monitoring manager 1325 as described with reference to FIG. 13.

At 1910, the method may include receiving, from a base station and based at least in part on the monitoring, at least one repetition of DCI within one of the first downlink control channel candidate or the last downlink control channel candidate, the DCI scheduling a transmission between the base station and the UE. The operations of 1910 may be performed in accordance with examples as disclosed herein. In some examples, aspects of the operations of 1910 may be performed by a DCI receiving manager 1330 as described with reference to FIG. 13.

At 1915, the method may include applying a scheduling offset associated with the transmission based at least in part on a timing of the last downlink control channel candidate. The operations of 1915 may be performed in accordance with examples as disclosed herein. In some examples, aspects of the operations of 1915 may be performed by a scheduling offset manager 1335 as described with reference to FIG. 13.

At 1920, the method may include communicating with the base station via the transmission based at least in part on the scheduling offset. The operations of 1920 may be performed in accordance with examples as disclosed herein. In some examples, aspects of the operations of 1920 may be performed by a base station communicating manager 1340 as described with reference to FIG. 13.

Figure 20:
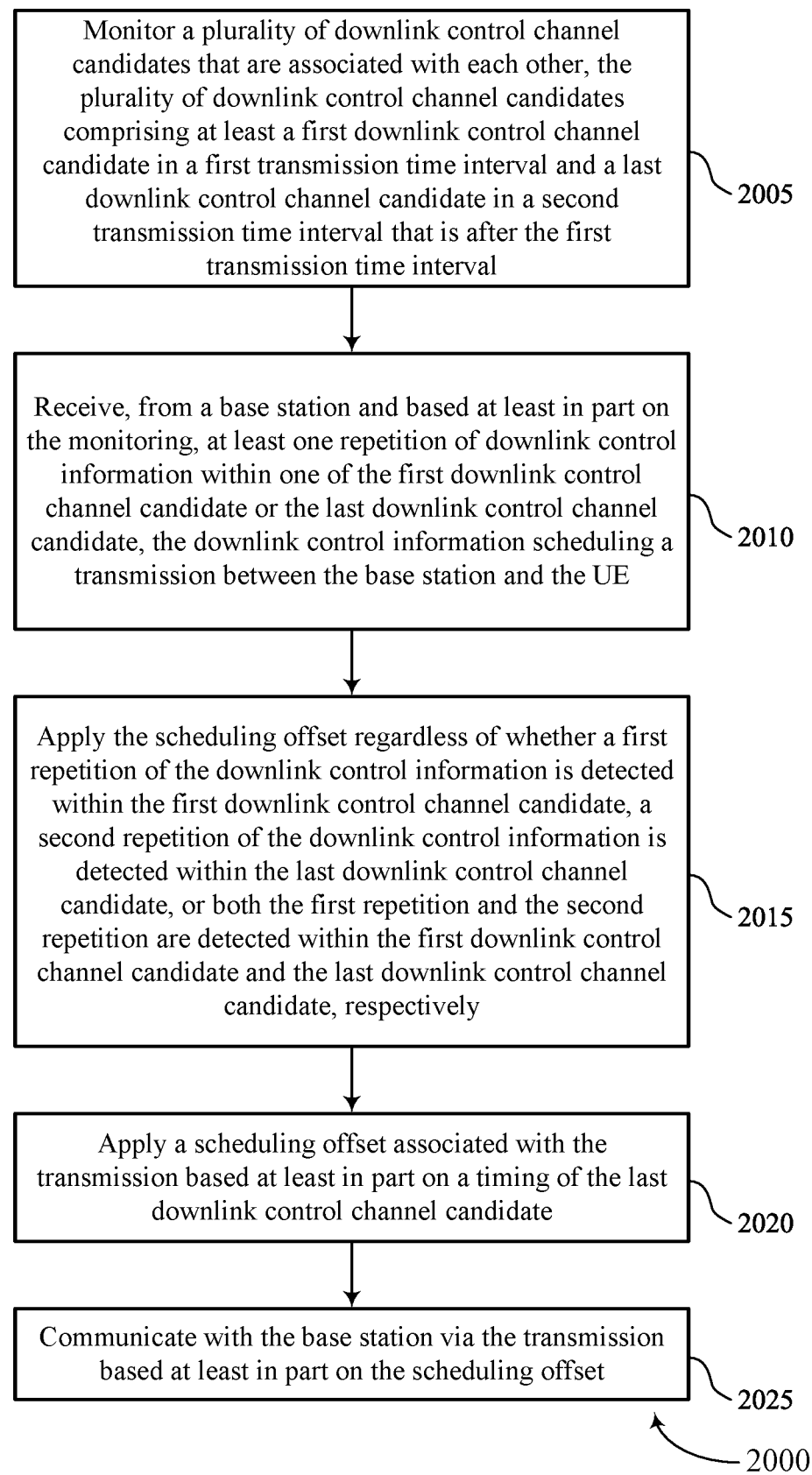

FIG. 20 shows a flowchart illustrating a method 2000 that supports techniques for timing relationships for PDCCH repetition in accordance with aspects of the present disclosure. The operations of the method 2000 may be implemented by a UE or its components as described herein. For example, the operations of the method 2000 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2005, the method may include monitoring a set of multiple downlink control channel candidates that are associated with each other, the set of multiple downlink control channel candidates including at least a first downlink control channel candidate in a first TTI and a last downlink control channel candidate in a second TTI that is after the first TTI. The operations of 2005 may be performed in accordance with examples as disclosed herein. In some examples, aspects of the operations of 2005 may be performed by a control channel monitoring manager 1325 as described with reference to FIG. 13.

At 2010, the method may include receiving, from a base station and based at least in part on the monitoring, at least one repetition of DCI within one of the first downlink control channel candidate or the last downlink control channel candidate, the DCI scheduling a transmission between the base station and the UE. The operations of 2010 may be performed in accordance with examples as disclosed herein. In some examples, aspects of the operations of 2010 may be performed by a DCI receiving manager 1330 as described with reference to FIG. 13.

At 2015, the method may include applying the scheduling offset regardless of whether a first repetition of the DCI is detected within the first downlink control channel candidate, a second repetition of the DCI is detected within the last downlink control channel candidate, or both the first repetition and the second repetition are detected within the first downlink control channel candidate and the last downlink control channel candidate, respectively. The operations of 2015 may be performed in accordance with examples as disclosed herein. In some examples, aspects of the operations of 2015 may be performed by a scheduling offset manager 1335 as described with reference to FIG. 13.

At 2020, the method may include applying a scheduling offset associated with the transmission based at least in part on a timing of the last downlink control channel candidate. The operations of 2020 may be performed in accordance with examples as disclosed herein. In some examples, aspects of the operations of 2020 may be performed by a scheduling offset manager 1335 as described with reference to FIG. 13.

At 2025, the method may include communicating with the base station via the transmission based at least in part on the scheduling offset. The operations of 2025 may be performed in accordance with examples as disclosed herein. In some examples, aspects of the operations of 2025 may be performed by a base station communicating manager 1340 as described with reference to FIG. 13.

Figure 21:
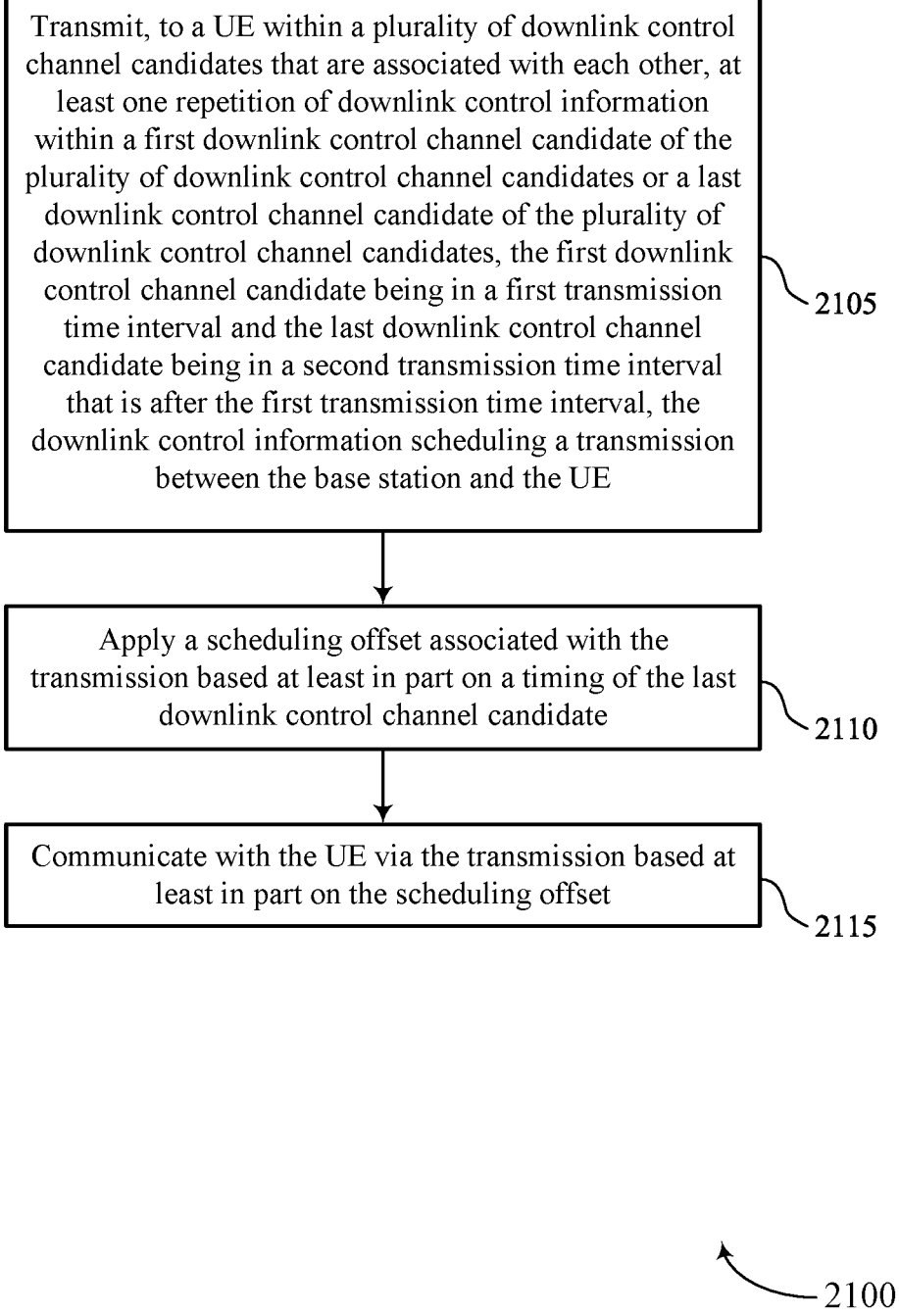

FIG. 21 shows a flowchart illustrating a method 2100 that supports techniques for timing relationships for PDCCH repetition in accordance with aspects of the present disclosure. The operations of the method 2100 may be implemented by a base station or its components as described herein. For example, the operations of the method 2100 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE within a set of multiple downlink control channel candidates that are associated with each other, at least one repetition of DCI within a first downlink control channel candidate of the set of multiple downlink control channel candidates or a last downlink control channel candidate of the set of multiple downlink control channel candidates, the first downlink control channel candidate being in a first TTI and the last downlink control channel candidate being in a second TTI that is after the first TTI, the DCI scheduling a transmission between the base station and the UE. The operations of 2105 may be performed in accordance with examples as disclosed herein. In some examples, aspects of the operations of 2105 may be performed by a DCI transmitting manager 1725 as described with reference to FIG. 17.

At 2110, the method may include applying a scheduling offset associated with the transmission based at least in part on a timing of the last downlink control channel candidate. The operations of 2110 may be performed in accordance with examples as disclosed herein. In some examples, aspects of the operations of 2110 may be performed by a scheduling offset manager 1730 as described with reference to FIG. 17.

At 2115, the method may include communicating with the UE via the transmission based at least in part on the scheduling offset. The operations of 2115 may be performed in accordance with examples as disclosed herein. In some examples, aspects of the operations of 2115 may be performed by a UE communicating manager 1735 as described with reference to FIG. 17.

The following provides an overview of aspects of the present disclosure:

Aspect 1: A method for wireless communication at a UE, comprising: monitoring a plurality of downlink control channel candidates that are associated with each other, the plurality of downlink control channel candidates comprising at least a first downlink control channel candidate in a first TTI and a last downlink control channel candidate in a second TTI that is after the first TTI; receiving, from a base station and based at least in part on the monitoring, at least one repetition of DCI within one of the first downlink control channel candidate or the last downlink control channel candidate, the DCI scheduling a transmission between the base station and the UE; applying a scheduling offset associated with the transmission based at least in part on a timing of the last downlink control channel candidate; and communicating with the base station via the transmission based at least in part on the scheduling offset.

Aspect 2: The method of aspect 1, wherein applying the scheduling offset based at least in part on the timing of the last downlink control channel candidate comprises: applying the scheduling offset regardless of whether a first repetition of the DCI is detected within the first downlink control channel candidate, a second repetition of the DCI is detected within the last downlink control channel candidate, or both the first repetition and the second repetition are detected within the first downlink control channel candidate and the last downlink control channel candidate, respectively.

Aspect 3: The method of any of aspects 1 through 2, wherein the transmission scheduled by the DCI comprises a CSI-RS, wherein communicating with the base station via the transmission comprises: receiving the CSI-RS in accordance with the scheduling offset which is applied based at least in part on the timing of the last downlink control channel candidate.

Aspect 4: The method of aspect 3, further comprising: receiving, from the base station, a RRC message indicating a set of trigger state configurations; and receiving, via the at least one repetition of the DCI, an indication of a trigger state configuration included within the set of trigger state configurations, wherein receiving the CSI-RS is based at least in part on the trigger state configuration.

Aspect 5: The method of any of aspects 3 through 4, wherein the scheduling offset comprises an offset between a last symbol of the last downlink control channel candidate and a first symbol of the CSI-RS.

Aspect 6: The method of any of aspects 3 through 5, further comprising: determining a QCL configuration for receiving the CSI-RS based at least in part on a comparison of the scheduling offset and a beam switching threshold of the UE, wherein the CSI-RS is received in accordance with the QCL configuration.

Aspect 7: The method of aspect 6, further comprising: determining, based at least in part on the scheduling offset being greater than or equal to the beam switching threshold of the UE, the QCL configuration based at least in part on one or more TCI states which are determined based at least in part on the DCI.

Aspect 8: The method of any of aspects 6 through 7, further comprising: receiving, from the base station, a downlink transmission within a set of resources associated with the CSI-RS; and determining, based at least in part on the scheduling offset being less than the beam switching threshold of the UE, the QCL configuration based at least in part on one or more TCI states which are determined based at least in part on the downlink transmission.

Aspect 9: The method of any of aspects 6 through 8, further comprising: determining, based at least in part on the scheduling offset being less than the beam switching threshold of the UE, the QCL configuration associated with a control resource set within a last TTI of a search space set monitored by the UE.

Aspect 10: The method of any of aspects 6 through 9, further comprising: determining, based at least in part on the scheduling offset being less than the beam switching threshold of the UE, the QCL configuration associated with a lowest activated TCI state of a serving cell associated with the CSI-RS.

Aspect 11: The method of any of aspects 6 through 10, further comprising: transmitting, to the base station, an indication of the beam switching threshold of the UE; determining one or more parameters associated with reception of the CSI-RS based at least in part on the comparison of the scheduling offset and the beam switching threshold, wherein the CSI-RS is received based at least in part on the one or more parameters.

Aspect 12: The method of any of aspects 6 through 11, further comprising: determining a timing delay associated with reception of the CSI-RS based at least in part on a SCS of a downlink control channel within which the at least one repetition of DCI was received; determining an adjusted beam switching threshold of the UE based at least in part on the timing delay; determining one or more parameters associated with reception of the CSI-RS based at least in part on the comparison of the scheduling offset and the adjusted beam switching threshold, wherein the CSI-RS is received based at least in part on the one or more parameters.

Aspect 13: The method of any of aspects 1 through 12, wherein the transmission scheduled by the DCI comprises a downlink shared channel transmission, a CSI-RS, or both, wherein communicating with the base station via the transmission comprises: receiving, from the base station, the downlink shared channel transmission, the CSI-RS, or both, in accordance with a minimum scheduling offset, the minimum scheduling offset being less than or equal to the scheduling offset which is applied based at least in part on the timing of the last downlink control channel candidate.

Aspect 14: The method of aspect 13, further comprising: determining a first SCS associated with a downlink control channel on which the at least one repetition of the DCI was received; and determining a second SCS associated with a channel on which the transmission scheduled by the DCI is to be performed, wherein the minimum scheduling offset is based at least in part on a comparison of the first SCS and the second SCS.

Aspect 15: The method of any of aspects 1 through 14, wherein the transmission scheduled by the DCI comprises a set of SRSs, wherein communicating with the base station via the transmission comprises: transmitting, to the base station, the set of SRSs after the scheduling offset which is applied based at least in part on the timing of the last downlink control channel candidate.

Aspect 16: The method of any of aspects 1 through 15, wherein the transmission scheduled by the DCI comprises a set of SRSs, the method further comprising: receiving, from the base station, a RRC message comprising an indication of the scheduling offset.

Aspect 17: The method of any of aspects 1 through 16, wherein the transmission scheduled by the DCI comprises a set of SRSs, and the scheduling offset comprises a quantity of TTIs between the second TTI and a TTI of the transmission.

Aspect 18: The method of any of aspects 1 through 17, wherein the transmission scheduled by the DCI comprises a set of SRSs, the method further comprising: receiving, from the base station, a CSI-RS; performing one or more measurements for the CSI-RS; determining one or more parameters associated with transmission of the set of SRSs based at least in part on the one or more measurements; and transmitting the set of SRSs based at least in part on the one or more parameters.

Aspect 19: The method of aspect 18, wherein the one or more parameters comprise a precoder for the set of SRSs.

Aspect 20: The method of any of aspects 18 through 19, wherein the CSI-RS is received within the second TTI.

Aspect 21: The method of any of aspects 1 through 20, wherein the transmission scheduled by the DCI comprises a set of SRSs, the method further comprising: receiving, from the base station, an indication of a TTI offset associated with reception of a CSI-RS; determining a resource for reception of the CSI-RS based at least in part on the TTI offset and the second TTI; receiving the CSI-RS within the resource; and transmitting the set of SRSs based at least in part on the CSI-RS.

Aspect 22: The method of any of aspects 1 through 21, wherein the DCI comprises DCI which is specific to the UE, group-common DCI, or both.

Aspect 23: The method of any of aspects 1 through 22, further comprising: receiving, via the DCI, a change in one or more values of a minimum scheduling offset indicator field of the DCI; and determining that the change in the one or more values of the minimum scheduling offset indicator field is to be applied after the scheduling offset which is applied based at least in part on the timing of the last downlink control channel candidate.

Aspect 24: The method of aspect 23, further comprising: receiving, from the base station, a RRC message indicating a first minimum scheduling offset and a second minimum scheduling offset associated with the transmission scheduled by the DCI, wherein the change in the one or more values of the minimum scheduling offset indicator field are based at least in part on the first minimum scheduling offset and the second minimum scheduling offset.

Aspect 25: The method of any of aspects 1 through 24, wherein the transmission scheduled by the DCI comprises a PDSCH transmission, a PUSCH transmission, or both, and the scheduling offset comprises a minimum K0 value associated with the PDSCH transmission, a minimum K2 value associated with the PUSCH transmission, or both.

Aspect 26: The method of any of aspects 1 through 25, wherein the first TTI and the second TTI are each a slot.

Aspect 27: A method for wireless communication at a base station, comprising: transmitting, to a UE within a plurality of downlink control channel candidates that are associated with each other, at least one repetition of DCI within a first downlink control channel candidate of the plurality of downlink control channel candidates or a last downlink control channel candidate of the plurality of downlink control channel candidates, the first downlink control channel candidate being in a first TTI and the last downlink control channel candidate being in a second TTI that is after the first TTI, the DCI scheduling a transmission between the base station and the UE; applying a scheduling offset associated with the transmission based at least in part on a timing of the last downlink control channel candidate; and communicating with the UE via the transmission based at least in part on the scheduling offset.

Aspect 28: The method of aspect 27, wherein transmitting the at least one repetition of DCI comprises: transmitting a first repetition of the DCI within the first downlink control channel candidate; and transmitting a second repetition of the DCI within the last downlink control channel candidate.

Aspect 29: The method of any of aspects 27 through 28, wherein the transmission scheduled by the DCI comprises a CSI-RS, wherein communicating with the UE via the transmission comprises: transmitting the CSI-RS in accordance with the scheduling offset which is applied based at least in part on the timing of the last downlink control channel candidate.

Aspect 30: The method of aspect 29, further comprising: transmitting, to the UE, a RRC message indicating a set of trigger state configurations; and transmitting, via the at least one repetition of the DCI, an indication of a trigger state configuration included within the set of trigger state configurations, wherein transmitting the CSI-RS is based at least in part on the trigger state configuration.

Aspect 31: The method of any of aspects 29 through 30, wherein the scheduling offset comprises an offset between a last symbol of the last downlink control channel candidate and a first symbol of the CSI-RS.

Aspect 32: The method of any of aspects 29 through 31, further comprising: determining a QCL configuration for transmitting the CSI-RS based at least in part on a comparison of the scheduling offset and a beam switching threshold of the UE, wherein the CSI-RS is transmitted in accordance with the QCL configuration.

Aspect 33: The method of aspect 32, further comprising: determining, based at least in part on the scheduling offset being greater than or equal to the beam switching threshold of the UE, the QCL configuration based at least in part on one or more TCI states which are determined based at least in part on the DCI.

Aspect 34: The method of any of aspects 32 through 33, further comprising: transmitting, to the UE, a downlink transmission within a set of resources associated with the CSI-RS; and determining, based at least in part on the scheduling offset being less than the beam switching threshold of the UE, the QCL configuration based at least in part on one or more TCI states which are determined based at least in part on the downlink transmission.

Aspect 35: The method of any of aspects 32 through 34, further comprising: determining, based at least in part on the scheduling offset being less than the beam switching threshold of the UE, the QCL configuration associated with a control resource set within a last TTI of a search space set monitored by the UE.

Aspect 36: The method of any of aspects 32 through 35, further comprising: determining, based at least in part on the scheduling offset being less than the beam switching threshold of the UE, the QCL configuration associated with a lowest activated TCI state of a serving cell associated with the CSI-RS.

Aspect 37: The method of any of aspects 32 through 36, further comprising: receiving, from the UE, an indication of the beam switching threshold of the UE; determining one or more parameters associated with transmission of the CSI-RS based at least in part on the comparison of the scheduling offset and the beam switching threshold, wherein the CSI-RS is transmitted based at least in part on the one or more parameters.

Aspect 38: The method of any of aspects 32 through 37, further comprising: determining a timing delay associated with transmission of the CSI-RS based at least in part on a SCS of a downlink control channel within which the at least one repetition of DCI was transmitted; determining an adjusted beam switching threshold of the UE based at least in part on the timing delay; determining one or more parameters associated with transmission of the CSI-RS based at least in part on the comparison of the scheduling offset and the adjusted beam switching threshold, wherein the CSI-RS is transmitted based at least in part on the one or more parameters.

Aspect 39: The method of any of aspects 27 through 38, wherein the transmission scheduled by the DCI comprises a downlink shared channel transmission, a CSI-RS, or both, wherein communicating with the UE via the transmission comprises: transmitting, to the UE, the downlink shared channel transmission, the CSI-RS, or both, in accordance with a minimum scheduling offset, the minimum scheduling offset being less than or equal to the scheduling offset which is applied based at least in part on the timing of the last downlink control channel candidate.

Aspect 40: The method of aspect 39, further comprising: determining a first SCS associated with a downlink control channel on which the at least one repetition of the DCI was received; and determining a second SCS associated with a channel on which the transmission scheduled by the DCI is to be performed, wherein the minimum scheduling offset is based at least in part on a comparison of the first SCS and the second SCS.

Aspect 41: The method of any of aspects 27 through 40, wherein the transmission scheduled by the DCI comprises a set of SRSs, wherein communicating with the base station via the transmission comprises: receiving, from the UE, the set of SRSs after the scheduling offset which is applied based at least in part on the timing of the last downlink control channel candidate.

Aspect 42: The method of any of aspects 27 through 41, wherein the transmission scheduled by the DCI comprises a set of SRSs, the method further comprising: transmitting, to the UE, a RRC message comprising an indication of the scheduling offset.

Aspect 43: The method of any of aspects 27 through 42, wherein the transmission scheduled by the DCI comprises a set of SRSs, and the scheduling offset comprises a quantity of TTIs between the second TTI and a TTI of the transmission.

Aspect 44: The method of any of aspects 27 through 43, wherein the transmission scheduled by the DCI comprises a set of SRSs, the method further comprising: transmitting, to the UE, a CSI-RS; determining one or more parameters associated with transmission of the set of SRSs based at least in part on the CSI-RS; and receiving the set of SRSs based at least in part on the one or more parameters.

Aspect 45: The method of aspect 44, wherein the one or more parameters comprise a precoder for the set of SRSs.

Aspect 46: The method of any of aspects 44 through 45, wherein the CSI-RS is transmitted within the second TTI.

Aspect 47: The method of any of aspects 27 through 46, wherein the transmission scheduled by the DCI comprises a set of SRSs, the method further comprising: transmitting, to the UE, an indication of a TTI offset associated with transmission of a CSI-RS; determining a resource for transmission of the CSI-RS based at least in part on the Tl offset and the second TTI; transmitting the CSI-RS within the resource; and receiving the set of SRSs based at least in part on the CSI-RS.

Aspect 48: The method of any of aspects 27 through 47, wherein the DCI comprises DCI which is specific to the UE, group-common DCI, or both.

Aspect 49: The method of any of aspects 27 through 48, further comprising: transmitting, via the DCI, a change in one or more values of a minimum scheduling offset indicator field of the DCI; and determining that the change in the one or more values of the minimum scheduling offset indicator field is to be applied after the scheduling offset which is applied based at least in part on the timing of the last downlink control channel candidate.

Aspect 50: The method of aspect 49, further comprising: transmitting, to the UE, a RRC message indicating a first minimum scheduling offset and a second minimum scheduling offset associated with the transmission scheduled by the DCI, wherein the change in the one or more values of the minimum scheduling offset indicator field are based at least in part on the first minimum scheduling offset and the second minimum scheduling offset.

Aspect 51: The method of any of aspects 27 through 50, wherein the transmission scheduled by the DCI comprises a PDSCH transmission, a PUSCH transmission, or both, and the scheduling offset comprises a minimum K0 value associated with the PDSCH transmission, a minimum K2 value associated with the PUSCH transmission, or both.

Aspect 52: The method of any of aspects 27 through 51, wherein the first TTI and the second TTI are each a slot.

Aspect 53: An apparatus for wireless communication at a UE, comprising at least one processor; memory coupled with the at least one processor; and instructions stored in the memory and executable by the at least one processor to cause the apparatus to perform a method of any of aspects 1 through 26.

Aspect 54: An apparatus for wireless communication at a UE, comprising at least one means for performing a method of any of aspects 1 through 26.

Aspect 55: A non-transitory computer-readable medium storing code for wireless communication at a UE, the code comprising instructions executable by at least one processor to perform a method of any of aspects 1 through 26.

Aspect 56: An apparatus for wireless communication at a base station, comprising at least one processor; memory coupled with the at least one processor; and instructions stored in the memory and executable by the at least one processor to cause the apparatus to perform a method of any of aspects 27 through 52.

Aspect 57: An apparatus for wireless communication at a base station, comprising at least one means for performing a method of any of aspects 27 through 52.

Aspect 58: A non-transitory computer-readable medium storing code for wireless communication at a base station, the code comprising instructions executable by at least one processor to perform a method of any of aspects 27 through 52.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   monitoring a plurality of downlink control channel candidates that are associated with each other, the plurality of downlink control channel candidates comprising at least a first downlink control channel candidate in a first transmission time interval and a last downlink control channel candidate in a second transmission time interval that is after the first transmission time interval;
   receiving, from a network entity and based at least in part on the monitoring, at least one repetition of downlink control information within one of the first downlink control channel candidate or the last downlink control channel candidate, the downlink control information scheduling a transmission between the network entity and the UE;
   applying a scheduling offset associated with the transmission, wherein the scheduling offset is between a last symbol of the last downlink control channel candidate and a first symbol of the transmission;
   determining a quasi co-location configuration for communicating the transmission based at least in part on a comparison of the scheduling offset and a beam switching threshold of the UE; and
   communicating with the network entity via the transmission based at least in part on the scheduling offset and in accordance with the quasi co-location configuration.

2. The method of claim 1, wherein the transmission scheduled by the downlink control information comprises a channel state information reference signal, wherein communicating with the network entity via the transmission comprises:
   receiving the channel state information reference signal in accordance with the scheduling offset and the quasi co-location configuration.

3. The method of claim 2, further comprising:
   receiving, from the network entity, a radio resource control message indicating a set of trigger state configurations; and
   receiving, via the at least one repetition of the downlink control information, an indication of a trigger state configuration included within the set of trigger state configurations, wherein receiving the channel state information reference signal is based at least in part on the trigger state configuration.

4. The method of claim 1, further comprising:
   determining, based at least in part on the scheduling offset being greater than or equal to the beam switching threshold of the UE, the quasi co-location configuration based at least in part on one or more transmission configuration indication states which are determined based at least in part on the downlink control information.

5. The method of claim 2, further comprising:
   receiving, from the network entity, a downlink transmission within a set of resources associated with the channel state information reference signal; and
   determining, based at least in part on the scheduling offset being less than the beam switching threshold of the UE, the quasi co-location configuration based at least in part on one or more transmission configuration indication states which are determined based at least in part on the downlink transmission.

6. The method of claim 1, further comprising:
   determining, based at least in part on the scheduling offset being less than the beam switching threshold of the UE, the quasi co-location configuration associated with a control resource set within a last transmission time interval of a search space set monitored by the UE.

7. The method of claim 2, further comprising:
   determining, based at least in part on the scheduling offset being less than the beam switching threshold of the UE, the quasi co-location configuration associated with a lowest activated transmission configuration indication state of a serving cell associated with the channel state information reference signal.

8. The method of claim 2, further comprising:
   transmitting, to the network entity, an indication of the beam switching threshold of the UE; and
   determining one or more parameters associated with reception of the channel state information reference signal based at least in part on the comparison of the scheduling offset and the beam switching threshold, wherein the channel state information reference signal is received based at least in part on the one or more parameters.

9. The method of claim 2, further comprising:
   determining a timing delay associated with reception of the channel state information reference signal based at least in part on a subcarrier spacing of a downlink control channel within which the at least one repetition of the downlink control information was received;
   determining an adjusted beam switching threshold of the UE based at least in part on the timing delay; and
   determining one or more parameters associated with reception of the channel state information reference signal based at least in part on the comparison of the scheduling offset and the adjusted beam switching threshold, wherein the channel state information reference signal is received based at least in part on the one or more parameters.

10. The method of claim 1, wherein the transmission scheduled by the downlink control information comprises a downlink shared channel transmission, a channel state information reference signal, or both, wherein communicating with the network entity via the transmission comprises:
    receiving, from the network entity, the downlink shared channel transmission, the channel state information reference signal, or both, in accordance with a minimum scheduling delay, the minimum scheduling delay being less than or equal to the scheduling offset.

11. The method of claim 10, further comprising:
    determining a first subcarrier spacing associated with a downlink control channel on which the at least one repetition of the downlink control information was received; and
    determining a second subcarrier spacing associated with a channel on which the transmission scheduled by the downlink control information is to be performed, wherein the minimum scheduling delay is based at least in part on a comparison of the first subcarrier spacing and the second subcarrier spacing.

12. The method of claim 1, wherein applying the scheduling offset comprises:
    applying the scheduling offset regardless of whether a first repetition of the downlink control information is detected within the first downlink control channel candidate, a second repetition of the downlink control information is detected within the last downlink control channel candidate, or both the first repetition and the second repetition are detected within the first downlink control channel candidate and the last downlink control channel candidate, respectively.

13. The method of claim 1, wherein the transmission scheduled by the downlink control information comprises a set of sounding reference signals, wherein communicating with the network entity via the transmission comprises:
transmitting, to the network entity, the set of sounding reference signals after the scheduling offset.

14. The method of claim 1, wherein the transmission scheduled by the downlink control information comprises a set of sounding reference signals, the method further comprising:
receiving, from the network entity, a radio resource control message comprising an indication of the scheduling offset.

15. The method of claim 1, wherein the transmission scheduled by the downlink control information comprises a set of sounding reference signals, and the scheduling offset comprises a quantity of transmission time intervals between the second transmission time interval and a transmission time interval of the transmission.

16. The method of claim 1, wherein the transmission scheduled by the downlink control information comprises a set of sounding reference signals, the method further comprising:
receiving, from the network entity, a channel state information reference signal;
performing one or more measurements for the channel state information reference signal;
determining one or more parameters associated with transmission of the set of sounding reference signals based at least in part on the one or more measurements; and
transmitting the set of sounding reference signals based at least in part on the one or more parameters.

17. The method of claim 1, wherein the transmission scheduled by the downlink control information comprises a set of sounding reference signals, the method further comprising:
receiving, from the network entity, an indication of a transmission time interval offset associated with reception of a channel state information reference signal;
determining a resource for reception of the channel state information reference signal based at least in part on the transmission time interval offset and the second transmission time interval;
receiving the channel state information reference signal within the resource; and
transmitting the set of sounding reference signals based at least in part on the channel state information reference signal.

18. The method of claim 1, further comprising:
receiving, from the network entity, a radio resource control message indicating a first minimum scheduling offset and a second minimum scheduling offset associated with the transmission scheduled by the downlink control information, wherein a change in one or more values of a minimum scheduling offset indicator field is based at least in part on the first minimum scheduling offset and the second minimum scheduling offset.

19. The method of claim 1, wherein the transmission scheduled by the downlink control information comprises a physical downlink shared channel transmission, a physical uplink shared channel transmission, or both, and the scheduling offset comprises a minimum K0 value associated with the physical downlink shared channel transmission, a minimum K2 value associated with the physical uplink shared channel transmission, or both.

20. A method for wireless communication at a network entity, comprising:
transmitting, to a user equipment (UE) within a plurality of downlink control channel candidates that are associated with each other, at least one repetition of downlink control information within a first downlink control channel candidate of the plurality of downlink control channel candidates or a last downlink control channel candidate of the plurality of downlink control channel candidates, the first downlink control channel candidate being in a first transmission time interval and the last downlink control channel candidate being in a second transmission time interval that is after the first transmission time interval, the downlink control information scheduling a transmission between the network entity and the UE;
applying a scheduling offset associated with the transmission, wherein the scheduling offset is between a last symbol of the last downlink control channel candidate and a first symbol of the transmission;
determining a quasi co-location configuration for communicating the transmission based at least in part on a comparison of the scheduling offset and a beam switching threshold of the UE; and
communicating with the UE via the transmission based at least in part on the scheduling offset and in accordance with the quasi co-location configuration.

21. The method of claim 20, wherein the transmission scheduled by the downlink control information comprises a channel state information reference signal, wherein communicating with the UE via the transmission comprises:
transmitting the channel state information reference signal in accordance with the scheduling offset and the quasi co-location configuration.

22. The method of claim 20, wherein the transmission scheduled by the downlink control information comprises a downlink shared channel transmission, a channel state information reference signal, or both, wherein communicating with the UE via the transmission comprises:
transmitting, to the UE, the downlink shared channel transmission, the channel state information reference signal, or both, in accordance with a minimum scheduling delay, the minimum scheduling delay being less than or equal to the scheduling offset.

23. The method of claim 22, further comprising:
determining a first subcarrier spacing associated with a downlink control channel on which the at least one repetition of the downlink control information was received; and
determining a second subcarrier spacing associated with a channel on which the transmission scheduled by the downlink control information is to be performed, wherein the minimum scheduling delay is based at least in part on a comparison of the first subcarrier spacing and the second subcarrier spacing.

24. An apparatus for wireless communication at a user equipment (UE), comprising:
at least one processor; and
one or more memories coupled to the at least one processor, the one or more memories storing instructions executable by the at least one processor, directly or after compilation, to cause the apparatus to:
monitor a plurality of downlink control channel candidates that are associated with each other, the plurality of downlink control channel candidates comprising at least a first downlink control channel candidate in a first transmission time interval and a last downlink control channel candidate in a second transmission time interval that is after the first transmission time interval;

receive, from a network entity and based at least in part on the monitoring, at least one repetition of downlink control information within one of the first downlink control channel candidate or the last downlink control channel candidate, the downlink control information scheduling a transmission between the network entity and the UE;

apply a scheduling offset associated with the transmission, wherein the scheduling offset is between a last symbol of the last downlink control channel candidate and a first symbol of the transmission;

determine a quasi co-location configuration for communicating the transmission based at least in part on a comparison of the scheduling offset and a beam switching threshold of the UE; and communicate with the network entity via the transmission based at least in part on the scheduling offset and in accordance with the quasi co-location configuration.

25. An apparatus for wireless communication at a network entity, comprising:

at least one processor; and one or more memories coupled to the at least one processor, the one or more memories storing instructions executable by the at least one processor, directly or after compilation, to cause the apparatus to:

transmit, to a user equipment (UE) within a plurality of downlink control channel candidates that are associated with each other, at least one repetition of downlink control information within a first downlink control channel candidate of the plurality of downlink control channel candidates or a last downlink control channel candidate of the plurality of downlink control channel candidates, the first downlink control channel candidate being in a first transmission time interval and the last downlink control channel candidate being in a second transmission time interval that is after the first transmission time interval, the downlink control information scheduling a transmission between the network entity and the UE;

apply a scheduling offset associated with the transmission, wherein the scheduling offset is between a last symbol of the last downlink control channel candidate and a first symbol of the transmission;

determine a quasi co-location configuration for communicating the transmission based at least in part on a comparison of the scheduling offset and a beam switching threshold of the UE; and communicate with the UE via the transmission based at least in part on the scheduling offset and in accordance with the quasi co-location configuration.

* * * * *